United States Patent
Yuki et al.

(10) Patent No.: US 9,531,496 B2
(45) Date of Patent: Dec. 27, 2016

(54) OPTICAL TRANSMISSION DEVICE AND OPTICAL TRANSMISSION METHOD

(71) Applicant: FUJITSU LIMITED, Kawasaki-shi, Kanagawa (JP)

(72) Inventors: Masahiro Yuki, Kawasaki (JP); Norifumi Shukunami, Yokohama (JP); Kosuke Komaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 17 days.

(21) Appl. No.: 14/531,341

(22) Filed: Nov. 3, 2014

(65) Prior Publication Data
US 2015/0132009 A1 May 14, 2015

(30) Foreign Application Priority Data
Nov. 13, 2013 (JP) .................................. 2013-234985

(51) Int. Cl.
| | | |
|---|---|---|
| *H04J 14/02* | (2006.01) | |
| *H04B 10/079* | (2013.01) | |
| *H04B 10/296* | (2013.01) | |

(52) U.S. Cl.
CPC ....... *H04J 14/0221* (2013.01); *H04B 10/0797* (2013.01); *H04B 10/296* (2013.01); *H04J 14/0212* (2013.01)

(58) Field of Classification Search
CPC ................ H04B 10/296; H04B 10/0797; H04J 14/0221; H04J 14/0212
See application file for complete search history.

(56) References Cited

U.S. PATENT DOCUMENTS

| | | | |
|---|---|---|---|
| 6,061,157 A | 5/2000 | Terahara | |
| 6,414,770 B2* | 7/2002 | Iwata | H04J 14/0221 398/79 |
| 6,486,991 B1* | 11/2002 | Uehara | H04B 10/032 398/97 |
| 6,522,803 B1 | 2/2003 | Nakajima et al. | |
| 2001/0012146 A1* | 8/2001 | Shiozaki | H04B 10/296 359/337 |
| 2003/0063374 A1* | 4/2003 | Inoue | H01S 3/302 359/345 |
| 2004/0156095 A1* | 8/2004 | Tsuzaki | H04B 10/2916 359/334 |
| 2008/0137179 A1* | 6/2008 | Li | H01S 3/06754 359/337.13 |
| 2008/0304829 A1* | 12/2008 | Sato | H04J 14/0221 398/79 |

FOREIGN PATENT DOCUMENTS

| | | | |
|---|---|---|---|
| EP | 0949776 A2 * | 10/1999 | ........... H04B 10/506 |
| JP | 10-173598 | 6/1998 | |
| JP | 2000-341728 | 12/2000 | |
| JP | 2012-109653 | 6/2012 | |

* cited by examiner

*Primary Examiner* — Leslie Pascal
(74) *Attorney, Agent, or Firm* — Staas & Halsey LLP

(57) ABSTRACT

An optical transmission device includes a receiver that receives first light, a transmitter that outputs second light, a memory, a processor coupled to the memory, configured to control a first optical level of the second light in such a way that a second optical level calculated based on an optical level of the received first light and an optical level of the second light that is output from the transmitter becomes a predetermined target value, a combiner that combines the received first light and the second light for which the first optical level is controlled by the processor, and an amplifier that amplifies the combined light.

6 Claims, 38 Drawing Sheets

OPTICAL TRANSMISSION DEVICE AND OPTICAL TRANSMISSION METHOD

CROSS-REFERENCE TO RELATED APPLICATION

This application is based upon and claims the benefit of priority of the prior Japanese Patent Application No. 2013-234985, filed on Nov. 13, 2013, the entire contents of which are incorporated herein by reference.

FIELD

The embodiment discussed herein is related to an optical transmission device and an optical transmission method.

BACKGROUND

A reconfigurable optical add/drop multiplexing (ROADM) device is one conventional example of a device that subjects wavelength-multiplexed light from a plurality of different paths to wavelength division or wavelength multiplexing and transmits the resulting light. Technology has been disclosed in which, in this kind of device, if it is determined that wavelength-multiplexed light from a certain path is in an input-interrupted state, the output of a transmission-purpose optical amplifier is maintained at a fixed level by emitting dummy light and switching the signal light that has been determined as being in an input-interrupted state with the dummy light and performing transmission. This technology is disclosed in Japanese Laid-open Patent Publication No. 2012-109653, for example.

SUMMARY

According to an aspect of the invention, an optical transmission device includes a receiver that receives first light, a transmitter that outputs second light, a memory, a processor coupled to the memory, configured to control a first optical level of the second light in such a way that a second optical level calculated based on an optical level of the received first light and an optical level of the second light that is output from the transmitter becomes a predetermined target value, a combiner that combines the received first light and the second light for which the first optical level is controlled by the processor, and an amplifier that amplifies the combined light.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

In conventional devices, since dummy light is emitted and switching is performed after an input interruption has been determined, a momentary interruption sometimes occurs where the light that is input to a transmission-purpose optical amplifier during that switching momentarily ceases. If there is a momentary interruption in the input light for the transmission-purpose optical amplifier, the input level of the transmission-purpose optical amplifier suddenly changes, and consequently an optical surge sometimes occurs. Furthermore, if the speed at which the optical level of the signal light that has been determined as being in an input-interrupted state decreases and the speed at which the optical level of the dummy light increases are not in balance, the input level of the transmission-purpose optical amplifier suddenly changes, and consequently an optical surge sometimes occurs. If an optical surge occurs, there is a problem in that there is deterioration in the signal light from other paths that is multiplexed with the light from the path that has been determined as being in an input-interrupted state.

A preferred embodiment of this optical transmission device and the optical transmission method is described in detail hereafter with reference to the appended drawings. In the description of each working example hereafter, the same symbols are appended to the same constituent elements, and descriptions that are redundant have been omitted.

First Example of an Optical Transmission Device

Figure 1:
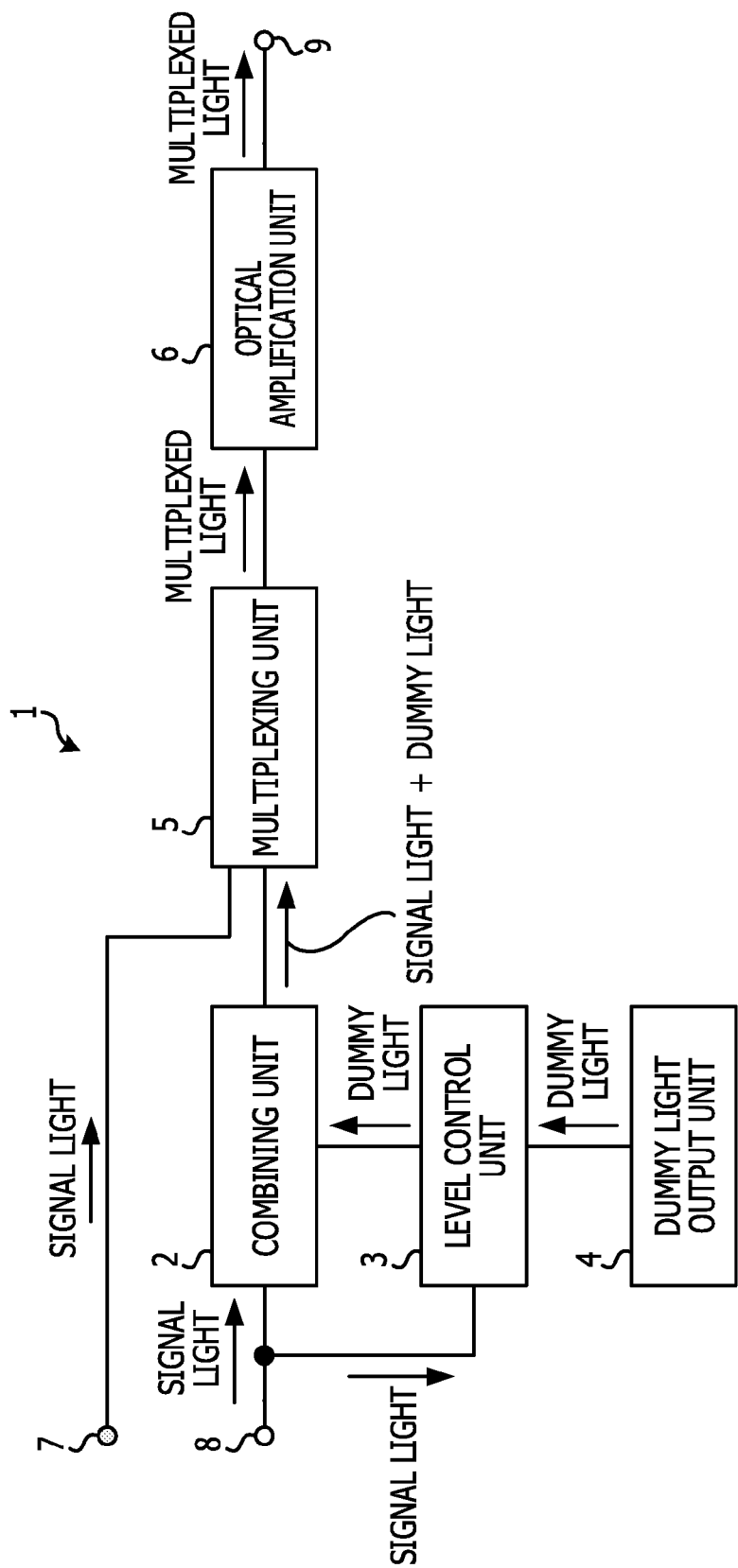
FIG. 1 is a drawing depicting a first example of an optical transmission device according to an embodiment.

FIG. 1 is a drawing depicting a first example of an optical transmission device according to the embodiment. As depicted in FIG. 1, an optical transmission device 1 is provided with a combining unit 2, a level control unit 3, a dummy light output unit 4, a multiplexing unit 5, an optical amplification unit 6, and a reception unit that is not depicted. The reception unit receives signal light.

The dummy light output unit 4 outputs dummy light. For example, the dummy light output unit 4 may output dummy light that includes light having the same wavelength as light that is input to the optical amplification unit 6 from among the signal light. The dummy light output unit 4 may output dummy light if the optical level of received signal light has fallen below a predetermined level.

The level control unit 3 is connected to the dummy light output unit 4 and a path-1 input terminal 8. Signal light from a path 1 received by the reception unit that is not depicted is input to the path-1 input terminal 8, for example. Therefore, dummy light that is output from the dummy light output unit 4, and signal light from the path 1 that is input to the path-1 input terminal 8 are input to the level control unit 3.

The level control unit 3 controls the optical level of the dummy light in such a way that the sum of the optical level of the signal light received and the optical level of the dummy light that is output from the dummy light output unit 4 becomes a predetermined target value. For example, if the optical transmission device 1 determines that there is a fault in the signal light from the path 1, the level control unit 3 may control the optical level of the dummy light in such a way that the sum of the optical level of the signal light from the path 1 in which the fault has been determined, and the optical level of the dummy light that is output from the dummy light output unit 4 becomes a predetermined target value. The predetermined target value may be the optical level prior to it being determined that there is a fault in the signal light from the path 1, in other words, when the signal light from the path 1 is normal.

The combining unit 2 is connected to the level control unit 3 and the path-1 input terminal 8. The combining unit 2 combines received signal light and the dummy light for which the optical level has been controlled by the level control unit 3. For example, the combining unit 2 may combine the signal light from the path 1 in which a fault has been determined, and the dummy light for which the optical level has been controlled by the level control unit 3.

The multiplexing unit 5 is connected to the combining unit 2. The light combined by the combining unit 2 is input to the multiplexing unit 5. Furthermore, signal light from a path 2 that has been input to a path-2 input terminal 7 is input to the multiplexing unit 5. The signal light from the path 2 is light that has been received from another path that is different to the path along which the signal light from the path 1 is transmitted. The multiplexing unit 5 multiplexes the light combined by the combining unit 2 and the signal light from the path 2.

The optical amplification unit 6 is connected to the multiplexing unit 5. The optical amplification unit 6 amplifies multiplexed light that has been multiplexed by the multiplexing unit 5 and outputs the multiplexed light to an output terminal 9. If there is no multiplexing unit 5 in the optical transmission device 1, the optical amplification unit 6 amplifies the light that has been combined by the combining unit 2. The output terminal 9 may be connected to the optical transmission path of a path 3 that is not depicted, for example. The multiplexed light that is output from the optical amplification unit 6 is sent from the output terminal 9 to the path 3. The path-1 input terminal 8 and the path-2 input terminal 7 may be connected to an optical transmission path such as an optical fiber or an optical waveguide that, although not depicted, transmits the signal light of each of the paths.

Example of an Optical Transmission System

Figure 2:
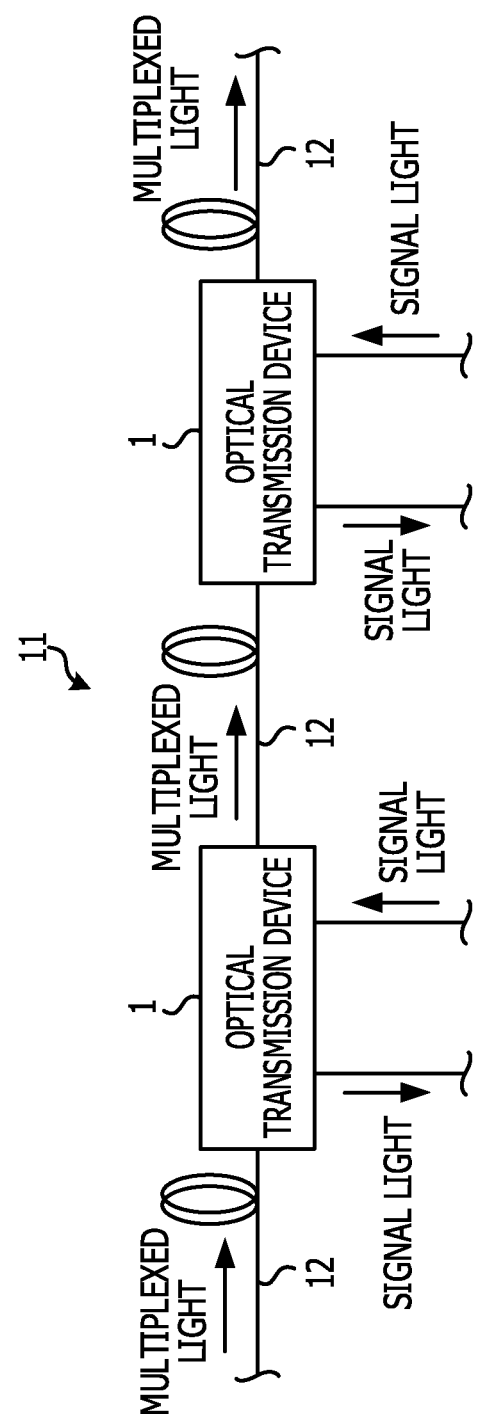
FIG. 2 is a drawing depicting an example of an optical transmission system according to an embodiment.

FIG. 2 is a drawing depicting an example of an optical transmission system according to the embodiment. As depicted in FIG. 2, an optical transmission system 11 is provided with a plurality of the optical transmission devices 1 depicted in FIG. 1, and optical transmission paths 12 that connect the optical transmission devices 1, for example. The optical transmission devices 1 are as described with reference to FIG. 1, and a description thereof is redundant and has therefore been omitted. An optical fiber or an optical waveguide is an example of the optical transmission paths 12. Moreover, as depicted in FIG. 2, the optical transmission devices 1 may be configured so as to be able to perform not only passing (thru) of signal light but also branching (drop) and insertion (add) of signal light.

First Example of an Optical Transmission Method

Figure 3:
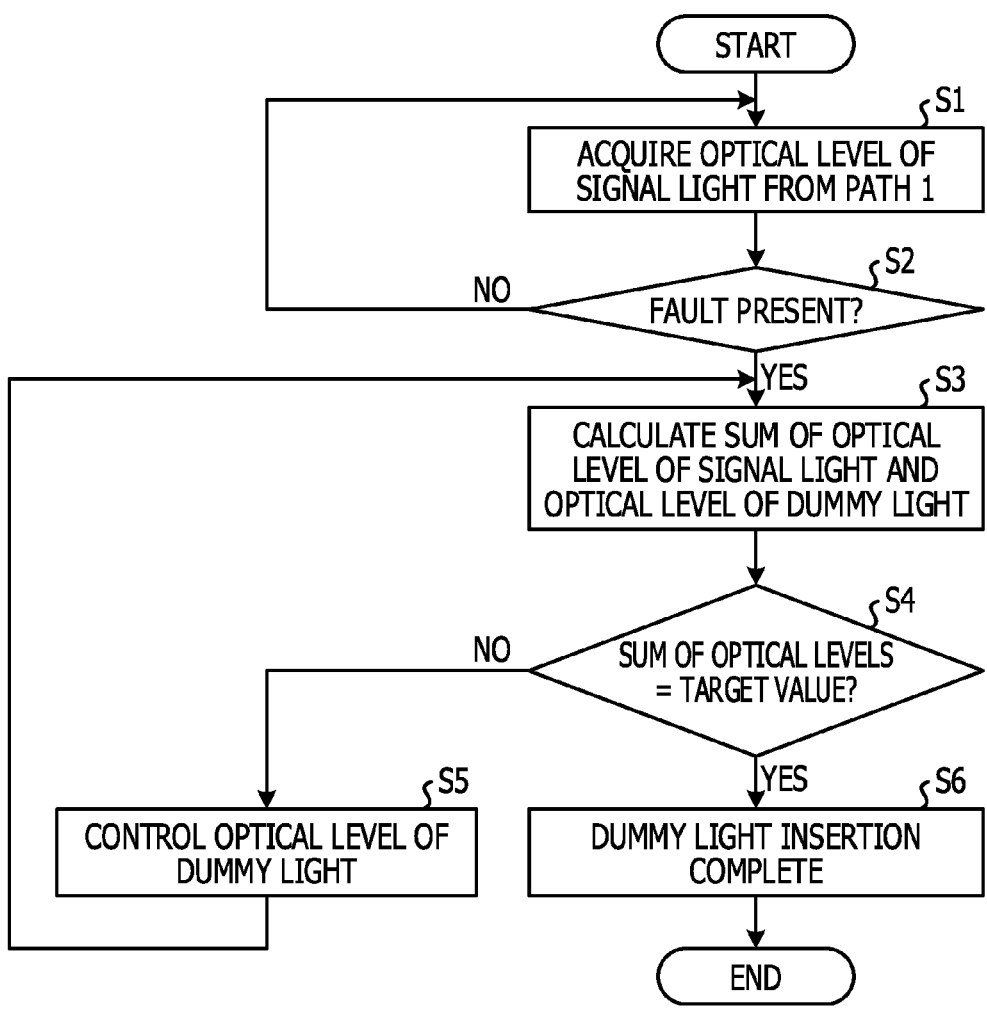
FIG. 3 is a drawing depicting a first example of an optical transmission method according to an embodiment.

FIG. 3 is a drawing depicting a first example of an optical transmission method according to the embodiment. The optical transmission method depicted in FIG. 3 may be carried out by the optical transmission device 1 depicted in FIG. 1, for example. In the present working example, carried out by using the optical transmission device 1 depicted in FIG. 1, the case where the optical transmission device 1 inserts dummy light if it is determined that there is a fault in received signal light is described as an example.

When optical transmission starts in the optical transmission device 1 depicted in FIG. 1, the optical transmission device 1 acquires the optical level of the signal light from the path 1 (step S1). Next, based on the acquired optical level of the signal light from the path 1, the optical transmission device 1 determines whether or not there is a fault in the signal light from the path 1 (step S2).

For example, the optical level of the signal light from the path 1 decreases if the input of the signal light from the path 1 is interrupted due to an optical transmission path such as an optical fiber or an optical waveguide that transmits the signal light from the path 1 being cut, or the connection between the optical transmission path and the optical transmission device being disconnected. Therefore, the optical transmission device 1, for example, determines that there is a fault in the signal light from the path 1 if the optical level of the signal light from the path 1 is lower than a preset threshold value, and determines that there is no fault in the signal light from the path 1 if the optical level of the signal light from the path 1 is not lower than the threshold value.

If the optical transmission device 1 determines that there is no fault in the signal light from the path 1 (step S2: no), processing returns to step S1. The dummy light output unit 4 outputs dummy light from prior to the optical transmission device 1 determining whether or not there is a fault in the signal light from the path 1. Therefore, if the optical transmission device 1 determines that there is no fault in the signal light from the path 1, the level control unit 3 attenuates the optical level of, from among the dummy light that is output from the dummy light output unit 4, the light having the same wavelength as the signal light from the path 1 to zero, for example. As a result of this, if there is no fault in the signal light from the path 1, dummy light having the same wavelength as the signal light from the path 1 is not input to the combining unit 2.

However, if the optical transmission device 1 determines that there is a fault in the signal light from the path 1 (step S2: yes), the level control unit 3 calculates the sum of the optical level of the signal light from the path 1 and the optical level of the dummy light that is output from the dummy light output unit 4 (step S3). The level control unit 3 then determines whether or not the sum of the optical levels calculated in step S3 is equal to a predetermined target value (step S4). In the present working example, in the determination made in step S4, the case where the sum of the optical levels calculated in step S3 is approximately equal to the predetermined target value is also treated as being included in the case where the sum of the optical levels calculated in step S3 is equal to the predetermined target value.

If the sum of the optical levels calculated in step S3 is not equal to the predetermined target value (step S4: no), the level control unit 3 controls the optical level of the dummy light in such a way that the sum of the optical level of the signal light from the path 1 and the optical level of the dummy light becomes the predetermined target value (step S5). Processing then returns to step S3.

The signal light from the path 1 and the optical-level controlled dummy light are combined by the combining unit 2. The light that is combined by the combining unit 2 is multiplexed with signal light from the path 2 by the multiplexing unit 5 and input to the optical amplification unit 6.

On the other hand, if the sum of the optical levels calculated in step S3 is equal to the predetermined target value (step S4: yes), since the insertion of, instead of the signal light from the path 1, dummy light having the same wavelength as the signal light from the path 1 has been completed (step S6), the optical transmission device 1 finishes the series of processing.

According to the optical transmission device 1 depicted in FIG. 1, and the optical transmission system 11 depicted in FIG. 2 or the optical transmission method depicted in FIG. 3, the level control unit 3 controls the optical output of dummy light in such a way that the sum of the optical level of the signal light from the path 1 and the optical level of the dummy light that is output from the dummy light output unit 4 becomes a predetermined target value. As a result of this, even if a fault occurs in the signal light from the path 1, light having the same wavelength as the wavelength of the signal light from the path 1 is supplied to the optical amplification unit 6 without there being a momentary interruption, and therefore light having a fixed power is input to the optical amplification unit 6. Therefore, because it is possible to avoid the occurrence of optical surges that are caused by sudden changes in the input level of the optical amplification unit 6, it is possible to avoid deterioration in the signal light from the path 2 that is multiplexed with the light from the path 1.

Second Example of an Optical Transmission Device

Figure 4:
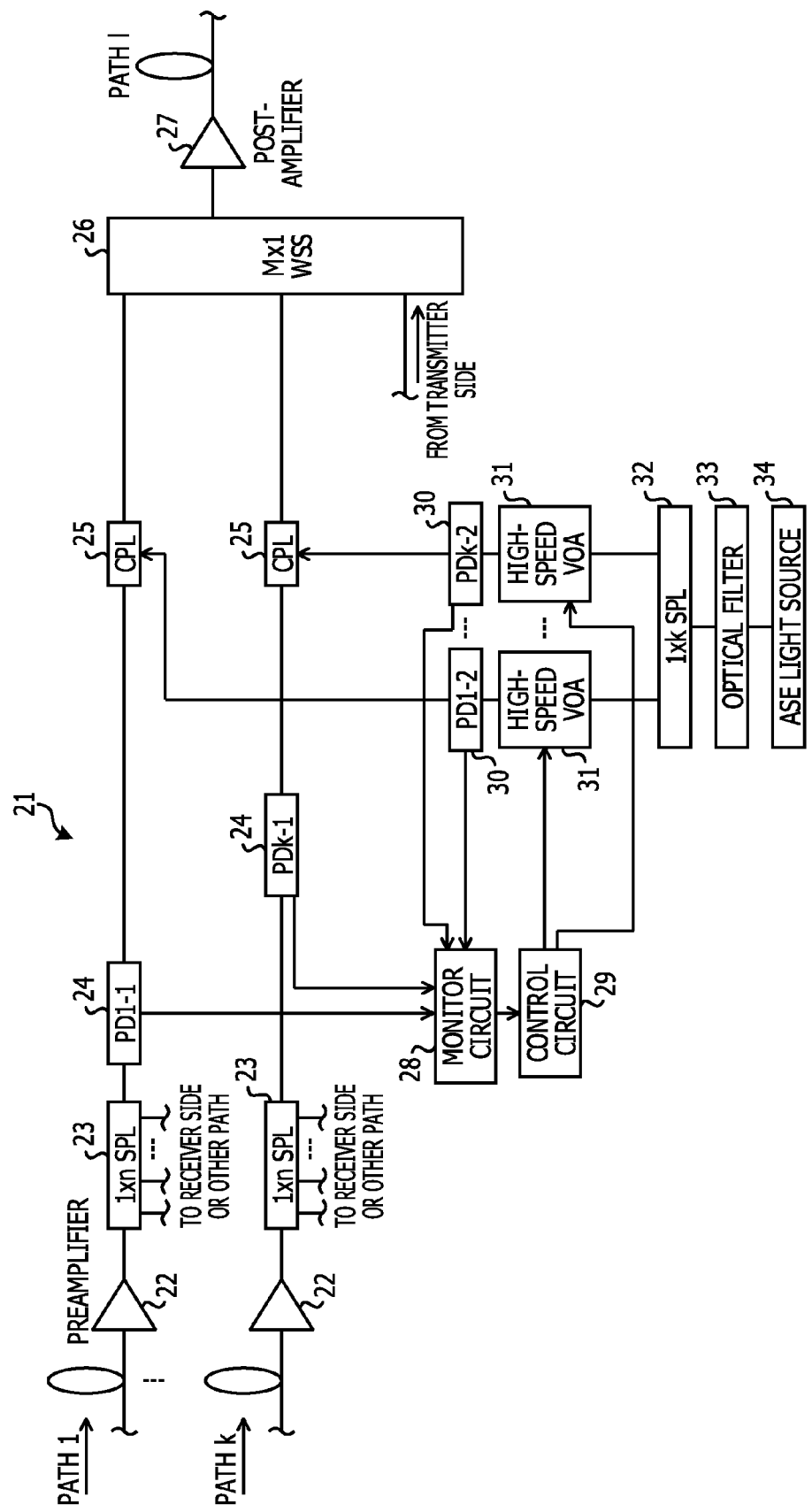
FIG. 4 is a drawing depicting a second example of an optical transmission device according to an embodiment.

FIG. 4 is a drawing depicting a second example of an optical transmission device according to the embodiment. As depicted in FIG. 4, an optical transmission device 21 has a reception unit that is not depicted, and has a pre-amplifier 22, a 1×n splitter (SPL) 23, a first photodetector (PD) 24, and a coupler (CPL) 25 for each of path 1 to path k. Furthermore, the optical transmission device 21 has an M×1 wavelength selective switch (WSS) 26, and a post-amplifier 27. k, n, and M are integers of 2 or more, and are values that are determined according to the optical transmission system.

The optical transmission device 21 may be a ROADM device, for example. In the present working example, a description is given with the optical transmission device 21 being a ROADM device.

The preamplifier 22 of each path is connected to the reception unit that is not depicted, via a respective optical transmission path. The reception unit may be connected to other optical transmission devices of an optical network. In the present working example, the optical transmission paths may be optical fibers or optical waveguides or the like. The preamplifiers 22 amplify wavelength-multiplexed light from each path, and compensate for loss among the optical transmission devices or within the optical transmission device 21 to improve photosensitivity.

The 1×n SPL 23 of each path is connected to the preamplifier 22 of the respective path via the respective optical transmission path. The 1×n SPL 23 branches the wavelength-multiplexed light that is output from the preamplifier 22 into n light beams, outputs one light beam from thereamong to a main-signal optical transmission path of each path (thru), and outputs the remaining light beams to a reception unit that is not depicted or a plurality of different paths (drop).

The first PD 24 of each path is connected to the 1×n SPL 23 of the respective path via the respective main-signal optical transmission path. The first PD 24 detects the optical level of the signal light that is output to the main-signal optical transmission path from the 1×n SPL 23, and outputs an electrical signal corresponding to the detected optical level. In FIG. 4, "PD1-1" is the first PD 24 provided in the path 1, and "PDk-1" is the first PD 24 provided in the path k.

Strictly speaking, 1×2 SPLs, the depiction of each of which has been omitted, are connected to the main-signal optical transmission paths that extend from the 1×n SPL 23 of each path. In these 1×2 SPLs, the signal light that is output from the 1×n SPLs 23 to the main-signal optical transmission paths is branched into two light beams, one light beam is output to a CPL 25, and the other light beam is output to a first PD 24. The first PDs 24 detect the optical level of the signal light that is output from the 1×2 SPLs.

The CPL 25 of each path is connected to the first PD 24 of the respective path via the respective main-signal optical transmission path. The CPL 25 combines signal light that is output from the 1×n SPL 23 to the main-signal optical transmission path, and dummy light that is output from a high-speed variable optical attenuator (VOA) 31 described hereafter. The CPL 25 is an example of the combining unit 2.

The M×1 WSS 26 is connected to the CPL 25 of each path via the respective main-signal optical transmission paths. Furthermore, the M×1 WSS 26 is connected to a transmitter the depiction of which has been omitted, and light from the transmitter is inserted into the M×1 WSS 26 (add). The M×1 WSS 26 passes or blocks, with respect to each wavelength, M-system light from each path and the transmitter, and outputs wavelength-multiplexed light in which the light that is output from the CPL 25 of each path to the main-signal optical transmission paths and the light inserted from the transmitter have been combined. The M×1 WSS 26 is an example of the multiplexing unit 5.

The number of wavelengths of the light that is input to the M×1 WSS 26 from the paths and the transmitter is, with the signal light and the dummy light combined, ordinarily the maximum number of wavelengths that are able to be handled as stipulated for each optical transmission system. That is, with the signal light and the dummy light combined, light of all of the wavelengths that are able to be handled by the system is input to the M×1 WSS 26 from the paths and the transmitter. Furthermore, the optical level of the light that is input to the M×1 WSS 26 from the paths and the transmitter is controlled so as to ordinarily be fixed.

The post-amplifier 27 is connected to the M×1 WSS 26 via an optical transmission path. The post-amplifier 27 is provided with high output and high saturation output characteristics, and amplifies the wavelength-multiplexed light that is output from the M×1 WSS 26 to the optical transmission path of path I in such a way as to be able to be transmitted over a long distance. Fixed-gain control may be used as the control method for the post-amplifier 27. Moreover, the post-amplifier 27 may be controlled using fixed-output power control. The post-amplifier 27 is an example of the optical amplification unit 6.

Furthermore, the optical transmission device 21 has a monitor circuit 28, a control circuit 29, second PDs 30, high-speed VOAs 31, a 1×k SPL 32, an optical filter 33, and an amplified spontaneous emission (ASE) light source 34.

Figure 5:
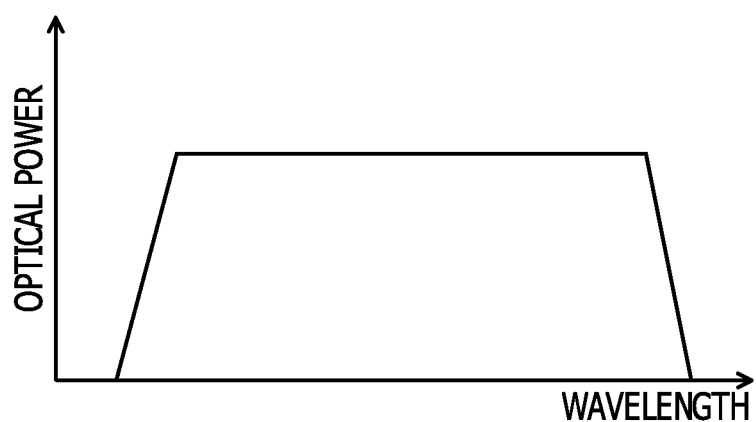
FIG. 5 is a drawing depicting the optical spectrum of output light of an ASE light source depicted in FIG. 4.

FIG. 5 is a drawing depicting the optical spectrum of output light of the ASE light source depicted in FIG. 4. As depicted in FIG. 5, the ASE light source 34 outputs an amplified spontaneous emission in which the optical spectrum continues across a wavelength band that includes all of the wavelengths that are able to be handled by the optical transmission system.

Figure 6:
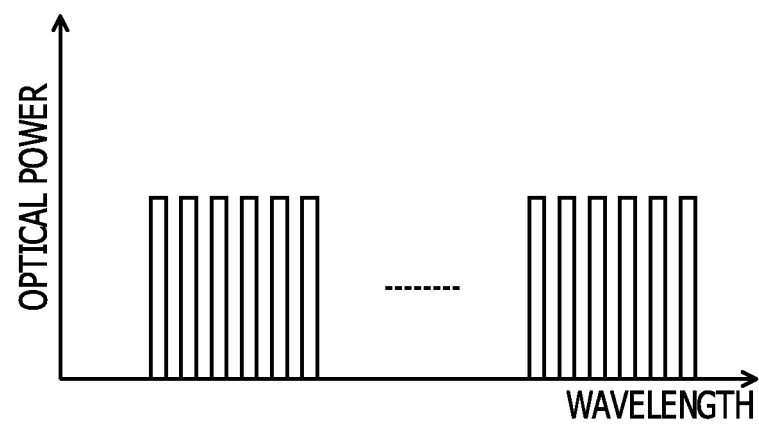
FIG. 6 is a drawing depicting the optical spectrum of output light of an optical filter depicted in FIG. 4.

The optical filter 33 is connected to the ASE light source 34 via an optical transmission path. FIG. 6 is a drawing depicting the optical spectrum of output light of the optical filter depicted in FIG. 4. As depicted in FIG. 6, the optical filter 33 generates, from the amplified spontaneous emission output from the ASE light source 34, dummy light having an optical spectral width that is approximately the same as the signal light in the wavelength of each signal light. The optical filter 33 has filter characteristics that are similar to the M×1 WSS 26, for example. Alternatively, it is possible for a WSS that is similar to the M×1 WSS 26 to be used as the optical filter 33. The ASE light source 34 and the optical filter 33 are examples of the dummy light output unit 4.

The 1×k SPL 32 is connected to the optical filter 33 via an optical transmission path. The 1×k SPL 32 branches the dummy light that is output from the optical filter 33 into k light beams and outputs these to the paths 1 to k, respectively.

The high-speed VOAs 31 are provided for each of the paths 1 to k, and are connected to the 1×k SPL 32 via optical transmission paths therefor. Furthermore, each of the high-speed VOAs 31 is connected to the control circuit 29 via electrical wiring. Based on a control signal from the control circuit 29, the high-speed VOAs 31 control the optical level of the dummy light from the 1×k SPL 32.

If it is determined that the optical level of the signal light is abnormal, with respect to the path that is determined as being abnormal, a high-speed VOA 31 controls the optical level of the dummy light in such a way that the sum of the optical level of the signal light determined as being abnormal and the optical level of the dummy light, namely the optical level of the light that is output from the CPL 25, becomes a predetermined target value.

The predetermined target value may be the optical level of the light that was being output from the CPL 25 prior to it being determined that the optical level of the signal light is abnormal, in other words, when normal signal light was being input to the main-signal optical transmission path of the path that is determined as being abnormal. The predetermined target value is preset with consideration being given to the monitoring precision of the first PDs 24 and the second PDs 30 and also the fluctuation of the signal light power. The high-speed VOAs 31 are an example of the level control unit 3.

The second PDs 30 are provided for each of the paths 1 to k, and are connected to the corresponding high-speed VOAs 31 via optical transmission paths therefor. The second PDs 30 detect the optical level of the dummy light that is output from the high-speed VOAs 31, and output an electrical signal corresponding to the optical level detected. In FIG. 4, "PD1-2" is the second PD 30 corresponding to the path 1, and "PDk-2" is the second PD 30 corresponding to the path k.

Strictly speaking, 1×2 SPLs, the depiction of each of which has been omitted, are connected to optical transmission paths that extend from the high-speed VOAs 31 corresponding to each path. In these 1×2 SPLs, the signal light that is output from the second PDs 30 to the optical transmission path is branched into two light beams, one light beam is output to a CPL 25, and the other light beam is output to a second PD 30. The second PDs 30 detect the optical level of the dummy light that is output from the 1×2 SPLs.

The monitor circuit 28 is connected to the first PDs 24 and the second PDs 30 via electrical wiring. The monitor circuit 28 collects the optical levels of the signal light of each path from the first PDs 24. Furthermore, the monitor circuit 28 collects the optical levels of the dummy light corresponding to each path from the second PDs 30. With respect to the collected results, the monitor circuit 28, for example, performs corrections with consideration being given to loss in the CPLs 25 and loss in the 1×2 SPLs, the depiction of which has been omitted, in the first PDs 24 and the second PDs 30, and outputs the corrected results to the control circuit 29.

The loss in the CPLs 25 and the loss in the 1×2 SPLs may be acquired in advance and retained in the monitor circuit 28 or the control circuit 29, for example. The monitor circuit 28 is able to calculate the optical level of the light that is output from each CPL 25, based on the optical levels of the signal light collected from the first PDs 24, the optical levels of the dummy light collected from the second PDs 30, the loss in the CPLs 25, and the loss in the 1×2 SPLs, the depiction of which has been omitted.

The control circuit 29 is connected to the monitor circuit 28 via electrical wiring. The control circuit 29 receives, from the monitor circuit 28, the optical level of the signal light of each path detected by the first PDs 24, and based on the optical level of the signal light of each path, determines whether or not there is a fault in the signal light from each path. If it is determined that there is a fault in the signal light, the control circuit 29 outputs, to the high-speed VOA 31 corresponding to the path in which it has been determined that there is a fault, a control signal with which the optical level of the dummy light is controlled in such a way that the sum of the optical level of the signal light and the optical level of the dummy light becomes a predetermined target value.

Figure 7:
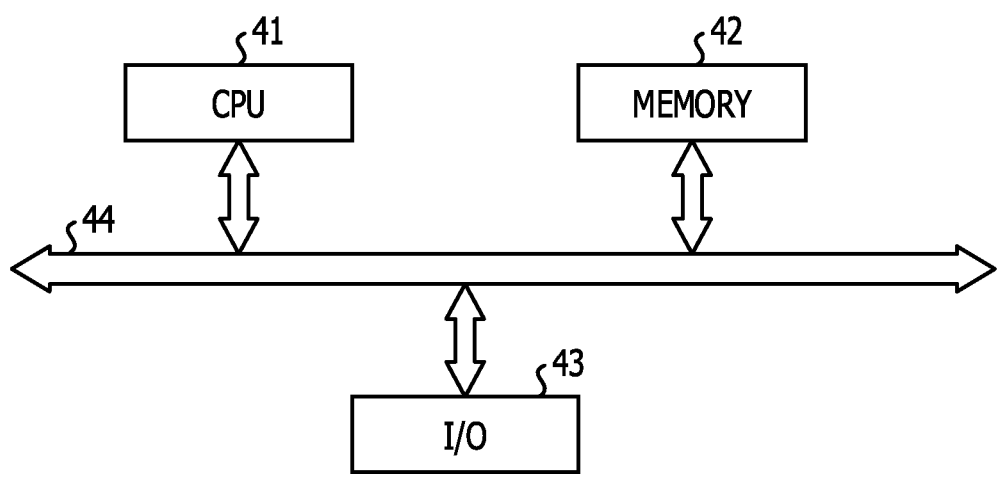
FIG. 7 is a drawing depicting an example of the hardware configuration of a monitor circuit and a control circuit depicted in FIG. 4.

FIG. 7 is a drawing depicting an example of the hardware configuration of the monitor circuit and the control circuit depicted in FIG. 4. As depicted in FIG. 7, the monitor circuit 28 and the control circuit 29 may have a configuration in which a central processing unit (CPU) 41, a memory 42, and an I/O 43 are connected to a bus 44, for example.

The CPU 41 reads boot programs and application programs from the memory 42 and executes these programs. The memory 42 stores the boot programs and the application programs. Furthermore, the memory 42 is used as a work area for the CPU 41. The I/O 43 is connected to the first PDs 24, the second PDs 30, and the high-speed VOAs 31, and controls the input of signals from the first PDs 24 and the second PDs 30, and the output of signals to the high-speed VOAs 31.

Figure 8:
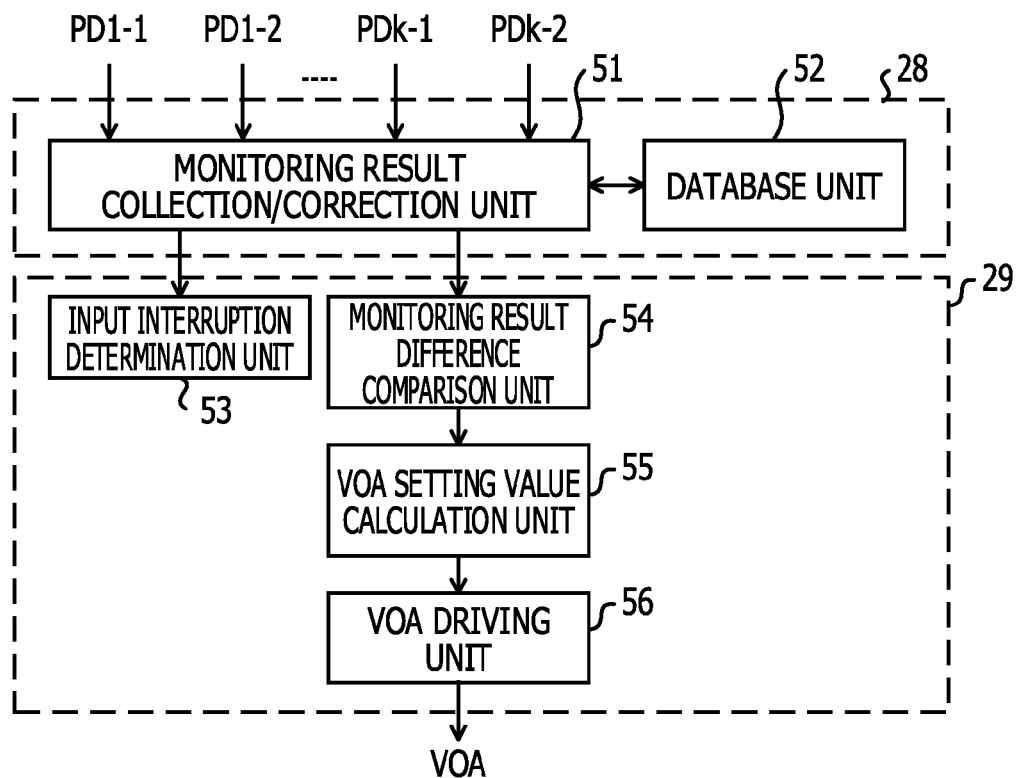
FIG. 8 is a drawing depicting an example of the functional configuration of the monitor circuit and the control circuit depicted in FIG. 4.

FIG. 8 is a drawing depicting an example of the functional configuration of the monitor circuit and the control circuit depicted in FIG. 4. As depicted in FIG. 8, the monitor circuit 28 may have a monitoring result collection/correction unit 51 and a database unit 52, for example. The database unit 52 includes data regarding loss in the CPLs 25 and loss in the 1×2 SPLs in the first PDs 24 and the second PDs 30, for example. The database unit 52 may include data regarding the wavelengths of the signal light and the dummy light of each path.

The monitoring result collection/correction unit 51 collects the optical levels of the signal light of each path from the first PDs 24, and collects the optical levels of the dummy light corresponding to each path from the second PDs 30. The monitoring result collection/correction unit 51 acquires, from the database unit 52, the data regarding loss in the CPLs 25 and loss in the 1×2 SPLs in the first PDs 24 and the second PDs 30, for example. The monitoring result collection/correction unit 51 uses the data regarding loss acquired from the database unit 52 to correct the optical levels of the signal light and the dummy light collected from the first PDs 24 and the second PDs 30.

The control circuit 29 may have an input interruption determination unit 53, a monitoring result difference comparison unit 54, a VOA setting value calculation unit 55, and a VOA driving unit 56. The input interruption determination unit 53 receives, from the monitoring result collection/correction unit 51, the optical levels of the signal light of each path detected by the first PDs 24, and based on the optical levels of the signal light of each path, determines whether or not there is a fault in the signal light from each path, namely whether or not there is an interruption in the input of the signal light. For example, the input interruption determination unit 53 may compare the optical levels of the signal light of each path with a preset threshold value, and may determine that there is an interruption in the input of signal light with respect to a path in which the optical level of signal light is lower than the threshold value.

The monitoring result difference comparison unit 54 receives the optical levels of the signal light of each path and the optical levels of the dummy light corresponding to each path from the monitoring result collection/correction unit 51, and calculates the sum of the optical level of the signal light and the optical level of the dummy light with respect to a path in which it has been determined by the input interruption determination unit 53 that there is a fault in the signal light. The monitoring result difference comparison unit 54 calculates the difference between the calculated sum of the optical level of the signal light and the optical level of the dummy light and a predetermined threshold value. The database unit 52 may include the predetermined target value.

The VOA setting value calculation unit 55 receives the difference between the sum of the optical level of the signal light and the optical level of the dummy light and the predetermined target value from the monitoring result difference comparison unit 54, and based on that difference, calculates an attenuation amount for the high-speed VOA 31 corresponding to the path in which it has been determined by the input interruption determination unit 53 that there is a fault in the signal light. For example, the VOA setting value calculation unit 55 calculates the attenuation amount for the high-speed VOA 31 in such a way that the difference calculated by the monitoring result difference comparison unit 54 becomes zero.

The VOA driving unit 56 receives, from the VOA setting value calculation unit 55, the attenuation amount for the high-speed VOA 31 corresponding to the path in which it has been determined by the input interruption determination unit 53 that there is a fault in the signal light, and based on that attenuation amount, outputs to the high-speed VOA 31 corresponding to the path in which it has been determined that there is a fault, a control signal that drives that high-speed VOA 31.

The monitoring result collection/correction unit 51, the input interruption determination unit 53, the monitoring result difference comparison unit 54, the VOA setting value calculation unit 55, and the VOA driving unit 56 may be realized by the CPU 41 executing a program that realizes the optical transmission method described hereafter. Alternatively, the monitoring result collection/correction unit 51, the input interruption determination unit 53, the monitoring result difference comparison unit 54, the VOA setting value calculation unit 55, and the VOA driving unit 56 may be realized by using hardware. For example, a digital signal processor (DSP) and a field programmable gate array (FPGA) may be used instead of the CPU 41. The database unit 52 may be realized by using the memory 42.

Second Example of an Optical Transmission Method

Figure 9:
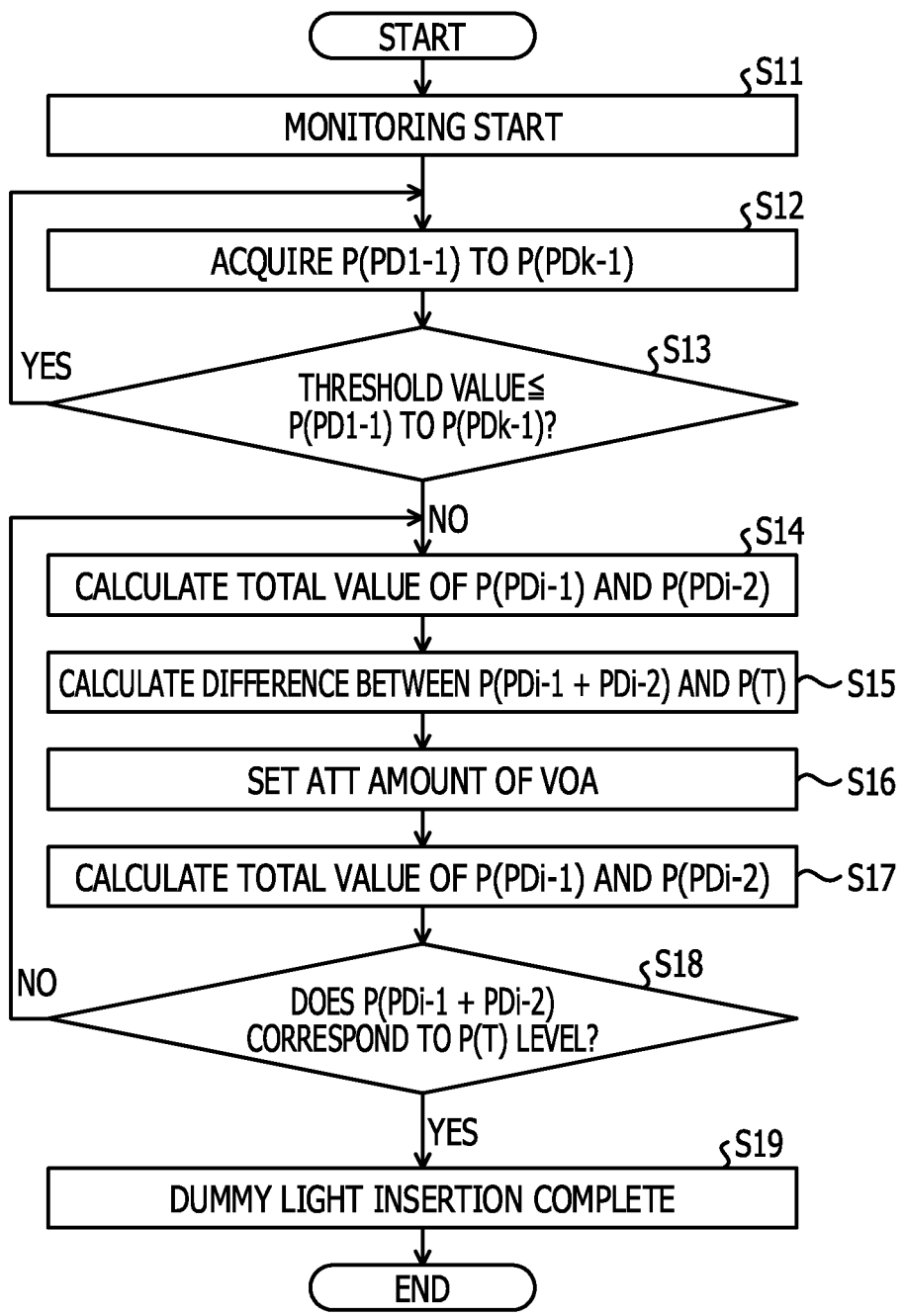
FIG. 9 is a drawing depicting a second example of an optical transmission method according to an embodiment.

FIG. 9 is a drawing depicting a second example of the optical transmission method according to the embodiment. The optical transmission method depicted in FIG. 9 may be carried out by the optical transmission device depicted in FIG. 4, for example. In the present working example, the optical transmission method is described as being carried out by the optical transmission device depicted in FIG. 4.

When optical transmission starts in the optical transmission device 21 depicted in FIG. 4, the optical transmission device 21 starts the monitoring of the optical levels of the signal light by the first PDs 24, and the optical levels of the dummy light by the second PDs 30 (step S11). The monitoring result collection/correction unit 51 then acquires, from the first PDs 24, the optical levels of the signal light of each path, namely each output power P(PD1-1) to P(PDk-1) of the PD1-1 to PDk-1 (step S12).

Next, the input interruption determination unit 53 determines whether or not each output power P(PD1-1) to P(PDk-1) of the PD1-1 to PDk-1 is equal to or greater than a preset threshold value (step S13). The database unit 52 may include the threshold value. If each output power P(PD1-1) to P(PDk-1) is equal to or greater than the threshold value (step S13: yes), processing returns to step S12.

If any of the output powers P(PD1-1) to P(PDk-1) is not equal to or greater than the threshold value (step S13: no), processing advances to step S14. In the present working example, a description is given in which the output power P(PDi-1) of the PDi-1 of path i is not equal to or greater than the threshold value, for example. i is an integer from ≥1 to ≤k.

In step S14, the monitoring result collection/correction unit 51 acquires the optical level of the dummy light corresponding to the path i from the second PD 30 corresponding to the path i, namely the output power P(PDi-2) of the PDi-2. Furthermore, the monitoring result collection/correction unit 51 uses data regarding loss acquired from the database unit 52 to correct the output power P(PDi-2) of the PDi-2. The monitoring result difference comparison unit 54 then calculates the total value P(PDi-1+PDi-2) of the output power P(PDi-1) of the PDi-1 and the output power P(PDi-2) of the PDi-2 that has been corrected (step S14).

Next, the monitoring result difference comparison unit 54 calculates the difference between the total value P(PDi-1+PDi-2) calculated in step S14 and a predetermined target value, namely a target power P(T) (step S15). Next, based on the difference calculated in step S15, the VOA setting value calculation unit 55 calculates an attenuation amount for the high-speed VOA 31 corresponding to the path i. Then, based on the attenuation amount calculated by the VOA setting value calculation unit 55, the VOA driving unit 56 outputs a control signal to the high-speed VOA 31 corresponding to the path i, and sets the attenuation amount (ATT amount) for that high-speed VOA 31 (step S16).

Next, the monitoring result collection/correction unit 51 once again calculates the total value P(PDi-1+PDi-2) of the output power P(PDi-1) of the PDi-1 and the output power P(PDi-2) of the PDi-2 that has been corrected (step S17). The monitoring result difference comparison unit 54 then determines whether or not the total value P(PDi-1+PDi-2) calculated in step S17 is of a level that corresponds to the target power P(T) level (step S18).

If the total value P(PDi-1+PDi-2) calculated in step S17 is not of a level that corresponds to the target power P(T) level (step S18: no), processing returns to step S14. On the other hand, if the total value P(PDi-1+PDi-2) calculated in step S17 is of a level that corresponds to the target power P(T) level (step S18: yes), the insertion of, instead of the signal light from the path i, dummy light having the same wavelength as the signal light from the path i has been completed (step S19), and the optical transmission device 21 therefore finishes the series of processing. In the present working example, in the determination performed in step S18, if the total value P(PDi-1+PDi-2) calculated in step S17 is approximately equal to the target power P(T), the total value P(PDi-1+PDi-2) is treated as being of a level that corresponds to the target power P(T) level.

First Example of a Wavelength Arrangement

Figure 10:
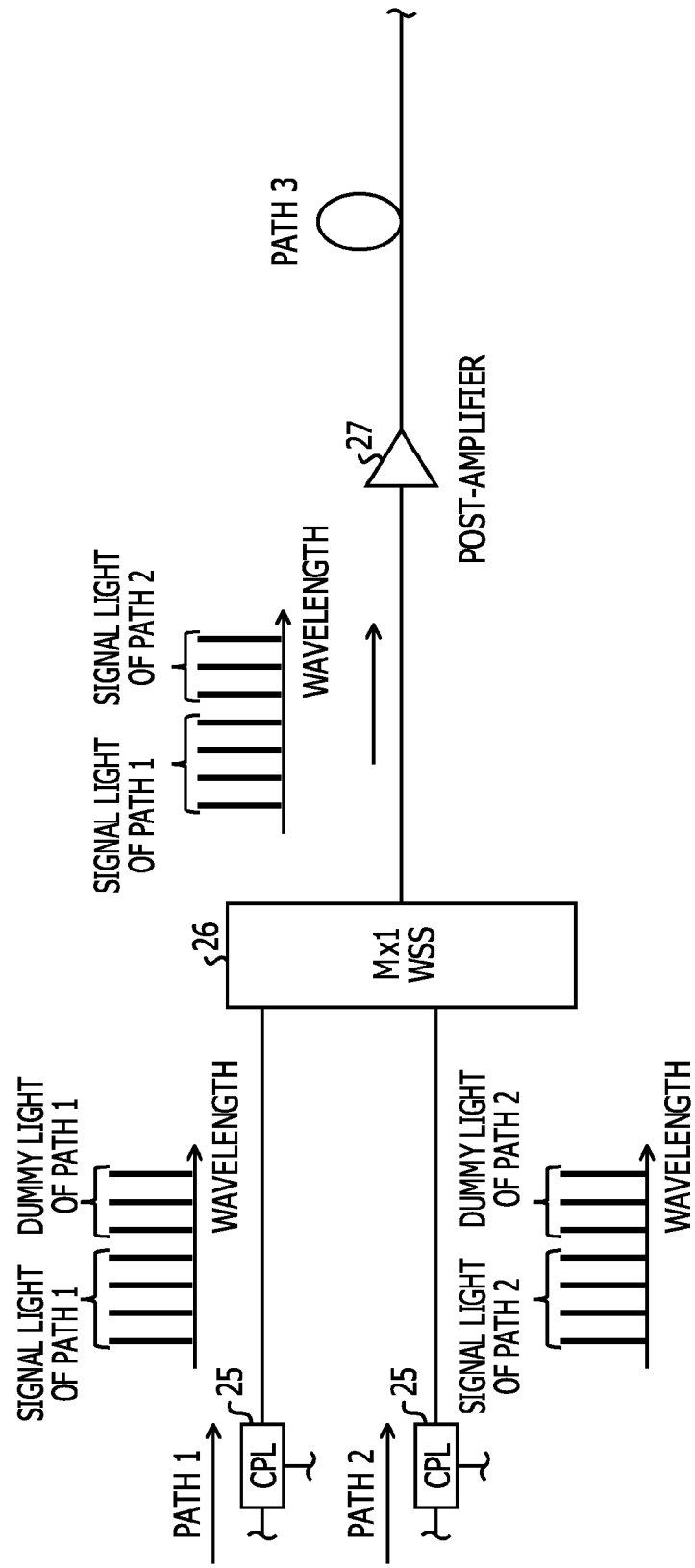
FIG. 10 is a drawing depicting a wavelength arrangement example when the optical transmission device depicted in FIG. 4 operates as normal.
Figure 11:
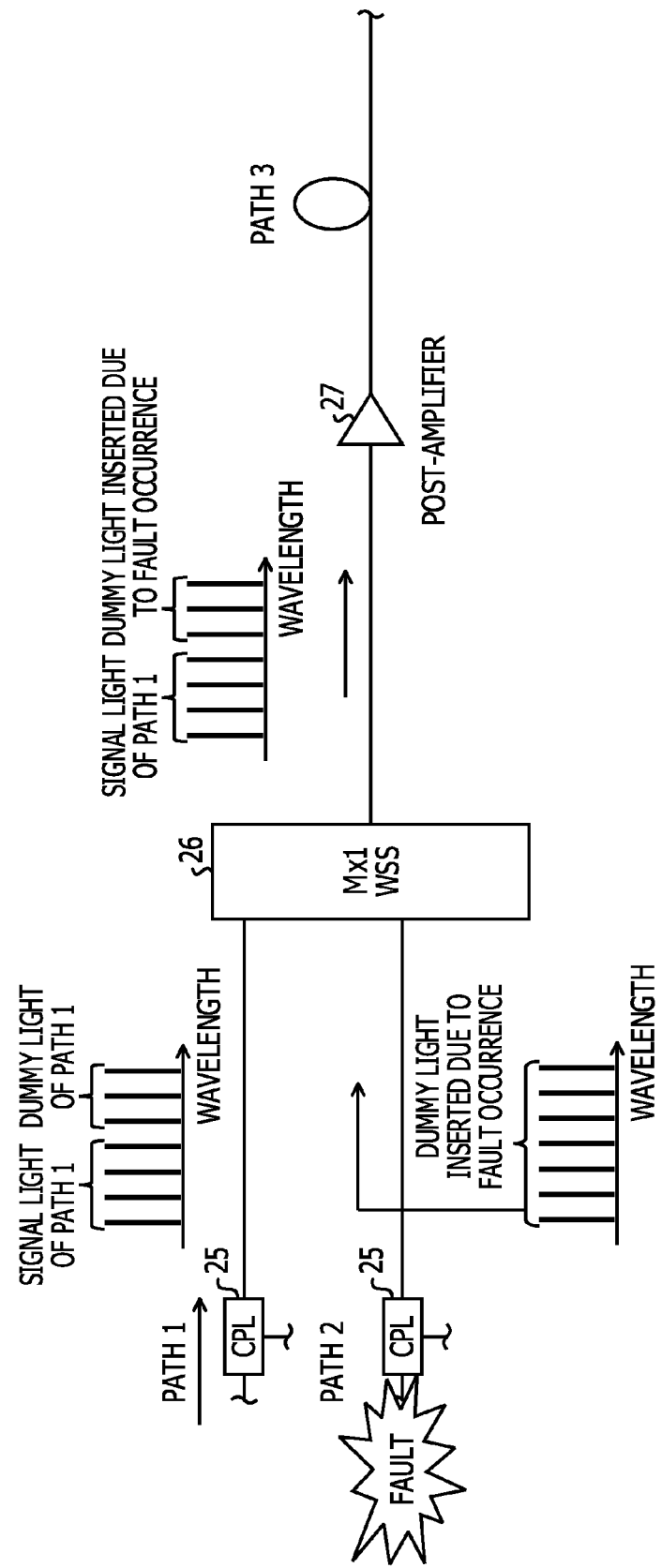
FIG. 11 is a drawing depicting a wavelength arrangement example when the optical transmission device depicted in FIG. 4 has a fault.

FIG. 10 is a drawing depicting a wavelength arrangement example when the optical transmission device depicted in FIG. 4 operates as normal. FIG. 11 is a drawing depicting a wavelength arrangement example when the optical transmission device depicted in FIG. 4 has a fault. In the present working example, in order to simplify the description, the case where light from the path 1 and light from the path 2 are multiplexed by the M×1 WSS 26 and output to a path 3 is described as an example.

As depicted in FIG. 10, normally, the signal light of the path 1 and dummy light having the same wavelength as the wavelength of the signal light of the path 2 are input to the M×1 WSS 26 from the path 1. Furthermore, normally, the signal light of the path 2 and dummy light having the same wavelength as the wavelength of the signal light of the path 1 are input to the M×1 WSS 26 from the path 2. Normally, in the M×1 WSS 26, the dummy light of the path 1 that is input from the path 1 and the dummy light of the path 2 that is input from the path 2 are blocked, and the signal light of the path 1 and the signal light of the path 2 are output to the path 3 from the M×1 WSS 26.

As depicted in FIG. 11, if the signal light is no longer input from the path 2 due to a fault that has occurred in the path 2, dummy light having the same wavelength as the wavelength of the signal light of the path 2 is input to the path 2. As a result of this, dummy light having the same wavelength as the wavelength of the signal light of the path 2, and dummy light having the same wavelength as the wavelength of the signal light of the path 1 are input to the M×1 WSS 26 from the path 2. Furthermore, as is normal for the path 1, the signal light of the path 1 and dummy light having the same wavelength as the wavelength of the signal light of the path 2 are input to the M×1 WSS 26. When there is a fault in the path 2, in the M×1 WSS 26, the dummy light of the path 1 that is input from the path 1 and dummy light that is input from the path 2 and has the same wavelength as the wavelength of the signal light of the path 1 are blocked, and the signal light of the path 1 and the dummy light having the same wavelength as the wavelength of the signal light of the path 2 are output to the path 3 from the M×1 WSS 26.

Example of Changes in Post-Amplifier Input Power When There Is a Fault

Figure 12:
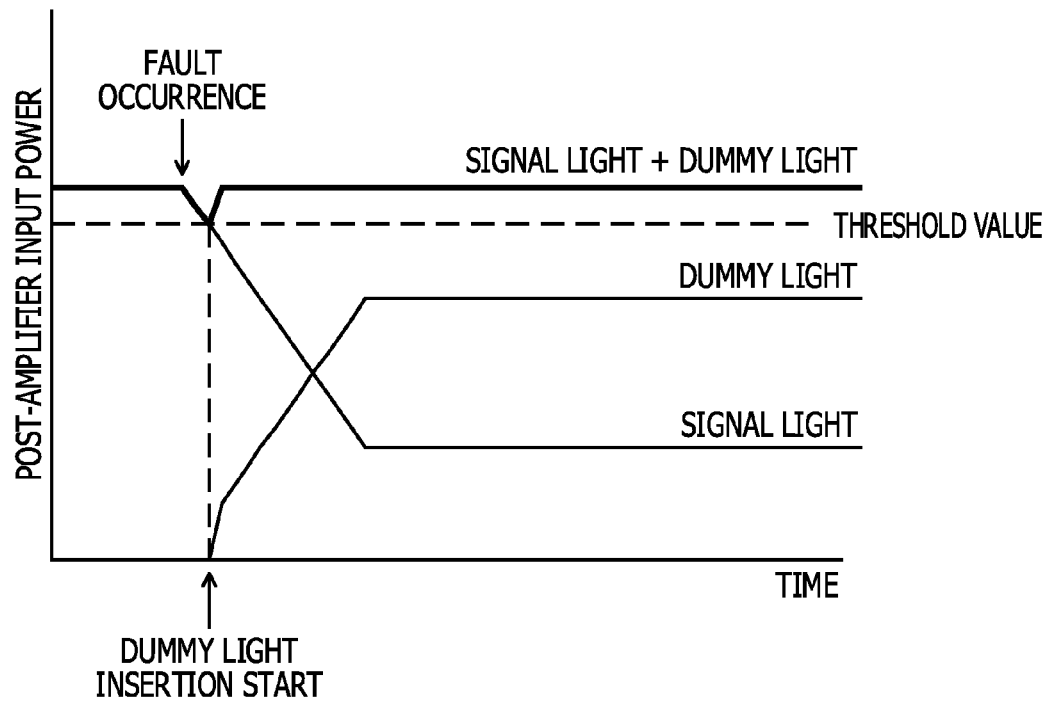
FIG. 12 is a drawing depicting changes in post-amplifier input power when there is a fault in the optical transmission device depicted in FIG. 4.

FIG. 12 is a drawing depicting changes in post-amplifier input power when there is a fault in the optical transmission device depicted in FIG. 4. As depicted in FIG. 12, if the signal light from a certain path is no longer input due to a fault that has occurred in that path, the power of the signal light from that path in which the fault has occurred decreases. If the power of the signal light reaches a threshold value, the insertion of dummy light instead of that signal light which is no longer input starts. After the insertion of the dummy light, the power of the dummy light is controlled in such a way that the power of the signal light that decreases and the power of the dummy light that increases become the power prior to when the fault occurred, for example. As a result of this, after the fault occurs, the sum of the power of the signal light and the power of the dummy light immediately returns to the power prior to when the fault occurred, for example.

It generally takes, for example, a period of time of the order of 100 μs to several ms for the power of signal light to become zero from the occurrence of an input interruption. In contrast to this, the time that it takes from the control circuit 29 outputting, to a high-speed VOA 31, a control signal that drives the high-speed VOA 31 to the high-speed VOA 31 outputting dummy light is of the order of several ns to several μs, for example. In other words, the insertion of the dummy light is started before the power of the signal light becomes notably low.

According to the optical transmission device 21 depicted in FIG. 4 or the optical transmission method depicted in FIG. 9, the control circuit 29 and the high-speed VOAs 31 control the optical level of dummy light in such a way that the sum of the optical level of signal light from a path in which a fault has occurred, and the optical level of dummy light that is output from a high-speed VOA 31 becomes the predetermined target value. As a result of this, even if the input of signal light is interrupted, dummy light having the same wavelength as the input-interrupted signal light is supplied to the post-amplifier 27 without there being a momentary interruption, and therefore light having a fixed power is input to the post-amplifier 27. Furthermore, light of all of the wavelengths that are able to be handled by the system is input to the M×1 WSS 26 from each path, and the optical level of that input light is controlled so as to ordinarily be fixed, and therefore light having a fixed power is input to the post-amplifier 27. Therefore, because it is possible to avoid the occurrence of optical surges that are caused by sudden changes in the input level of the post-amplifier 27, it is possible to avoid deterioration in the signal light from other paths that is multiplexed with the light from a path in which a fault has occurred.

Furthermore, in the case where there is fluctuation in the gain wavelength characteristics of the post-amplifier 27, if the number of wavelengths input to the post-amplifier 27 changes due to a fault or the like, residual signal gain, namely the output power, sometimes changes before and after the occurrence of a fault or the like. In contrast to this, according to the optical transmission device 21 depicted in FIG. 4, light of all of the wavelengths that are able to be handled by the system is invariably input to the post-amplifier 27, and it is therefore possible to avoid changes in the output power before and after the occurrence of a fault or the like.

Furthermore, according to the optical transmission device 21 depicted in FIG. 4, by using the high-speed VOAs 31, it is possible for dummy light having the same wavelength as the wavelength of signal light the input of which has been interrupted due to the occurrence of a fault, to be input to the post-amplifier 27 without there being a momentary interruption.

Third Example of an Optical Transmission Device

Figure 13:
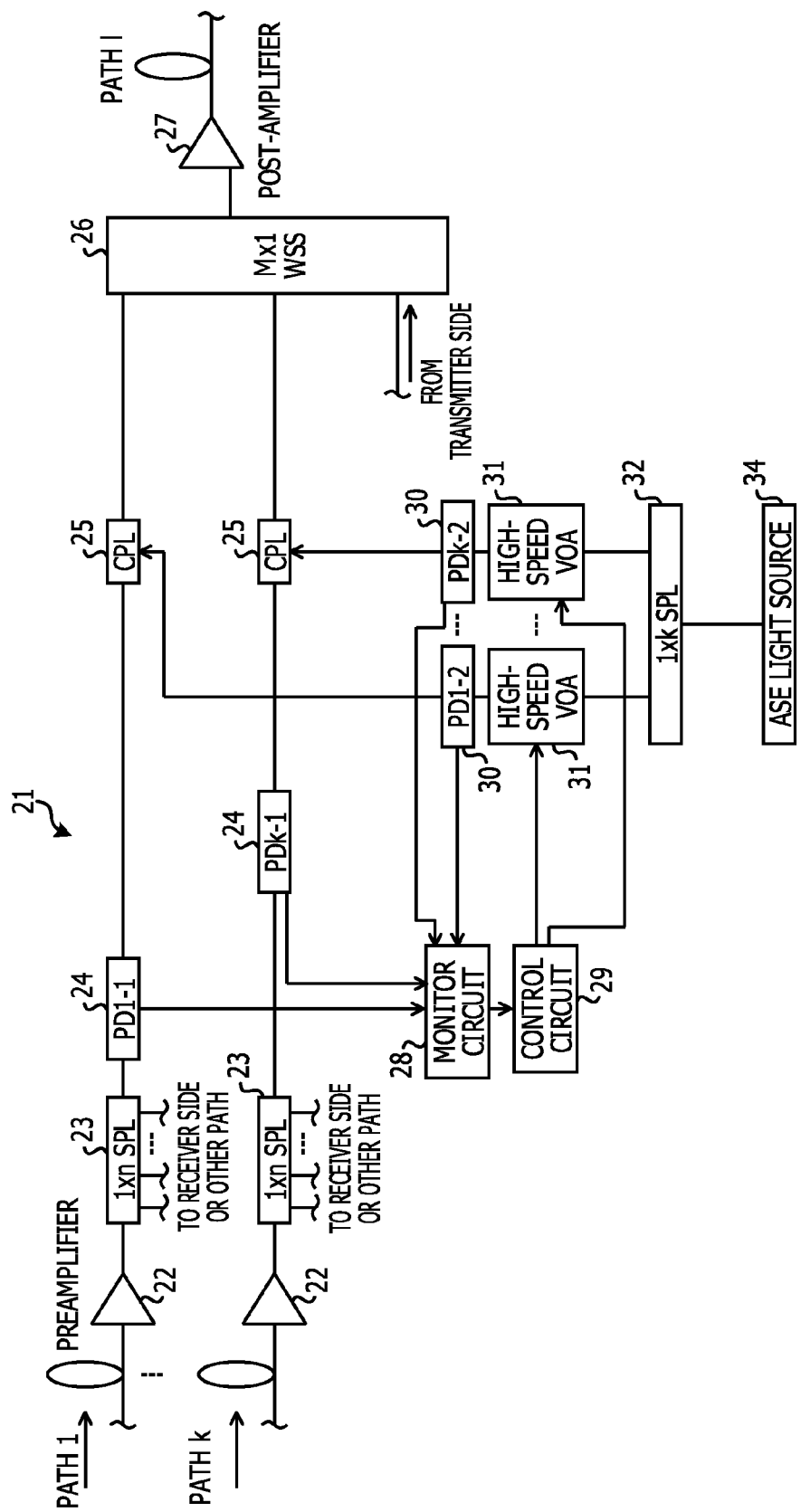
FIG. 13 is a drawing depicting a third example of an optical transmission device according to an embodiment.

FIG. 13 is a drawing depicting a third example of an optical transmission device according to the embodiment. As depicted in FIG. 13, the optical transmission device 21 may have a configuration that does not include the optical filter 33.

Figure 14:
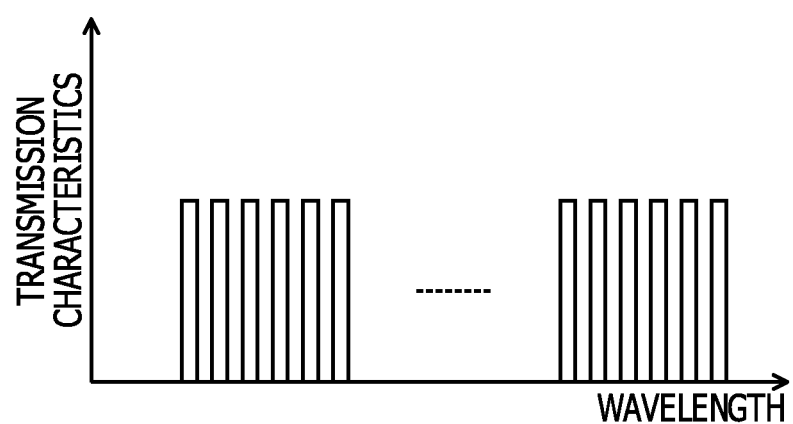
FIG. 14 is a drawing depicting the transmission characteristics of an M×1 WSS depicted in FIG. 13.

FIG. 14 is a drawing depicting the transmission characteristics of the M×1 WSS depicted in FIG. 13. The amplified spontaneous emission that is output from the ASE light source 34 is light in which the optical spectrum continues across the entire signal wavelength band (see FIG. 5). The regions between the wavelengths of the signal light become stopbands due to the M×1 WSS 26, which has the transmission characteristics depicted in FIG. 14, and therefore, in the M×1 WSS 26, light having an optical spectral width that is approximately the same as the signal light in the wavelength of each signal light is generated from the amplified spontaneous emission.

Figure 15:
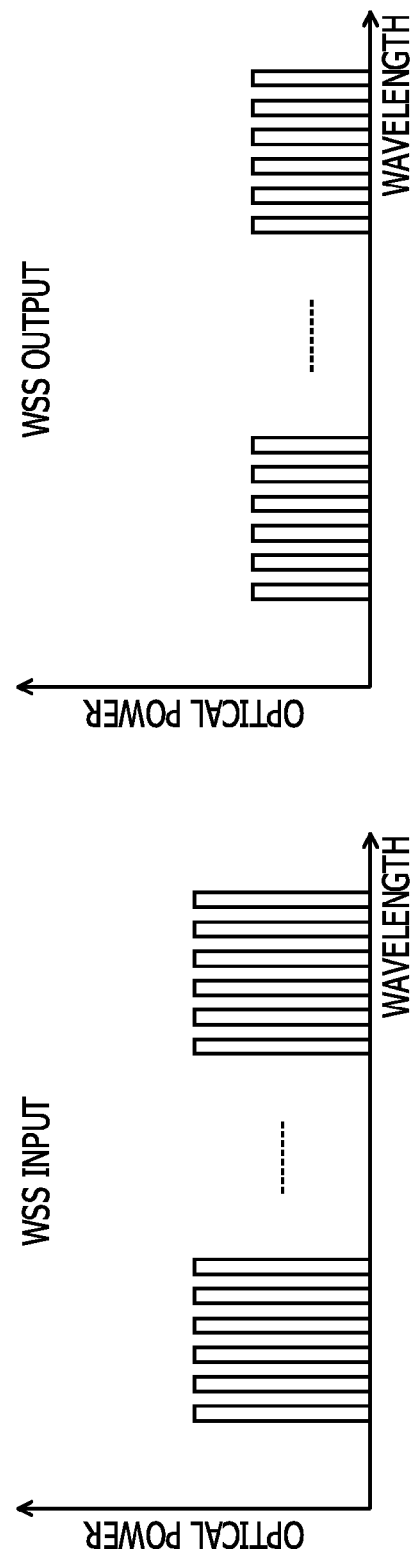
FIG. 15 is a drawing depicting the optical spectra of input light for the WSS and output light of the WSS in the case of only signal light.
Figure 16:
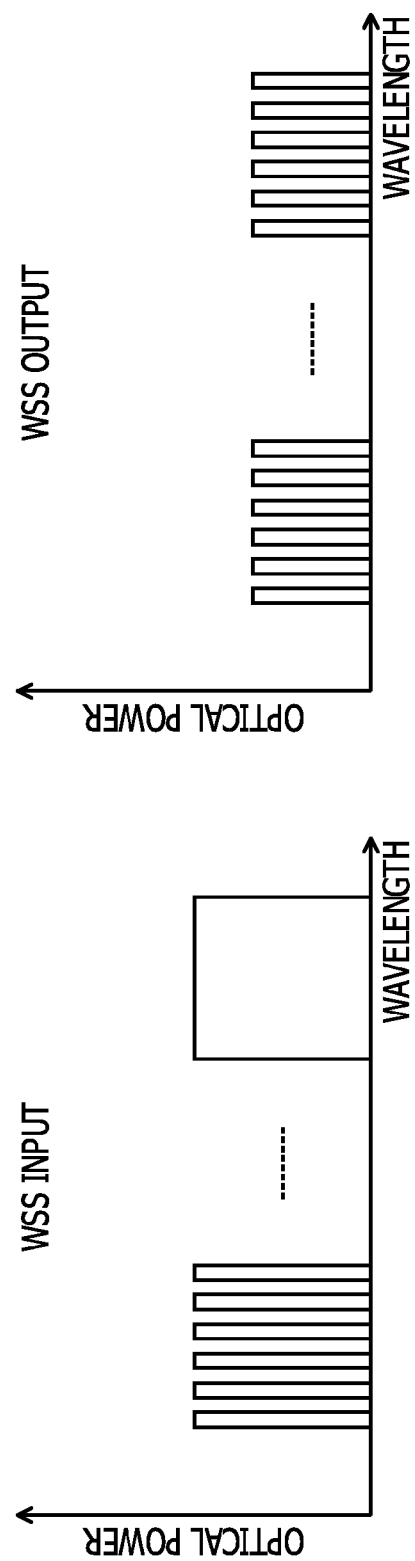
FIG. 16 is a drawing depicting the optical spectra of input light for the WSS and output light of the WSS in the case where dummy light is added.

FIG. 15 is a drawing depicting the optical spectra of input light for the WSS and output light of the WSS in the case of only signal light. FIG. 16 is a drawing depicting the optical spectra of input light for the WSS and output light of the WSS in the case where dummy light is added. The regions between the wavelengths of the signal light become stopbands due to the filter characteristics of the M×1 WSS 26, and therefore a portion of the dummy light that is output from the ASE light source 34 is blocked. Consequently, as depicted in FIG. 15 and FIG. 16, even when the total power of the signal light and the dummy light that is output from the CPLs 25 is set to a predetermined power, the power of the light after having passed through the M×1 WSS 26 sometimes falls below the predetermined power.

If the power of the light after having passed through the WSS falls below the predetermined power, it is desirable for the transmission characteristics of the M×1 WSS 26 to be acquired in advance, and the power of the dummy light to be adjusted to compensate for the reduction in the dummy light due to the WSS. For example, a correction coefficient for the power reduction due to the stopbands of the M×1 WSS 26 is taken as K. K is a value that is greater than 0 and less than 1. In this case, in the control circuit 29, it is desirable for the total value of a value obtained by multiplying the output power P(PDi-2) of the PDi-2 by K, and the output power P(PDi-1) of the PDi-1 to be calculated, and for the attenuation amount of the high-speed VOAs 31 to be set based on the difference between this total value and the target power P(T).

The configuration besides this is the same as in the second example of the optical transmission device depicted in FIG. 4, and a description thereof is redundant and has therefore been omitted.

According to the optical transmission device 21 depicted in FIG. 13, as in the second example of the optical transmission device depicted in FIG. 4, light having a fixed power is input to the post-amplifier 27 even if the input of signal light is interrupted, and it is therefore possible to avoid the occurrence of optical surges, and to avoid deterioration in the signal light from other paths that is multiplexed with the light from a path in which a fault has occurred. Furthermore, because there is no optical filter 33, it is possible to achieve a reduction in cost due to the reduction in the number of components, and a reduction in cost due to the reduction in the assembly workload.

Fourth Example of an Optical Transmission Device

Figure 17:
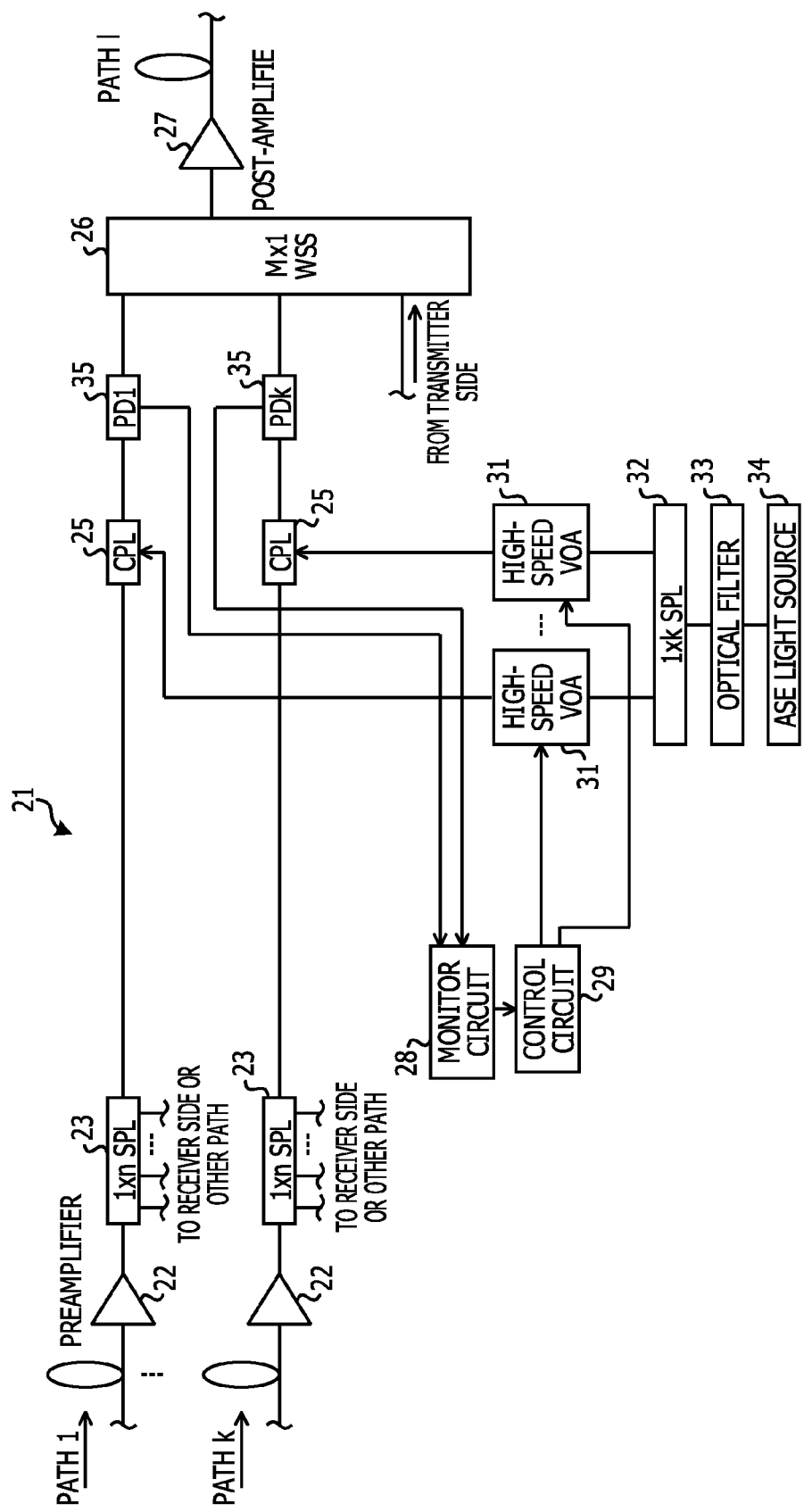
FIG. 17 is a drawing depicting a fourth example of an optical transmission device according to an embodiment.

FIG. 17 is a drawing depicting a fourth example of an optical transmission device according to the embodiment. As depicted in FIG. 17, the optical transmission device 21 may have a configuration in which, in each of the paths 1 to k, the first PDs 24 and the second PDs 30 are not provided, and instead PDs 35 are provided at the output side of the CPLs 25. The PDs 35 detect the optical level of the light that is output from the CPLs 25, and output an electrical signal corresponding to the optical level detected. The CPLs 25 output light in which signal light and dummy light have been combined. In FIG. 17, "PD1" is the PD 35 provided in the path 1, and "PDk" is the PD 35 provided in the path k.

Strictly speaking, 1×2 SPLs, the depiction of which has been omitted, are each connected to main-signal optical transmission paths that extend from the CPLs 25 of each path. In these 1×2 SPLs, the light that is output from the CPLs 25 to the main-signal optical transmission paths is branched into two light beams, one light beam is output to the M×1 WSS 26, and the other light beam is output to a PD 35. The PDs 35 detect the optical level of the light that is output from the 1×2 SPLs.

The monitor circuit 28 is connected to each PD 35 via electrical wiring. The monitor circuit 28 collects, from each PD 35, the optical levels of light in which signal light and dummy light have been combined in each path. With respect to the collected results, the monitor circuit 28, for example, performs corrections with consideration being given to loss in the CPLs 25 and loss in the 1×2 SPLs, the depiction of which has been omitted, in the PDs 35, and outputs the corrected results to the control circuit 29. Data regarding loss in the 1×2 SPLs, the depiction of which has been omitted, in the PDs 35 may be acquired in advance and retained in the database unit 52, for example.

The control circuit 29 receives, from the monitor circuit 28, the optical levels of light in which signal light and dummy light have been combined in each path, detected by the PDs 35, and based on the optical levels of the signal light of each path, determines whether or not there is a fault in the signal light from each path. If it is determined that there is a fault in the signal light, the control circuit 29 outputs, to the high-speed VOA 31 corresponding to the path in which it has been determined that there is a fault, a control signal with which the optical level of the dummy light is controlled in such a way that the optical level of the light in which the signal light and the dummy light are combined becomes a predetermined target value.

The configuration besides this is the same as in the second example of the optical transmission device depicted in FIG. 4, and a description thereof is redundant and has therefore been omitted. Moreover, as in the third example of the optical transmission device depicted in FIG. 13, the optical filter 33 may not be provided. Furthermore, the PD 35 of each path may be provided at the input side of the CPLs 25.

According to the optical transmission device 21 depicted in FIG. 17, the control circuit 29 and the high-speed VOAs 31 control the optical level of dummy light in such a way that the optical level of light in which the signal light from a path in which a fault has occurred and dummy light that is output from a high-speed VOA 31 have been combined by a CPL 25 becomes the predetermined target value. As a result of this, as in the second example of the optical transmission device depicted in FIG. 4, light having a fixed power is input to the post-amplifier 27 even if the input of signal light is interrupted, and it is therefore possible to avoid the occurrence of optical surges, and to avoid deterioration in the signal light from other paths that is multiplexed with the light from a path in which a fault has occurred.

Fifth Example of an Optical Transmission Device

Figure 18:
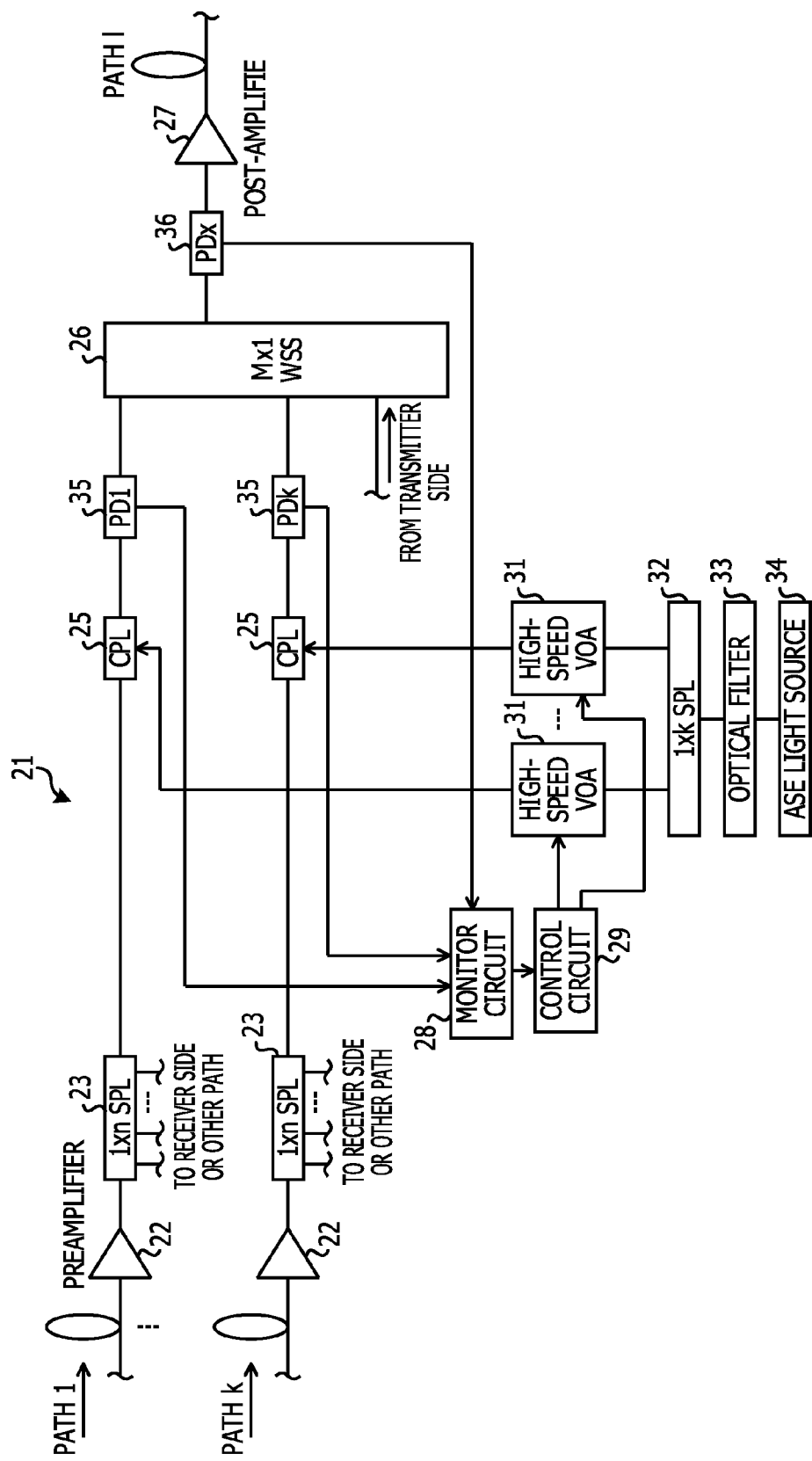
FIG. 18 is a drawing depicting a fifth example of an optical transmission device according to an embodiment.

FIG. 18 is a drawing depicting a fifth example of an optical transmission device according to the embodiment. As depicted in FIG. 18, the optical transmission device 21 may have a configuration in which, in the optical transmission device 21 depicted in FIG. 17, a PD 36 is provided at the output side of the M×1 WSS 26. The PD 36 detects the optical level of the light that is output from the M×1 WSS 26, and outputs an electrical signal corresponding to the optical level detected. In FIG. 18, "PDx" is a PD 36 provided at the output side of the M×1 WSS 26.

Strictly speaking, a 1×2 SPL, the depiction of which has been omitted, is connected to an optical transmission path that extends from the M×1 WSS 26. In this 1×2 SPL, the light that is output from the M×1 WSS 26 to the optical transmission path is branched into two light beams, one light beam is output to the post-amplifier 27, and the other light beam is output to the PD 36. The PD 36 detects the optical level of the light that is output from the 1×2 SPL.

The monitor circuit 28 is connected to each PD 35 and the PD 36 via electrical wiring. The monitor circuit 28 collects, from each PD 35, the optical levels of light in which signal light and dummy light have been combined in each path, and collects, from the PD 36, the optical level of the light that is output from the M×1 WSS 26. With respect to the collected results, the monitor circuit 28, for example, performs corrections with consideration being given to loss in the CPLs 25 and loss in the 1×2 SPLs, the depiction of which has been omitted, in the PDs 35 and the PD 36, and outputs the corrected results to the control circuit 29. Data regarding the loss in the 1×2 SPL, the depiction of which has been omitted, in the PD 36 may be acquired in advance and retained in the database unit 52, for example.

The control circuit 29 receives, from the monitor circuit 28, the optical levels of light in which signal light and dummy light have been combined in each path, detected by the PDs 35, and based on the optical levels of the signal light of each path, determines whether or not there is a fault in the signal light from each path. If it is determined that there is a fault in the signal light, the control circuit 29 outputs, to the high-speed VOA 31 corresponding to the path in which it has been determined that there is a fault, a control signal with which the optical level of the dummy light is controlled in such a way that the optical level of the light that is output from the M×1 WSS 26 and detected by the PD 36 becomes a predetermined target value.

The configuration besides this is the same as in the fourth example of the optical transmission device depicted in FIG. 17, and a description thereof is redundant and has therefore been omitted. Moreover, as in the third example of the optical transmission device depicted in FIG. 13, the optical filter 33 may not be provided. Furthermore, the PD 35 of each path may be provided at the input side of the CPLs 25. Furthermore, as in the second example of the optical transmission device depicted in FIG. 4, a first PD 24 that detects the optical level of signal light, and a second PD 30 that detects the optical level of dummy light may be provided instead of the PD 35 of each path.

According to the optical transmission device 21 depicted in FIG. 18, the control circuit 29 and the high-speed VOAs 31 control the optical level of dummy light in such a way that the optical level of the light that is input to the post-amplifier 27 becomes a predetermined target value. As a result of this, as in the second example of the optical transmission device depicted in FIG. 4, light having a fixed power is input to the post-amplifier 27 even if the input of signal light is interrupted, and it is therefore possible to avoid the occurrence of optical surges, and to avoid deterioration in the signal light from other paths that is multiplexed with the light from a path in which a fault has occurred.

Sixth Example of an Optical Transmission Device

Figure 19:
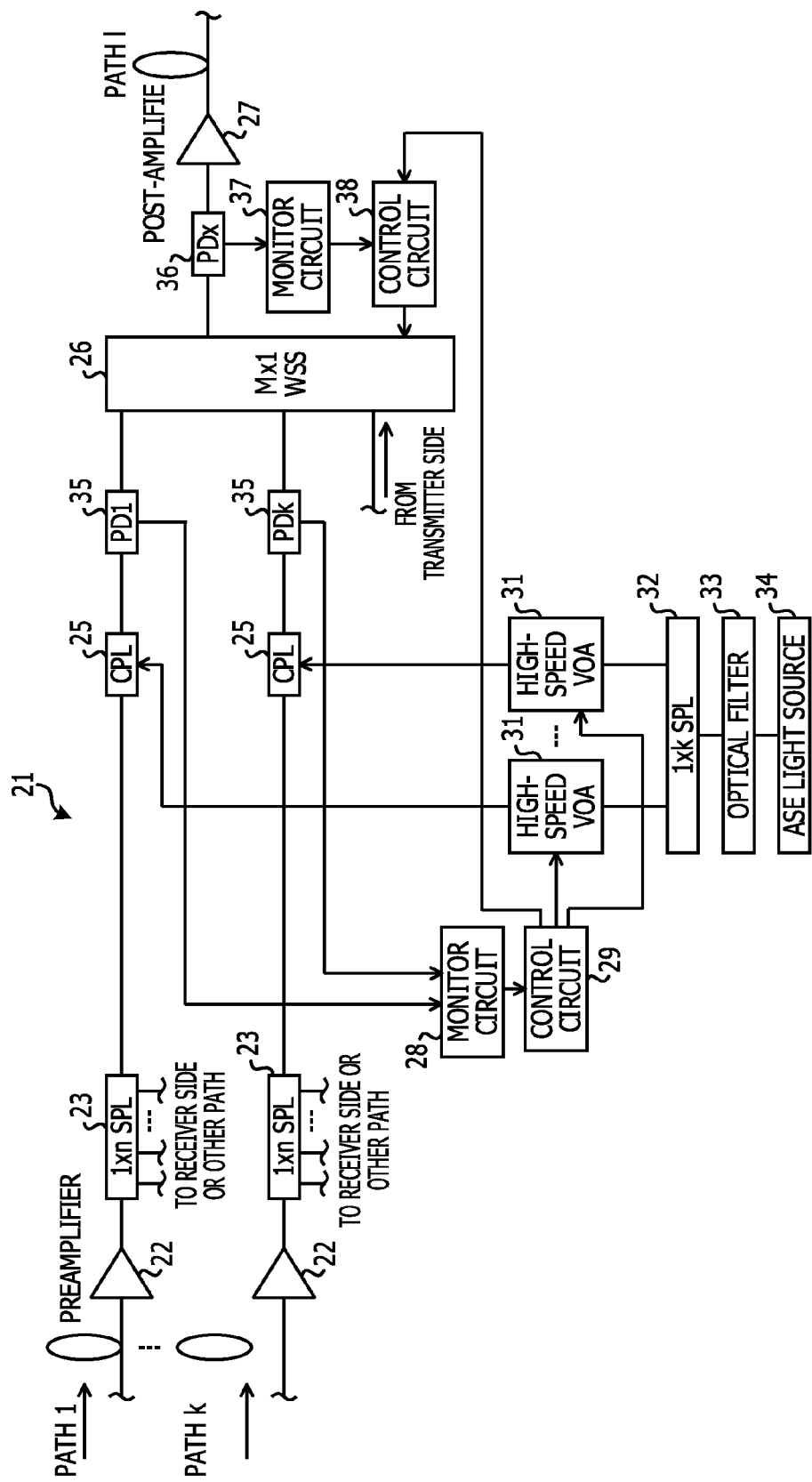
FIG. 19 is a drawing depicting a sixth example of an optical transmission device according to an embodiment.

FIG. 19 is a drawing depicting a sixth example of an optical transmission device according to the embodiment. As depicted in FIG. 19, the optical transmission device 21 may have a configuration in which, in the optical transmission device 21 depicted in FIG. 18, a second monitor circuit 37 and a second control circuit 38 are provided with respect to the output of the PD 36, separately from the monitor circuit 28 and the control circuit 29.

The monitor circuit 28 is connected to each PD 35 via electrical wiring. The monitor circuit 28 collects, from each PD 35, the optical levels of light in which signal light and dummy light have been combined in each path. With respect to the collected results, the monitor circuit 28, for example, performs corrections with consideration being given to loss in the CPLs 25 and loss in the 1×2 SPLs, the depiction of which has been omitted, in the PDs 35, and outputs the corrected results to the control circuit 29.

The control circuit 29 receives, from the monitor circuit 28, the optical levels of light in which signal light and dummy light have been combined in each path, detected by the PDs 35, and based on the optical levels of the light of each path, determines whether or not there is a fault in the signal light from each path. If it is determined that there is a fault in the signal light, the control circuit 29 outputs, to the high-speed VOA 31 corresponding to the path in which it has been determined that there is a fault, a control signal with which the optical level of the dummy light is controlled in such a way that the optical level of the light in which the signal light and the dummy light are combined, detected by the PDs 35, becomes a predetermined target value. Furthermore, the control circuit 29 notifies information regarding the path in which it has been determined that there is a fault, to the second control circuit 38.

The second monitor circuit 37 is connected to the PD 36 via electrical wiring. The second monitor circuit 37 collects, from the PD 36, the optical level of light that is output from the M×1 WSS 26. With respect to the collected results, the second monitor circuit 37, for example, performs corrections with consideration being given to loss in the 1×2 SPL, the depiction of which has been omitted, in the PD 36, and outputs the corrected results to the second control circuit 38.

The second control circuit 38 is connected to the control circuit 29, the second monitor circuit 37, and the M×1 WSS 26 via electrical wiring. The second control circuit 38 receives, from the control circuit 29, information regarding a path in which it has been determined that there is a fault, and outputs, to the M×1 WSS 26, a control signal that selects the signal light of the path in which it has been determined that there is a fault, and dummy light that is transmitted by another path and has the same wavelength as the wavelength of the signal light of the path in which it has been determined that there is a fault. As a result of this, in the M×1 WSS 26, the signal light of the path in which it has been determined that there is a fault, and dummy light that is transmitted by another path and has the same wavelength as the wavelength of the signal light of the path in which it has been determined that there is a fault are selected.

Furthermore, the second control circuit 38 receives, from the second monitor circuit 37, the optical level of the light that is output from the M×1 WSS 26 and detected by the PD 36. Based on the optical level received from the second monitor circuit 37, the second control circuit 38 controls an attenuation amount for the M×1 WSS 26 with which dummy light that has been inserted into a path different from the path in which it has been determined that there is a fault is passed, in such a way that the optical level of the light that is output from the M×1 WSS 26 becomes a predetermined target value. As a result of this, the optical level of the light that is output from the M×1 WSS 26 is controlled so as to become the predetermined target value. The M×1 WSS 26 is an example of the level control unit 3.

Figure 20:
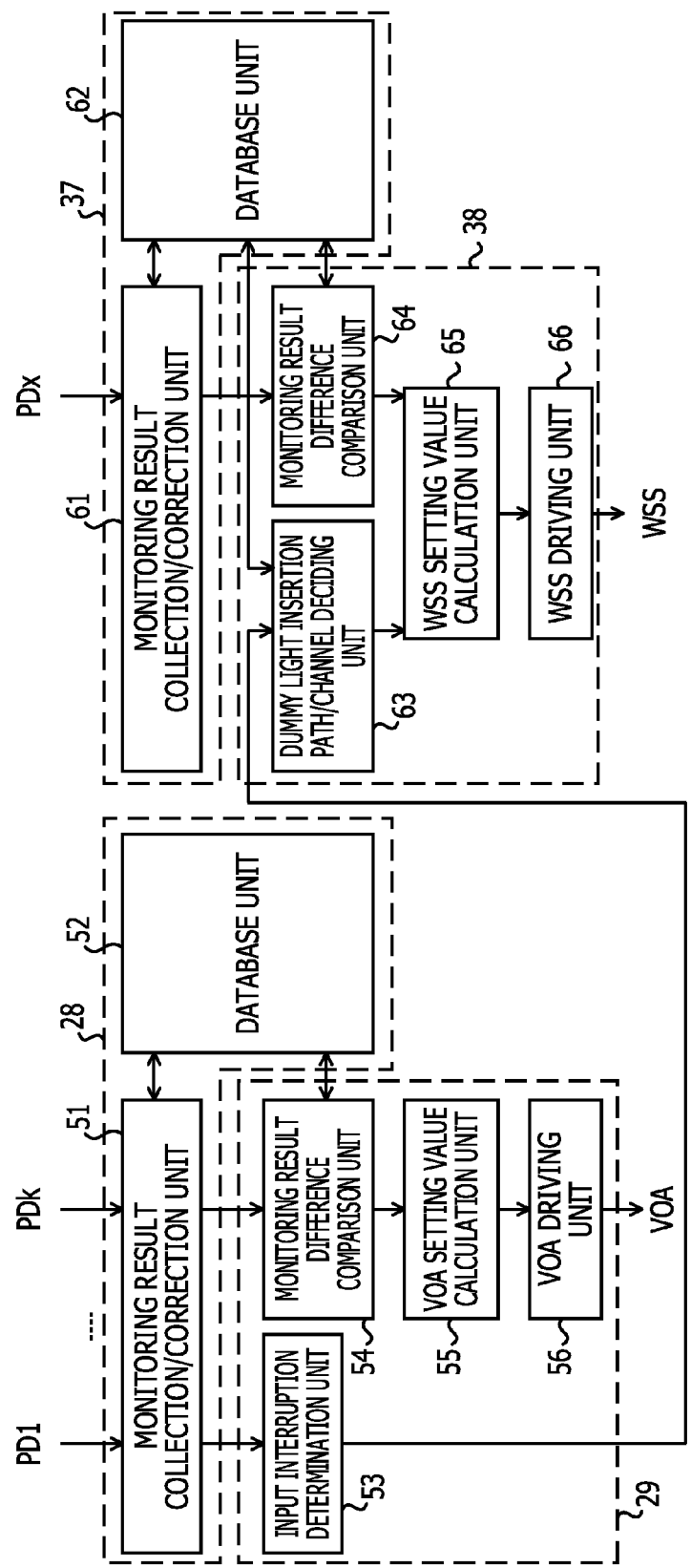
FIG. 20 is a drawing depicting an example of the functional configuration of a monitor circuit and a control circuit depicted in FIG. 19.

FIG. 20 is a drawing depicting an example of the functional configuration of the monitor circuit and the control circuit depicted in FIG. 19. As depicted in FIG. 20, the monitor circuit 28 may have a monitoring result collection/correction unit 51 and a database unit 52, for example. The database unit 52 includes data regarding loss in the CPLs 25 and loss in the 1×2 SPLs in the PDs 35, for example. The database unit 52 may include data regarding the wavelengths of the signal light and the dummy light of each path.

The monitoring result collection/correction unit 51 collects, from each PD 35, the optical levels of light in which signal light and dummy light have been combined in each path. The monitoring result collection/correction unit 51 acquires, from the database unit 52, the data regarding loss in the CPLs 25 and loss in the 1×2 SPLs in the PDs 35, for example. The monitoring result collection/correction unit 51 uses the data regarding loss acquired from the database unit 52 to correct the optical levels of the light in which signal light and dummy light have been combined, collected from the PDs 35.

The control circuit 29 may have an input interruption determination unit 53, a monitoring result difference comparison unit 54, a VOA setting value calculation unit 55, and a VOA driving unit 56. The input interruption determination unit 53 receives, from the monitoring result collection/correction unit 51, the optical levels of the light in which signal light and dummy light have been combined, detected by the PDs 35, and based on the received optical levels, determines whether or not there is a fault in the signal light from each path, namely whether or not there is an interruption in the input of the signal light.

For example, the input interruption determination unit 53 may compare the optical levels of the light detected by the PDs 35 with a preset threshold value, and may determine that there is an interruption in the input of signal light with respect to a path in which the optical level of the light detected by the PDs 35 is lower than the threshold value. The input interruption determination unit 53 notifies information regarding a path in which it has been determined that there is a fault, to the second control circuit 38.

The monitoring result difference comparison unit 54 receives, from the monitoring result collection/correction unit 51, the optical levels of the light detected by the PDs 35, and calculates the difference between the optical level of the light detected by a PD 35 and the predetermined target value with respect to a path in which it has been determined by the input interruption determination unit 53 that there is a fault in the signal light. The database unit 52 may include the predetermined target value.

The VOA setting value calculation unit 55 receives, from the monitoring result difference comparison unit 54, the difference between the optical level of the light detected by the PD 35 and the predetermined target value, and based on that difference, calculates an attenuation amount for the high-speed VOA 31 corresponding to the path in which it has been determined by the input interruption determination unit 53 that there is a fault in the signal light. For example, the VOA setting value calculation unit 55 calculates the attenuation amount for the high-speed VOA 31 in such a way that the difference calculated by the monitoring result difference comparison unit 54 becomes zero.

The VOA driving unit 56 receives, from the VOA setting value calculation unit 55, the attenuation amount for the high-speed VOA 31 corresponding to the path in which it has been determined by the input interruption determination unit 53 that there is a fault in the signal light, and based on that attenuation amount, outputs to the high-speed VOA 31 corresponding to the path in which it has been determined that there is a fault, a control signal that drives that high-speed VOA 31.

The monitoring result collection/correction unit 51, the input interruption determination unit 53, the monitoring result difference comparison unit 54, the VOA setting value calculation unit 55, and the VOA driving unit 56 may be realized by, in the hardware depicted in FIG. 7 for example, the CPU 41 executing a program that realizes the optical transmission method described hereafter. Alternatively, the monitoring result collection/correction unit 51, the input interruption determination unit 53, the monitoring result difference comparison unit 54, the VOA setting value calculation unit 55, and the VOA driving unit 56 may be realized by using hardware. The database unit 52 may be realized by using the memory 42.

The second monitor circuit 37 may have a monitoring result collection/correction unit 61 and a database unit 62, for example. The database unit 62 includes data regarding loss in the 1×2 SPL in the PD 36, for example. The database unit 62 may include data regarding the wavelengths of the signal light and the dummy light of each path.

The monitoring result collection/correction unit 61 collects, from the PD 36, the optical level of the light that is output from the M×1 WSS 26. The monitoring result collection/correction unit 61 acquires, from the database unit 62, the data regarding loss in the 1×2 SPL in the PD 36, for example. The monitoring result collection/correction unit 61 uses the data regarding loss acquired from the database unit 62 to correct the optical levels of the light in which signal light and dummy light have been combined, collected from the PD 36.

The second control circuit 38 may have a dummy light insertion path/channel deciding unit 63, a monitoring result difference comparison unit 64, a WSS setting value calculation unit 65, and a WSS driving unit 66. The dummy light insertion path/channel deciding unit 63 receives, from the input interruption determination unit 53, information regarding a path in which it has been determined that there is a fault, acquires data regarding the wavelengths of the signal light and dummy light of each path from the database unit 62, and decides upon a path/channel into which dummy light is inserted.

The monitoring result difference comparison unit 64 receives, from the monitoring result collection/correction unit 61, the optical level of the light detected by the PD 36, and calculates the difference between the optical level of the light detected by the PD 36 and the predetermined target value. The database unit 62 may include the predetermined target value.

The WSS setting value calculation unit 65 receives, from the dummy light insertion path/channel deciding unit 63, information regarding the path/channel into which dummy light is inserted, and receives, from the monitoring result difference comparison unit 64, the difference between the optical level of the light detected by the PD 36 and the predetermined target value. Then, based on the information regarding the path/channel into which dummy light is inserted, the WSS setting value calculation unit 65 decides whether to pass or block each channel of the M×1 WSS 26. Furthermore, based on the difference between the optical level of the light detected by the PD 36 and the predetermined target value, the WSS setting value calculation unit 65 calculates an attenuation amount for the M×1 WSS 26 with which the dummy light inserted into paths different from the path in which it has been determined that there is a fault is passed. For example, the WSS setting value calculation unit 65 calculates an attenuation amount for the M×1 WSS 26 with which the dummy light inserted into the paths different from the path in which it has been determined that there is a fault is passed, in such a way that the difference calculated by the monitoring result difference comparison unit 64 becomes zero.

The WSS driving unit 66 receives the attenuation amount for the M×1 WSS 26 from the WSS setting value calculation unit 65, and based on that attenuation amount, outputs to the M×1 WSS 26, a control signal that drives the M×1 WSS 26.

The monitoring result collection/correction unit 61, the dummy light insertion path/channel deciding unit 63, the monitoring result difference comparison unit 64, the WSS setting value calculation unit 65, and the WSS driving unit 66 may be realized by, in the hardware depicted in FIG. 7 for example, the CPU 41 executing a program that realizes the optical transmission method described hereafter. Alternatively, the monitoring result collection/correction unit 61, the dummy light insertion path/channel deciding unit 63, the monitoring result difference comparison unit 64, the WSS setting value calculation unit 65, and the WSS driving unit 66 may be realized by using hardware. The database unit 62 may be realized by using the memory 42.

Third Example of an Optical Transmission Method

Figure 21:
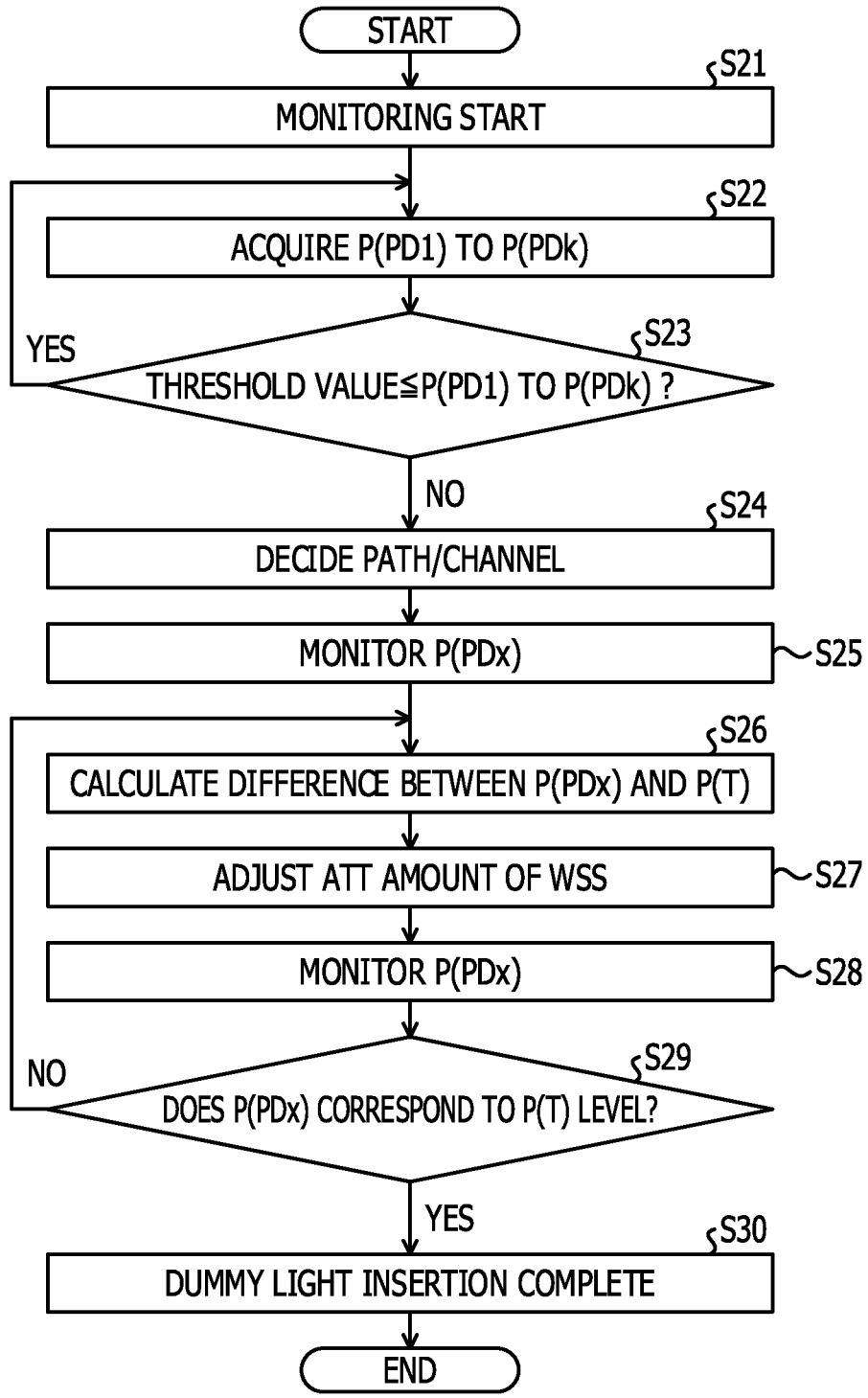
FIG. 21 is a drawing depicting a third example of an optical transmission method according to an embodiment.

FIG. 21 is a drawing depicting a third example of an optical transmission method according to the embodiment. The optical transmission method depicted in FIG. 21 may be carried out by the optical transmission device depicted in FIG. 19, for example. In the present working example, the optical transmission method is described as being carried out by the optical transmission device depicted in FIG. 19.

When optical transmission starts in the optical transmission device 21 depicted in FIG. 19, the optical transmission device 21 starts the monitoring of optical levels by the PDs 35 and the PD 36 (step S21). The monitoring result collection/correction unit 51 then acquires, from the PDs 35, the optical levels of the light of each path, namely each output power P(PD1) to P(PDk) of the PD1 to PDk (step S22).

Next, the input interruption determination unit 53 determines whether or not each output power P(PD1) to P(PDk) of the PD1 to PDk is equal to or greater than a preset threshold value (step S23). The database unit 52 may include the threshold value. If each output power P(PD1) to P(PDk) is equal to or greater than the threshold value (step S23: yes), processing returns to step S22.

If any of the output powers P(PD1) to P(PDk) is not equal to or greater than the threshold value (step S23: no), the input interruption determination unit 53 determines that there is a fault in the signal light from the path in which the output power is not equal to or greater than the threshold value. The input interruption determination unit 53 notifies information regarding the path in which it has been determined that there is a fault, to the second control circuit 38. Processing then advances to step S24.

When the dummy light insertion path/channel deciding unit 63 receives, from the input interruption determination unit 53, information regarding the path in which it has been determined that there is a fault, the dummy light insertion path/channel deciding unit 63 acquires data regarding the wavelengths of the signal light and dummy light of each path from the database unit 62, and decides upon a path/channel into which dummy light is inserted (step S24). The path/channel into which dummy light is inserted may be a path that is different from the path in which it has been determined that there is a fault.

Next, the monitoring result collection/correction unit 61 monitors the optical level of the light that is output from the M×1 WSS 26, namely the output power P(PDx) of the PDx (step S25). For example, the monitoring result collection/correction unit 61 performs monitoring by acquiring the output power P(PDx) of the PDx from the PD 36, and using the data regarding loss acquired from the database unit 62 to correct the output power P(PDx) of the PDx.

Next, the monitoring result difference comparison unit 64 calculates the difference between the output power P(PDx) of the PDx and a predetermined target value, namely a target power P(T) (step S26). Next, based on the difference calculated in step S26, the WSS setting value calculation unit 65 calculates an attenuation amount in the M×1 WSS 26 for the path/channel decided in step S24 into which dummy light is inserted. Then, based on the attenuation amount calculated by the WSS setting value calculation unit 65, the WSS driving unit 66 outputs a control signal to the M×1 WSS 26, and adjusts the attenuation amount (ATT amount) for the M×1 WSS 26 (step S27).

Next, the monitoring result collection/correction unit 61 once again monitors the output power P(PDx) of the PDx (step S28). Next, the monitoring result difference comparison unit 64 determines whether or not the output power P(PDx) of the PDx is of a level that corresponds to the target power P(T) level (step S29).

If the output power P(PDx) of the PDx is not of a level that corresponds to the target power P(T) level (step S29: no), processing returns to step S26. On the other hand, if the output power P(PDx) of the PDx is of a level that corresponds to the target power P(T) level (step S29: yes), for example, the insertion from a path that is different from the path in which it has been determined that there is a fault, of dummy light having the same wavelength as the wavelength of the signal light that is from the path in which it has been determined that there is a fault is completed (step S30). Therefore, the optical transmission device 21 finishes the series of processing.

Mapping Example in a WSS

Figure 22:
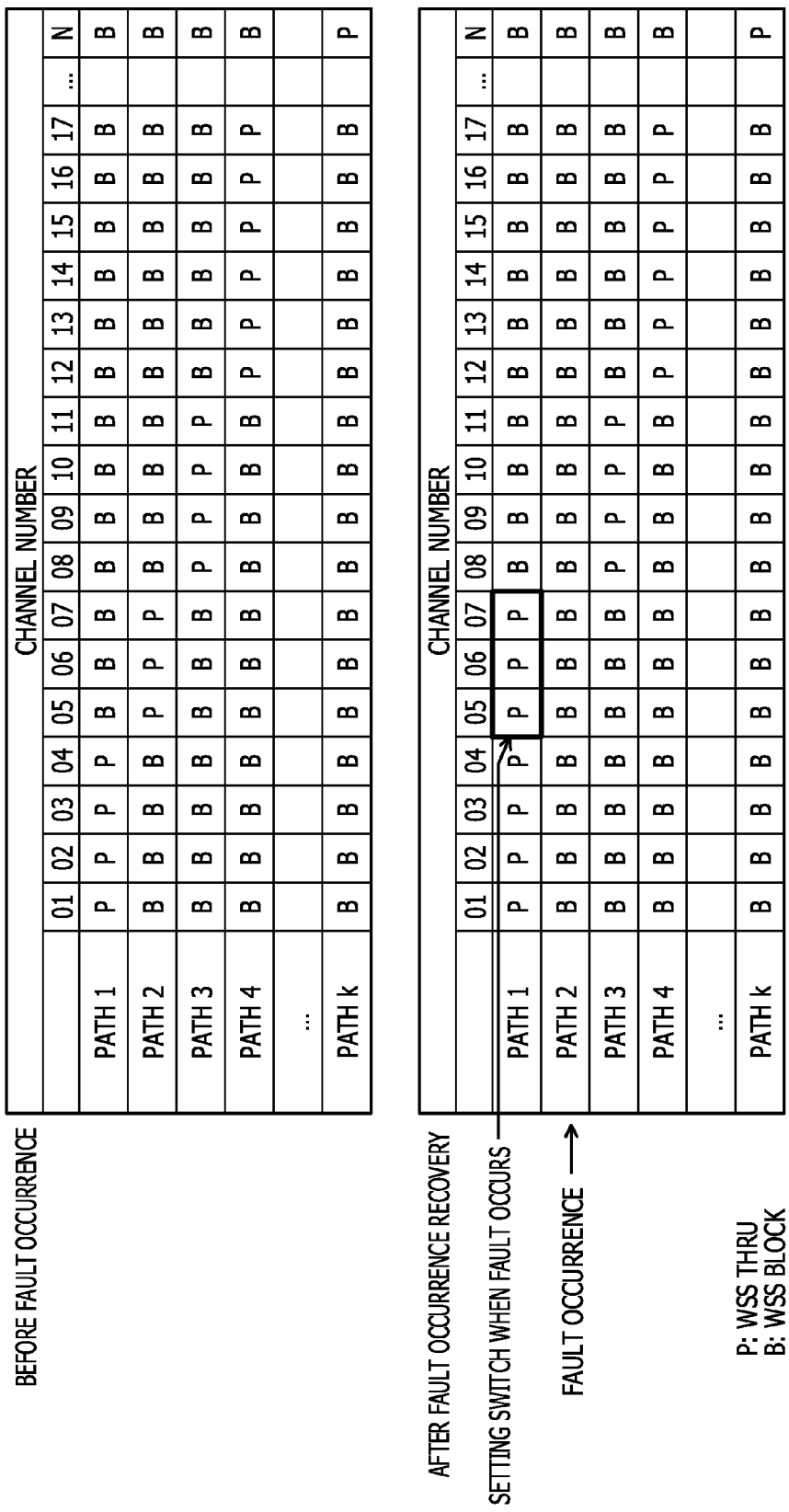
FIG. 22 is a drawing depicting a mapping example in a WSS depicted in FIG. 19.

FIG. 22 is a drawing depicting a mapping example in the WSS depicted in FIG. 19. As depicted in FIG. 22, for example, prior to the occurrence of a fault, with regard to the path 1, the channels 01 to 04 are set to "thru", and the other channels are set to "block". Furthermore, prior to the occurrence of a fault, with regard to the path 2, the channels 05 to 07 are set to "thru", and the other channels are set to "block". If a fault occurs in the path 2, for example, the channels 05 to 07 of the path 2 change from "thru" to "block", and the channels 05 to 07 of the path 1 change from "block" to "thru". As a result of this, instead of the signal light from the path 2, dummy light having the same wavelength as the wavelength of the signal light from the path 2 is input to the path 1.

Second Example of a Wavelength Arrangement

Figure 23:
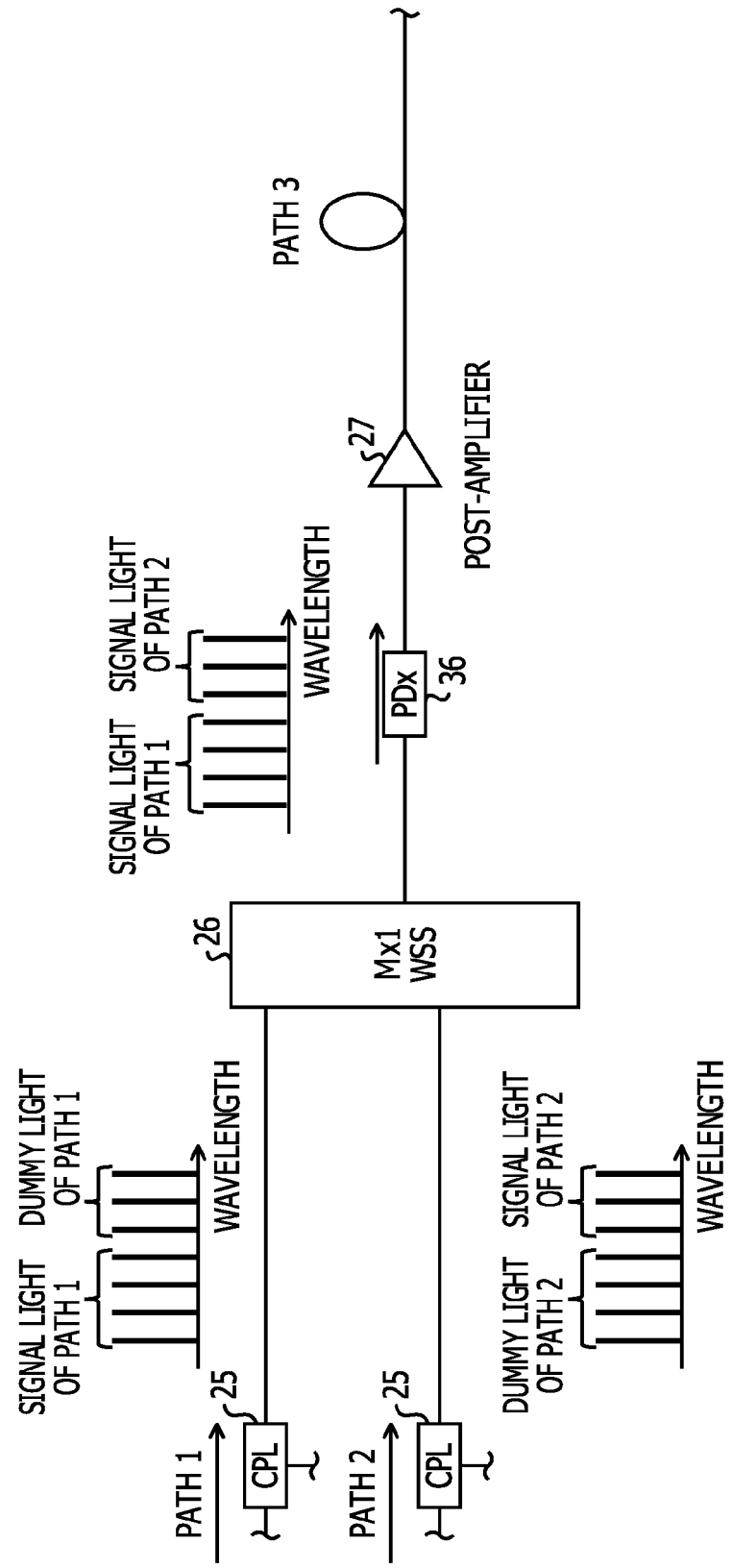
FIG. 23 is a drawing depicting a wavelength arrangement example when the optical transmission device depicted in FIG. 19 operates as normal.
Figure 24:
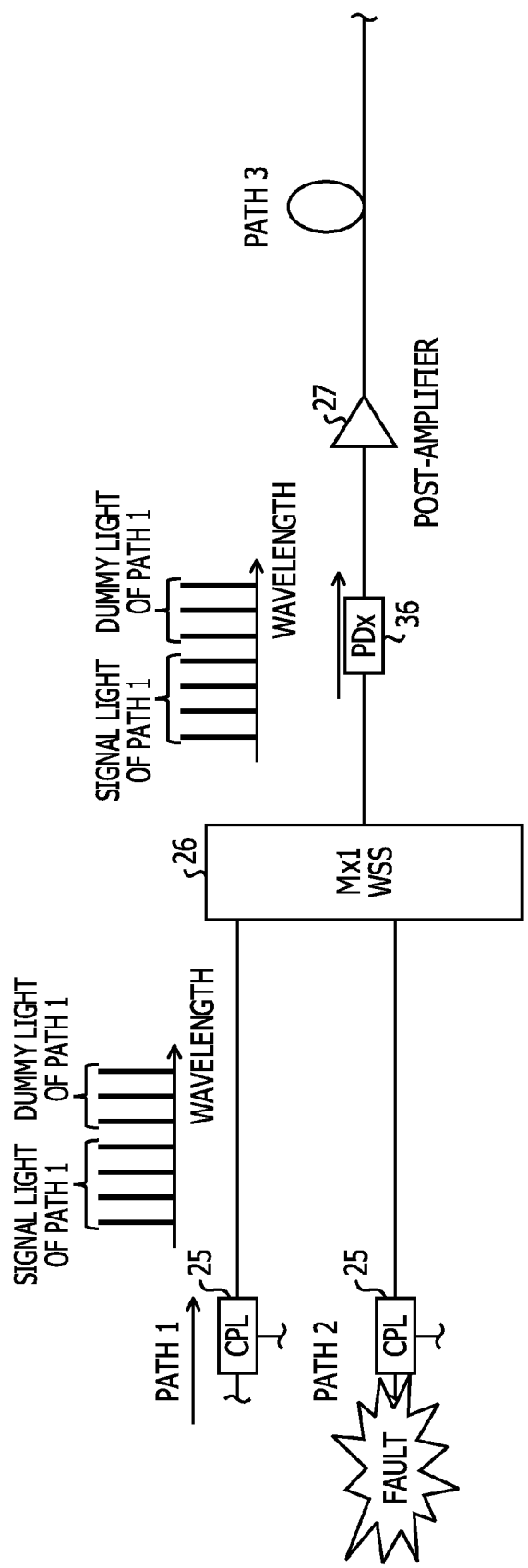
FIG. 24 is a drawing depicting a wavelength arrangement example when the optical transmission device depicted in FIG. 19 has a fault.

FIG. 23 is a drawing depicting a wavelength arrangement example when the optical transmission device depicted in FIG. 19 operates as normal. FIG. 24 is a drawing depicting a wavelength arrangement example when the optical transmission device depicted in FIG. 19 has a fault. In the present working example, in order to simplify the description, the case where light from the path 1 and light from the path 2 are multiplexed by the M×1 WSS 26 and output to a path 3 is described as an example. The wavelength arrangement examples depicted in FIG. 23 and FIG. 24 correspond to the mapping example depicted in FIG. 22.

As depicted in FIG. 23, normally, the signal light of the path 1 and dummy light having the same wavelength as the wavelength of the signal light of the path 2 are input to the M×1 WSS 26 from the path 1. Furthermore, normally, the signal light of the path 2 and dummy light having the same wavelength as the wavelength of the signal light of the path 1 are input to the M×1 WSS 26 from the path 2. Normally, in the M×1 WSS 26, the dummy light of the path 1 that is input from the path 1 and the dummy light of the path 2 that is input from the path 2 are blocked, and the signal light of the path 1 and the signal light of the path 2 are output to the path 3 from the M×1 WSS 26.

As depicted in FIG. 24, if the signal light is no longer input from the path 2 due to a fault that has occurred in the path 2, the channel for the signal light of the path 2 is changed from "thru" to "block", and the channel for the dummy light of the path 1 is changed from "block" to "thru". As a result of this, the signal light of the path 1 and dummy light of the path 1 having the same wavelength as the wavelength of the signal light of the path 2 are output to the path 3 from the M×1 WSS 26.

The configuration besides this is the same as in the fifth example of the optical transmission device depicted in FIG. 18, and a description thereof is redundant and has therefore been omitted. Moreover, as in the third example of the optical transmission device depicted in FIG. 13, the optical filter 33 may not be provided. Furthermore, the PD 35 of each path may be provided at the input side of the CPLs 25. Furthermore, as in the second example of the optical transmission device depicted in FIG. 4, a first PD 24 that detects the optical level of signal light, and a second PD 30 that detects the optical level of dummy light may be provided instead of the PD 35 of each path.

According to the optical transmission device 21 depicted in FIG. 19, the second control circuit 38 controls the attenuation amount for the M×1 WSS 26 in such a way that the optical level of the light that is input to the post-amplifier 27 becomes a predetermined target value. As a result of this, the optical level of the light that is output from the M×1 WSS 26 is controlled so as to ordinarily be fixed, and therefore, as in the second example of the optical transmission device depicted in FIG. 4, light having a fixed power is input to the post-amplifier 27 even if the input of signal light is interrupted. Therefore, it is possible to avoid the occurrence of optical surges, and to avoid deterioration in the signal light from other paths that is multiplexed with the light from a path in which a fault has occurred.

Furthermore, due to the insertion of dummy light that is transmitted by another path and has the same wavelength as the wavelength of signal light in which it has been determined that there is a fault, light of all of the wavelengths that are able to be handled by the system is input to the M×1 WSS 26, and it is therefore possible to control the optical level of the light that is output from the M×1 WSS 26 so as to ordinarily be fixed.

Furthermore, according to the optical transmission device 21 depicted in FIG. 19, the optical level of the light that is output from the M×1 WSS 26 is adjusted by the M×1 WSS 26, and it is therefore possible to control the optical level of the light that is input to the post-amplifier 27, to a predetermined target value.

Seventh Example of an Optical Transmission Device

Figure 25:
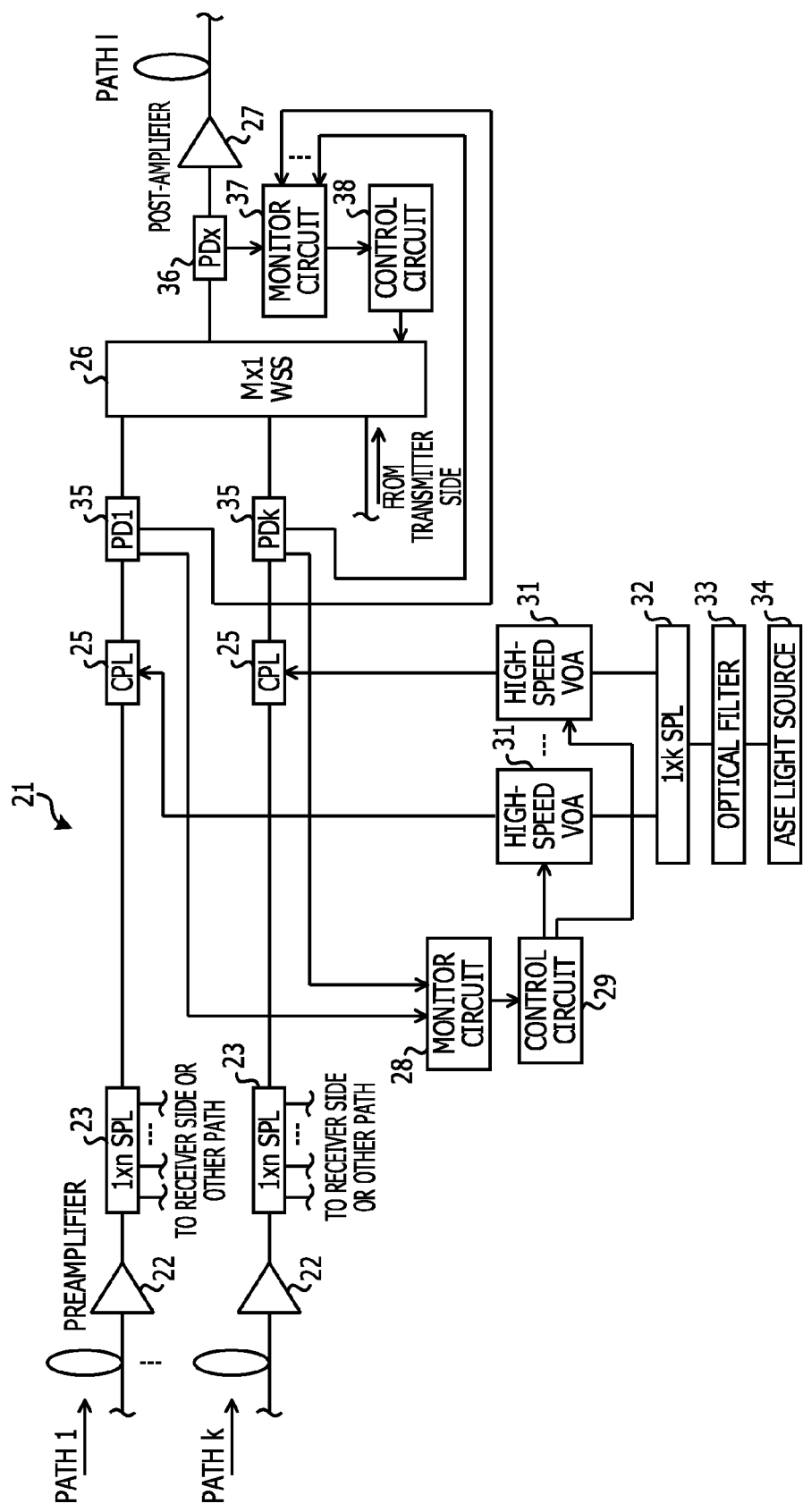
FIG. 25 is a drawing depicting a seventh example of an optical transmission device according to an embodiment.

FIG. 25 is a drawing depicting a seventh example of an optical transmission device according to the embodiment. As depicted in FIG. 25, the optical transmission device 21 may have a configuration in which, in the optical transmission device 21 depicted in FIG. 19, the second control circuit 38 determines a path in which there is a fault in signal light, and based on that determination result, decides upon a path/channel into which dummy light is inserted. Therefore, the control circuit 29 notifies information regarding the path in which it has been determined by the control circuit 29 that there is a fault, to the second control circuit 38.

The second monitor circuit 37 is connected to each PD 35 and the PD 36 via electrical wiring. The second monitor circuit 37 collects, from each PD 35, the optical levels of light in which signal light and dummy light have been combined in each path. With respect to the collected results, the second monitor circuit 37, for example, performs corrections with consideration being given to loss in the CPLs 25 and loss in the 1×2 SPLs, the depiction of which has been omitted, in the PDs 35, and outputs the corrected results to the second control circuit 38.

Furthermore, the second monitor circuit 37 collects, from the PD 36, the optical level of the light that is output from the M×1 WSS 26. With respect to the collected results, the second monitor circuit 37, for example, performs corrections with consideration being given to loss in the 1×2 SPL, the depiction of which has been omitted, in the PD 36, and outputs the corrected results to the second control circuit 38.

The second control circuit 38 is connected to the second monitor circuit 37 and the M×1 WSS 26 via electrical wiring. The second control circuit 38 receives, from the second monitor circuit 37, the optical levels of light in which signal light and dummy light have been combined in each path, detected by the PDs 35, and based on the optical levels of the light of each path, determines whether or not there is a fault in the signal light from each path.

The second control circuit 38 outputs, to the M×1 WSS 26, a control signal that selects the signal light of a path in which it has been determined that there is a fault, and dummy light that is transmitted by another path and has the same wavelength as the wavelength of the signal light of the path in which it has been determined that there is a fault. As a result of this, in the M×1 WSS 26, the signal light of the path in which it has been determined that there is a fault, and dummy light that is transmitted by another path and has the same wavelength as the wavelength of the signal light of the path in which it has been determined that there is a fault are selected.

Furthermore, the second control circuit 38 receives, from the second monitor circuit 37, the optical level of the light that is output from the M×1 WSS 26 and detected by the PD 36. Based on the optical level received from the second monitor circuit 37, the second control circuit 38 controls an attenuation amount for the M×1 WSS 26 with which dummy light that has been inserted into a path different from the path in which it has been determined that there is a fault is passed, in such a way that the optical level of the light that is output from the M×1 WSS 26 becomes a predetermined target value. As a result of this, the optical level of the light that is output from the M×1 WSS 26 is controlled so as to become the predetermined target value.

Figure 26:
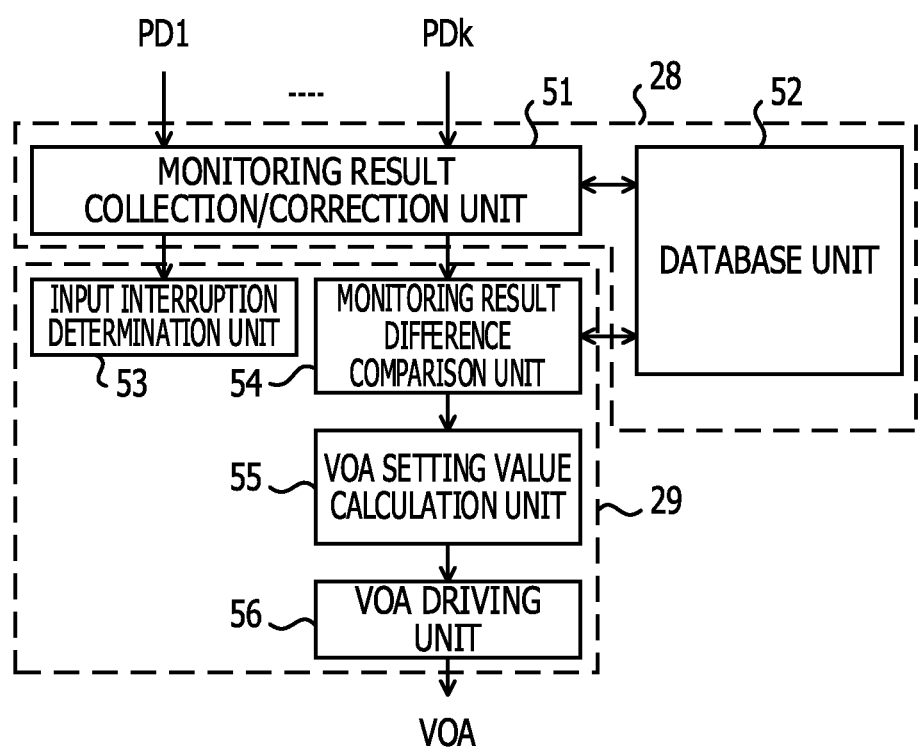
FIG. 26 is a drawing depicting an example of the functional configuration of a monitor circuit and a control circuit depicted in FIG. 25.

FIG. 26 is a drawing depicting an example of the functional configuration of the monitor circuit and the control circuit depicted in FIG. 25. As depicted in FIG. 26, the monitor circuit 28 and the control circuit 29 are the same as the monitor circuit 28 and the control circuit 29 in the sixth example of the optical transmission device depicted in FIG. 20. However, the input interruption determination unit 53 does not notify information regarding the path in which it has been determined by the input interruption determination unit 53 that there is a fault, to the dummy light insertion path/channel deciding unit 63 of the second control circuit 38.

Figure 27:
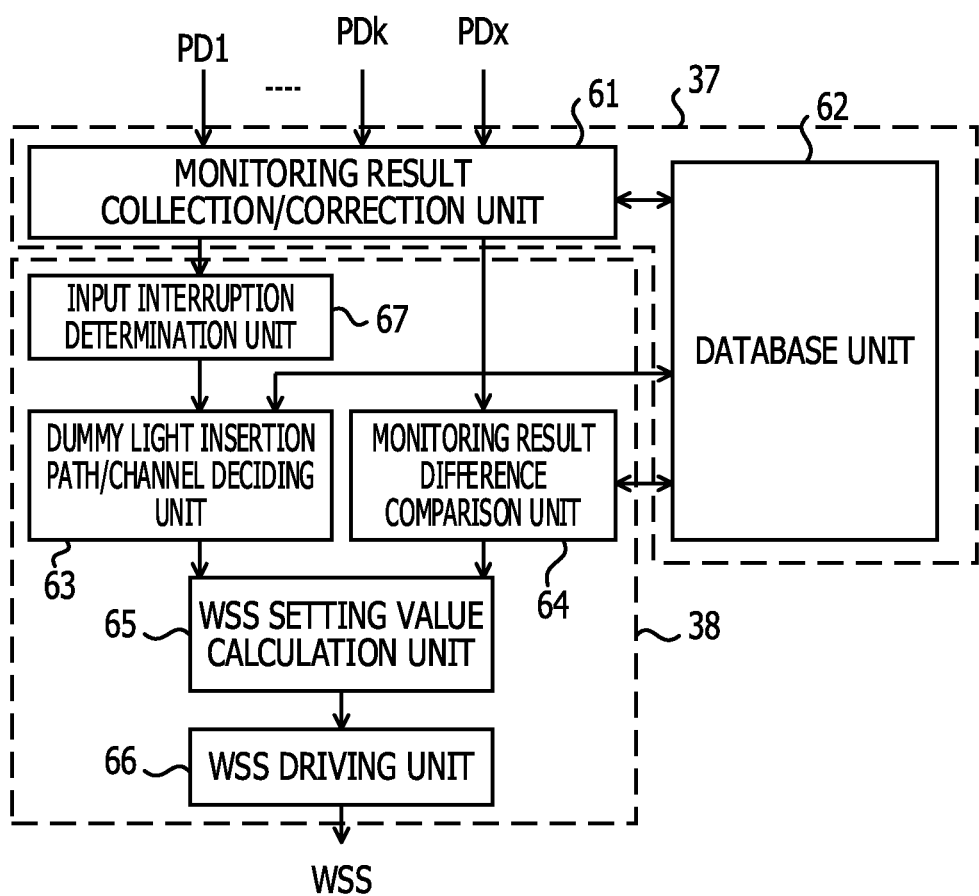
FIG. 27 is a drawing depicting an example of the functional configuration of the monitor circuit and the control circuit depicted in FIG. 25.

FIG. 27 is a drawing depicting an example of the functional configuration of the monitor circuit and the control circuit depicted in FIG. 25. As depicted in FIG. 27, the second monitor circuit 37 is the same as the second monitor circuit 37 in the sixth example of the optical transmission device depicted in FIG. 20. However, the database unit 62 includes data regarding loss in the CPLs 25 and loss in the 1×2 SPLs in the PDs 35 and the PD 36, for example.

Furthermore, the monitoring result collection/correction unit 61 collects, from each PD 35, the optical levels of light in which signal light and dummy light have been combined in each path. The monitoring result collection/correction unit 61 acquires, from the database unit 62, the data regarding loss in the CPLs 25 and loss in the 1×2 SPLs in the PDs 35, for example. The monitoring result collection/correction unit 61 uses the data regarding loss acquired from the database unit 62 to correct the optical levels of the light in which signal light and dummy light have been combined, collected from the PDs 35.

The second control circuit 38 may include an input interruption determination unit 67 besides the second control circuit 38 in the sixth example of the optical transmission device depicted in FIG. 20. The input interruption determination unit 67 receives, from the monitoring result collection/correction unit 61, the optical levels of light in which signal light and dummy light have been combined, detected by the PDs 35, and based on the received optical levels, determines whether or not there is a fault in the signal light from each path, namely whether or not there is an interruption in the input of the signal light.

For example, the input interruption determination unit 67 may compare the optical levels of the light detected by the PDs 35 with a preset threshold value, and may determine that there is an interruption in the input of signal light with respect to a path in which the optical level of the light detected by a PD 35 is lower than the threshold value. The input interruption determination unit 67 notifies information regarding a path in which it has been determined that there is a fault, to the dummy light insertion path/channel deciding unit 63.

The dummy light insertion path/channel deciding unit 63 receives, from the input interruption determination unit 67, information regarding the path in which it has been determined that there is a fault, acquires data regarding the wavelengths of the signal light and dummy light of each path from the database unit 62, and decides upon a path/channel into which dummy light is inserted.

The monitoring result collection/correction unit 61, the dummy light insertion path/channel deciding unit 63, the monitoring result difference comparison unit 64, the WSS setting value calculation unit 65, the WSS driving unit 66, and the input interruption determination unit 67 may be realized by, in the hardware depicted in FIG. 7 for example, the CPU 41 executing a program that realizes the optical transmission method described hereafter. Alternatively, the monitoring result collection/correction unit 61, the dummy light insertion path/channel deciding unit 63, the monitoring result difference comparison unit 64, the WSS setting value calculation unit 65, the WSS driving unit 66, and the input interruption determination unit 67 may be realized by using hardware. The database unit 62 may be realized by using memory 42.

The configuration besides this is the same as in the sixth example of the optical transmission device depicted in FIG. 19, and a description thereof is redundant and has therefore been omitted. Moreover, as in the third example of the optical transmission device depicted in FIG. 13, the optical filter 33 may not be provided. Furthermore, the PD 35 of each path may be provided at the input side of the CPLs 25. Furthermore, as in the second example of the optical transmission device depicted in FIG. 4, a first PD 24 that detects the optical level of signal light, and a second PD 30 that detects the optical level of dummy light may be provided instead of the PD 35 of each path.

According to the optical transmission device 21 depicted in FIG. 25, the second control circuit 38 controls the attenuation amount for the M×1 WSS 26 in such a way that the optical level of the light that is input to the post-amplifier 27 becomes a predetermined target value. As a result of this, the optical level of the light that is output from the M×1 WSS 26 is controlled so as to ordinarily be fixed, and therefore, as in the second example of the optical transmission device depicted in FIG. 4, light having a fixed power is input to the post-amplifier 27 even if the input of signal light is interrupted. Therefore, it is possible to avoid the occurrence of optical surges, and to avoid deterioration in the signal light from other paths that is multiplexed with the light from a path in which a fault has occurred.

Eighth Example of an Optical Transmission Device

Figure 28:
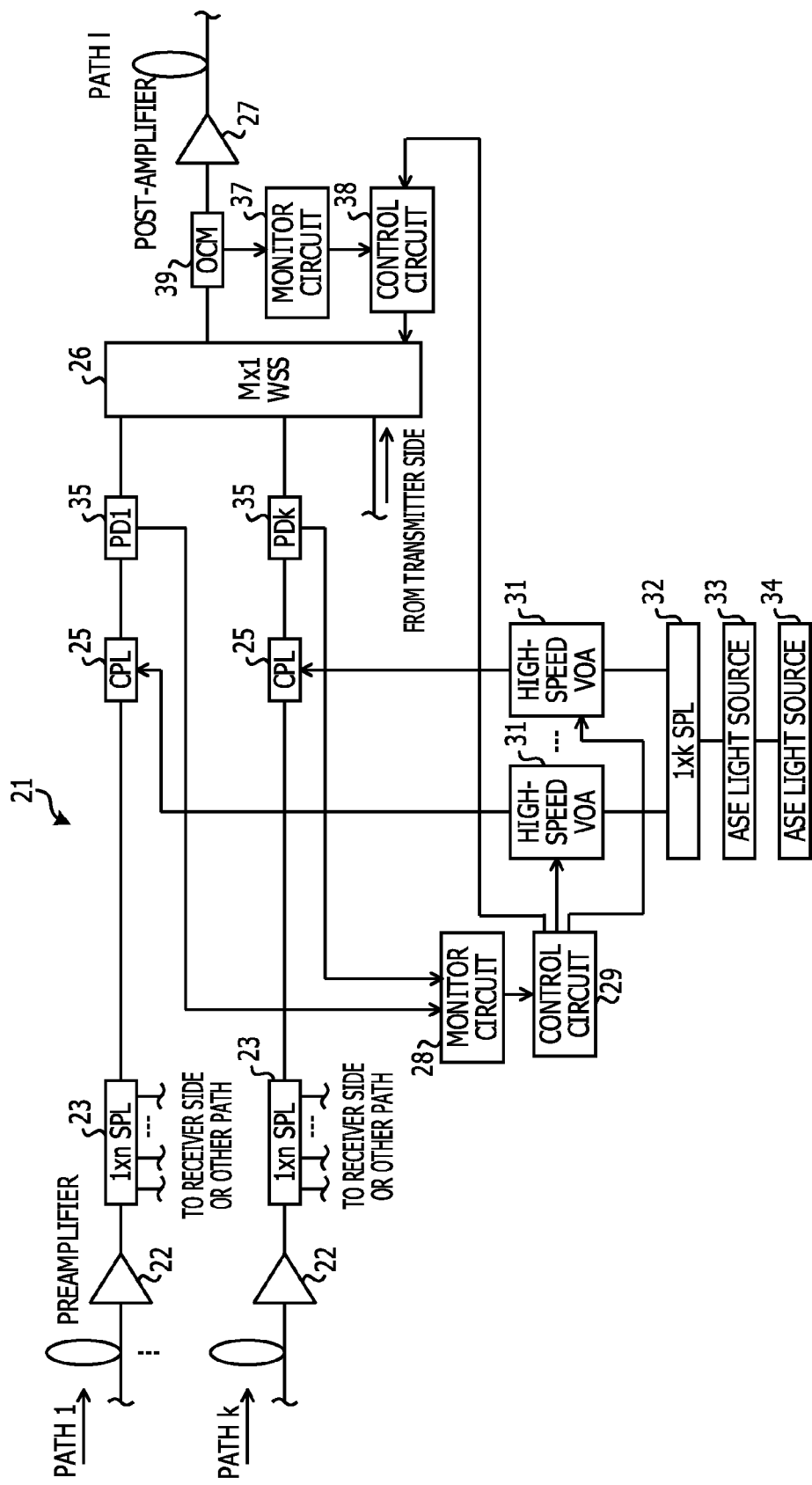
FIG. 28 is a drawing depicting an eighth example of an optical transmission device according to an embodiment.

FIG. 28 is a drawing depicting an eighth example of an optical transmission device according to the embodiment. As depicted in FIG. 28, the optical transmission device 21 may have a configuration in which, in the optical transmission device 21 depicted in FIG. 19, an optical channel monitor (OCM) 39 may be provided, instead of the PD 36, at the stage after the M×1 WSS 26.

The OCM 39 detects, with respect to each channel, the optical level of the light that is output from the M×1 WSS 26, and outputs an electrical signal corresponding to the optical level detected. Strictly speaking, a 1×2 SPL, the depiction of which has been omitted, is connected to an optical transmission path that extends from the M×1 WSS 26. In this 1×2 SPL, the light that is output from the M×1 WSS 26 to the optical transmission path is branched into two light beams, one light beam is output to the post-amplifier 27, and the other light beam is output to the OCM 39. The OCM 39 detects, with respect to each channel, the optical level of the light that is output from the 1×2 SPL.

The second monitor circuit 37 is connected to the OCM 39 via electrical wiring. The second monitor circuit 37 collects, from the OCM 39, the optical level of the light that is output from the M×1 WSS 26, with respect to each channel. With respect to the collected results, the second monitor circuit 37, for example, performs corrections with consideration being given to loss in the 1×2 SPL, the depiction of which has been omitted, in the OCM 39, and outputs the corrected results to the second control circuit 38. Data regarding loss in the 1×2 SPL, the depiction of which has been omitted, in the OCM 39 may be acquired in advance and retained in the database unit 62, for example.

The second control circuit 38 is connected to the control circuit 29, the second monitor circuit 37, and the M×1 WSS 26 via electrical wiring. The second control circuit 38 receives, from the second monitor circuit 37, with respect to each channel, the optical level of the light that is output from the M×1 WSS 26 and detected by the OCM 39. Based on the optical level of each channel received from the second monitor circuit 37, the second control circuit 38 controls the attenuation amount for the M×1 WSS 26 with respect to each channel in such a way that the total value of the optical levels for each channel of the light that is output from the M×1 WSS 26 becomes a predetermined target value. As a result of this, the total value for the optical levels for each channel of the light that is output from the M×1 WSS 26 is controlled so as to become the predetermined target value.

Figure 29:
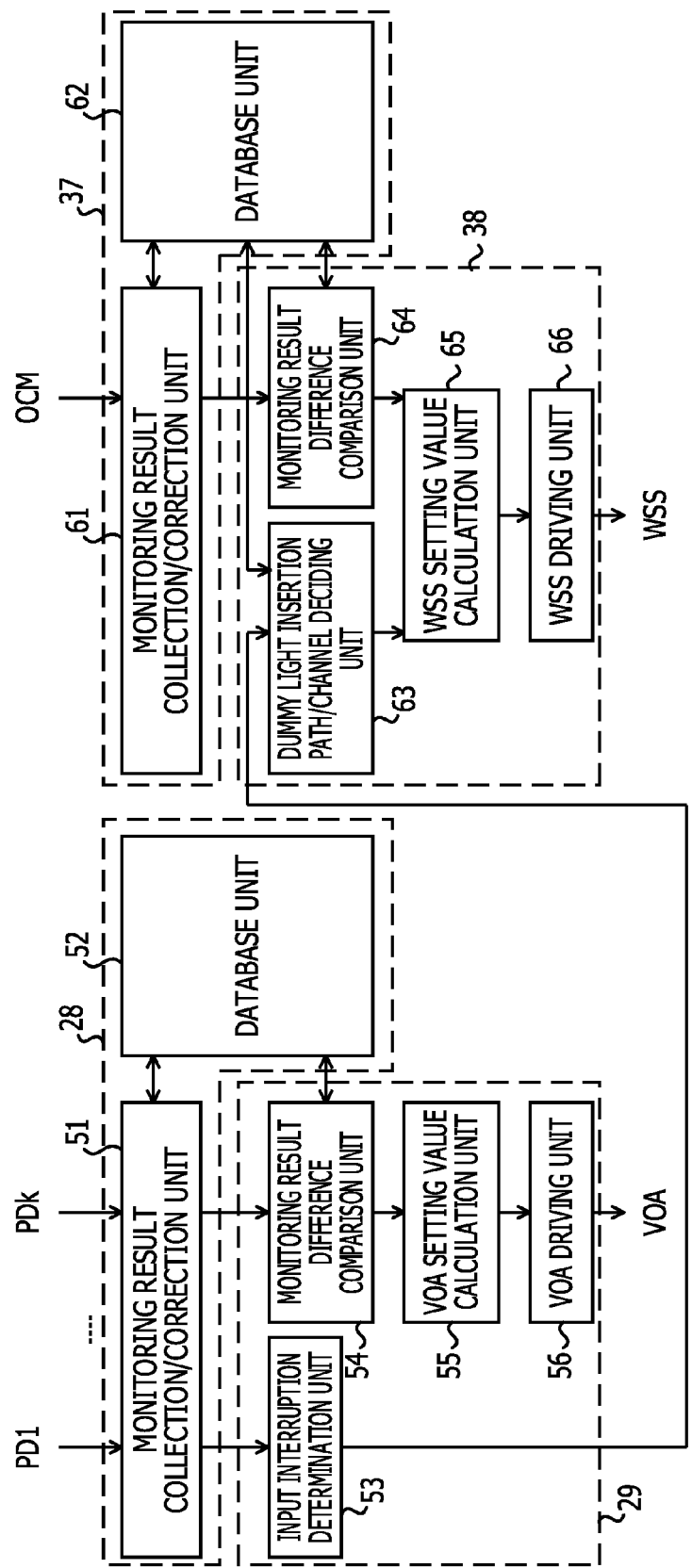
FIG. 29 is a drawing depicting an example of the functional configuration of a monitor circuit and a control circuit depicted in FIG. 28.

FIG. 29 is a drawing depicting an example of the functional configuration of the monitor circuit and the control circuit depicted in FIG. 28. As depicted in FIG. 29, the monitor circuit 28 and the control circuit 29 are the same as the monitor circuit 28 and the control circuit 29 in the sixth example of the optical transmission device depicted in FIG. 20.

The second monitor circuit 37 is the same as the second monitor circuit 37 in the sixth example of the optical transmission device depicted in FIG. 20. However, the monitoring result collection/correction unit 61 collects, from the OCM 39, with respect to each channel, the optical level of the light that is output from the M×1 WSS 26.

The second control circuit 38 is the same as the second control circuit 38 in the sixth example of the optical transmission device depicted in FIG. 20. However, the monitoring result difference comparison unit 64 calculates the difference between the optical level for each channel received from the monitoring result collection/correction unit 61, and the predetermined target value for each channel. The database unit 62 may include a predetermined target value for each channel.

The WSS setting value calculation unit 65 receives, from the dummy light insertion path/channel deciding unit 63, information regarding paths/channels into which dummy light is inserted, and receives, from the monitoring result difference comparison unit 64, the difference between the optical level for each channel received from the second monitor circuit 37, and the predetermined target value for each channel. Then, based on the information regarding the paths/channels into which dummy light is inserted, the WSS setting value calculation unit 65 decides whether to pass or block each channel of the M×1 WSS 26.

Based on the difference with the predetermined target value for each channel received from the monitoring result difference comparison unit 64, the WSS setting value calculation unit 65 calculates an attenuation amount in the M×1 WSS 26 for channels which pass dummy light that is inserted into paths that are different from the path in which it has been determined that there is a fault. For example, the WSS setting value calculation unit 65 calculates the attenuation amount in the M×1 WSS 26 for channels that pass dummy light, in such a way that the differences calculated by the monitoring result difference comparison unit 64 become zero.

Furthermore, the WSS setting value calculation unit 65 calculates the attenuation amount in the M×1 WSS 26 for the channels that pass dummy light, in such a way that the total value of the optical levels for each channel of the light that is output from the M×1 WSS 26 becomes the predetermined target value. The database unit 62 may include the target value for the total value of the optical levels of the light that is output from the M×1 WSS 26.

The WSS driving unit 66 receives the attenuation amount for each channel of the M×1 WSS 26 from the WSS setting value calculation unit 65, and based on those attenuation amounts, outputs to the M×1 WSS 26, a control signal that drives the M×1 WSS 26.

Fourth Example of an Optical Transmission Method

Figure 30:
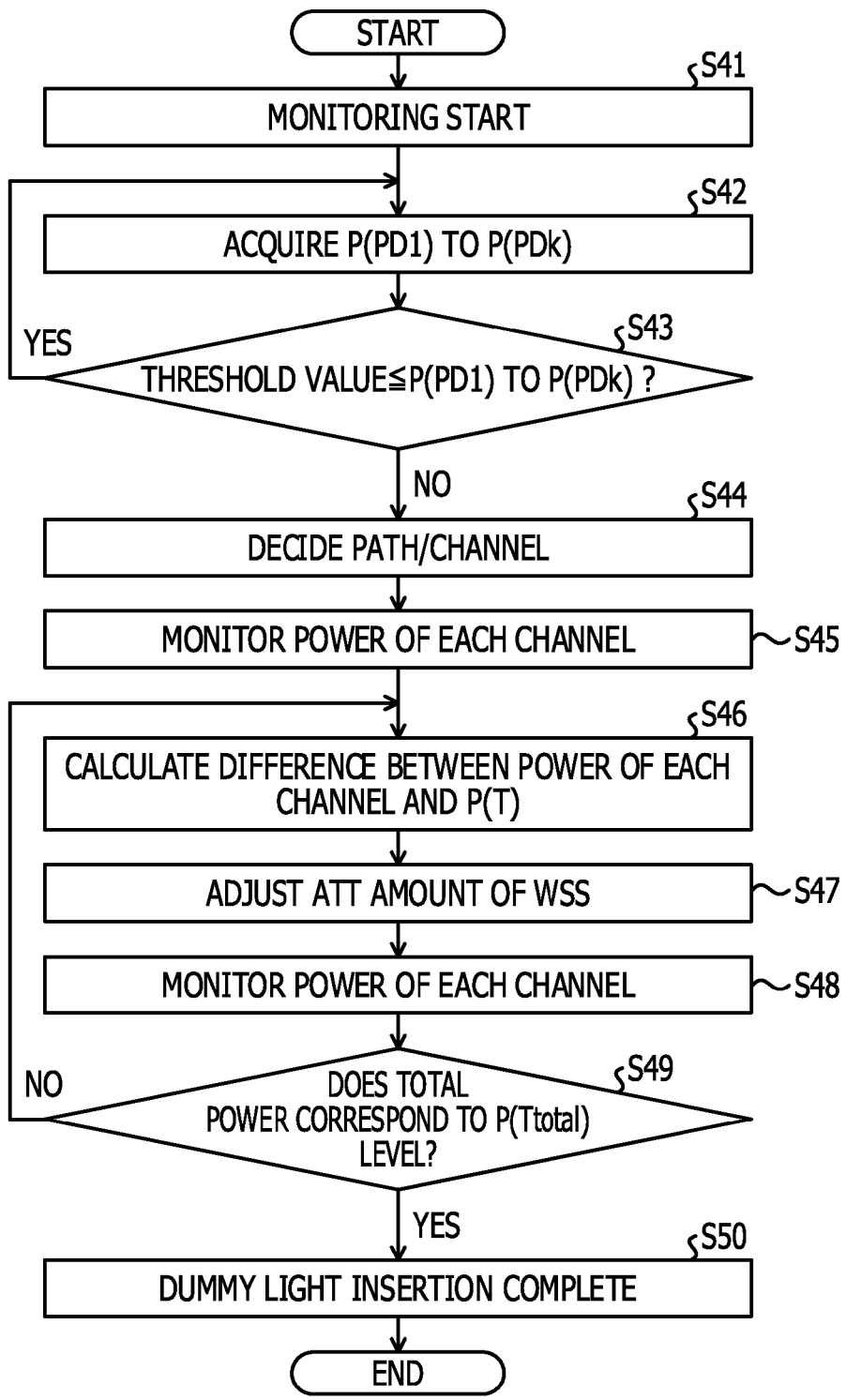
FIG. 30 is a drawing depicting a fourth example of an optical transmission method according to an embodiment.

FIG. 30 is a drawing depicting a fourth example of an optical transmission method according to the embodiment. The optical transmission method depicted in FIG. 30 may be carried out by the optical transmission device depicted in FIG. 28, for example. In the present working example, the optical transmission method is described as being carried out by the optical transmission device depicted in FIG. 28.

When optical transmission starts in the optical transmission device 21 depicted in FIG. 28, the optical transmission device 21 starts the monitoring of optical levels by the PDs 35 and the OCM 39 (step S41). The monitoring result collection/correction unit 51 then acquires, from the PDs 35, the optical levels of the light of each path, namely each output power P(PD1) to P(PDk) of the PD1 to PDk (step S42).

Next, the input interruption determination unit 53 determines whether or not each output power P(PD1) to P(PDk) of the PD1 to PDk is equal to or greater than a preset threshold value (step S43). The database unit 52 may include the threshold value. If each output power P(PD1) to P(PDk) is equal to or greater than the threshold value (step S43: yes), processing returns to step S42.

If any of the output powers P(PD1) to P(PDk) is not equal to or greater than the threshold value (step S43: no), the input interruption determination unit 53 determines that there is a fault in the signal light from the path in which the output power is not equal to or greater than the threshold value. The input interruption determination unit 53 notifies information regarding a path in which it has been determined that there is a fault, to the second control circuit 38. Processing then advances to step S44.

When the dummy light insertion path/channel deciding unit 63 receives, from the input interruption determination unit 53, information regarding the path in which it has been determined that there is a fault, the dummy light insertion path/channel deciding unit 63 acquires data regarding the wavelengths of the signal light and dummy light of each path from the database unit 62, and decides upon a path/channel into which dummy light is inserted (step S44). The path/channel into which dummy light is inserted may be a path that is different from the path in which it has been determined that there is a fault.

Next, the monitoring result collection/correction unit 61 monitors the optical level for each channel of the light that is output from the M×1 WSS 26, namely the output power of each channel of the M×1 WSS 26 (step S45). For example, the monitoring result collection/correction unit 61 performs monitoring by acquiring the output power of each channel of the M×1 WSS 26 from the OCM 39, and using data regarding loss acquired from the database unit 62 to correct the output power of each channel of the M×1 WSS 26.

Next, the monitoring result difference comparison unit 64 calculates, for each channel, the difference between the output power of each channel of the M×1 WSS 26 and a predetermined target value for each channel, namely a target power P(T) for each channel (step S46). Next, based on the differences calculated in step S46, the WSS setting value calculation unit 65 calculates an attenuation amount in the M×1 WSS 26 for the path/channel decided in step S44 into which dummy light is inserted. Then, based on the attenuation amount calculated by the WSS setting value calculation unit 65, the WSS driving unit 66 outputs a control signal to the M×1 WSS 26, and adjusts the attenuation amount (ATT amount) for the M×1 WSS 26 (step S47).

Next, the monitoring result collection/correction unit 61 once again acquires the output power of each channel of the M×1 WSS 26 from the OCM 39, and monitors the output power of each channel of the M×1 WSS 26 (step S48). Next, the monitoring result difference comparison unit 64 determines whether or not the total value of the output power of each channel of the M×1 WSS 26, namely the total power of the output, is of a level that corresponds to a target power P(Ttotal) level that is a predetermined target value for that total power (step S49).

If the total power of the output of the M×1 WSS 26 is not of a level that corresponds to the target power P(Ttotal) level (step S49: no), processing returns to step S46. On the other hand, if the total power of the output of the M×1 WSS 26 is of a level that corresponds to the target power P(Ttotal) level (step S49: yes), for example, the insertion from a path that is different from the path in which it has been determined that there is a fault, of dummy light having the same wavelength as the wavelength of the signal light that is from the path in which it has been determined that there is a fault is completed (step S50). Therefore, the optical transmission device 21 finishes the series of processing.

The configuration besides this is the same as in the sixth example of the optical transmission device depicted in FIG. 19, and a description thereof is redundant and has therefore been omitted. Moreover, as in the third example of the optical transmission device depicted in FIG. 13, the optical filter 33 may not be provided. Furthermore, the PD 35 of each path may be provided at the input side of the CPLs 25. Furthermore, as in the second example of the optical transmission device depicted in FIG. 4, a first PD 24 that detects the optical level of signal light, and a second PD 30 that detects the optical level of dummy light may be provided instead of the PD 35 of each path.

According to the optical transmission device 21 depicted in FIG. 28, the output power of each channel of the M×1 WSS 26 is controlled in such a way that the total power of the output of each channel becomes a predetermined target value, and therefore, as in the second example of the optical transmission device depicted in FIG. 4, light having a fixed power is input to the post-amplifier 27 even if the input of signal light is interrupted. Therefore, it is possible to avoid the occurrence of optical surges, and to avoid deterioration in the signal light from other paths that is multiplexed with the light from a path in which a fault has occurred. Furthermore, according to the optical transmission device 21 depicted in FIG. 28, because it is possible for the output power of each channel of the M×1 WSS 26 to be monitored by the OCM 39, it is possible for the output power of each channel of the M×1 WSS 26 to be adjusted.

Ninth Example of an Optical Transmission Device

Figure 31:
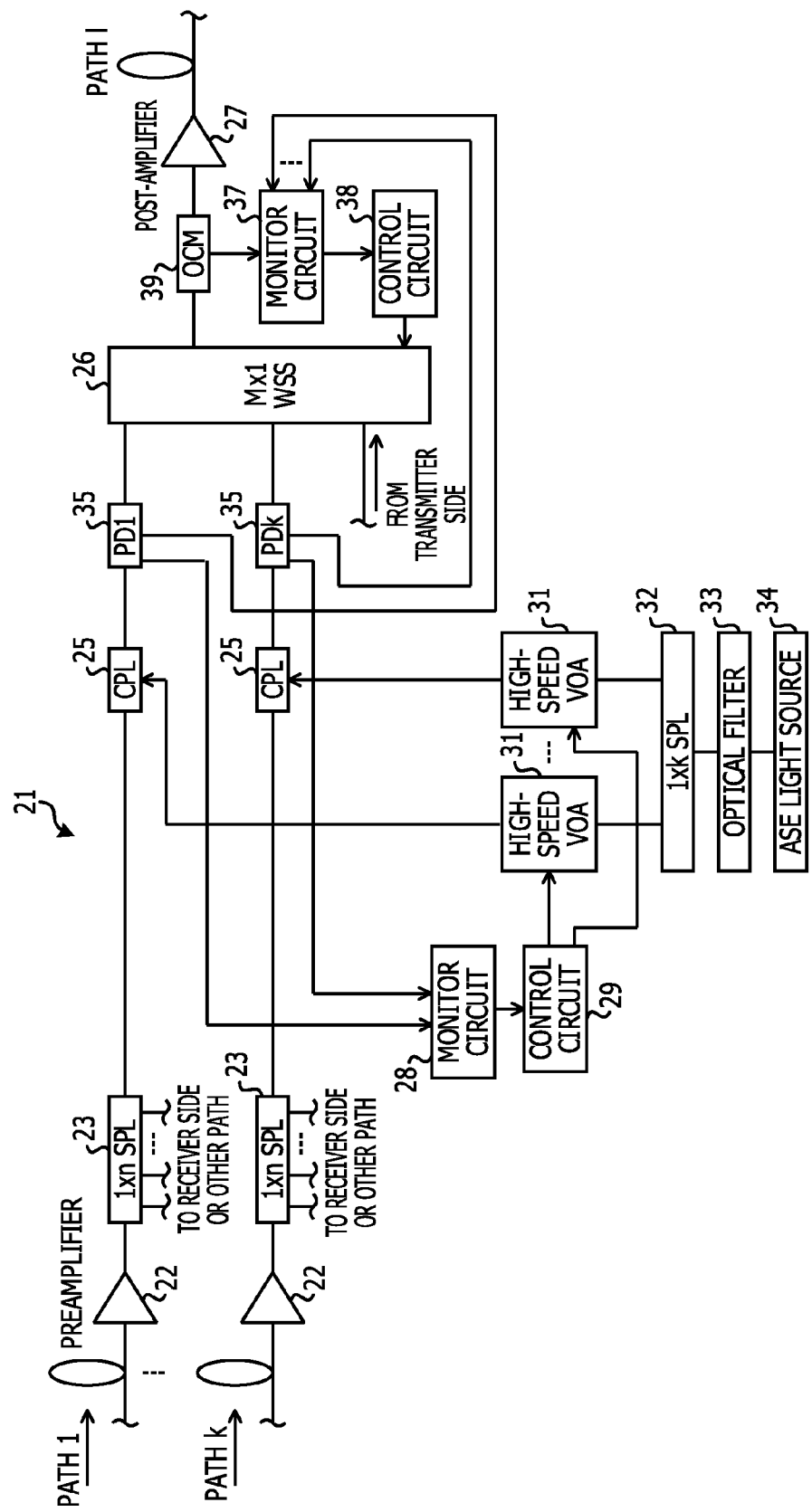
FIG. 31 is a drawing depicting a ninth example of an optical transmission device according to an embodiment.

FIG. 31 is a drawing depicting a ninth example of an optical transmission device according to the embodiment. As depicted in FIG. 31, the optical transmission device 21 may have a configuration in which, in the optical transmission device 21 depicted in FIG. 28, the second control circuit 38 determines a path in which there is a fault in signal light, and based on that determination result, decides upon a path/channel into which dummy light is inserted. Therefore, the control circuit 29 notifies information regarding the path in which it has been determined by the control circuit 29 that there is a fault, to the second control circuit 38.

The second monitor circuit 37 is connected to each PD 35 and the OCM 39 via electrical wiring. The second monitor circuit 37 collects, from each PD 35, the optical levels of light in which signal light and dummy light have been combined in each path. With respect to the collected results, the second monitor circuit 37, for example, performs corrections with consideration being given to loss in the CPLs 25 and loss in the 1×2 SPLs, the depiction of which has been omitted, in the PDs 35, and outputs the corrected results to the second control circuit 38.

The second control circuit 38 is connected to the second monitor circuit 37 and the M×1 WSS 26 via electrical wiring. The second control circuit 38 receives, from the second monitor circuit 37, the optical levels of light in which signal light and dummy light have been combined in each path, detected by the PDs 35, and based on the optical levels of the light of each path, determines whether or not there is a fault in the signal light from each path.

The second control circuit 38 outputs, to the M×1 WSS 26, a control signal that selects the signal light of a path in which it has been determined that there is a fault, and dummy light that is transmitted by another path and has the same wavelength as the wavelength of the signal light of the path in which it has been determined that there is a fault. As a result of this, in the M×1 WSS 26, the signal light of the path in which it has been determined that there is a fault, and dummy light that is transmitted by another path and has the same wavelength as the wavelength of the signal light of the path in which it has been determined that there is a fault are selected.

The monitor circuit 28 and the control circuit 29 are the same as the monitor circuit 28 and the control circuit 29 in the eighth example of the optical transmission device depicted in FIG. 29. However, the input interruption determination unit 53 does not notify information regarding the path in which it has been determined by the input interruption determination unit 53 that there is a fault, to the dummy light insertion path/channel deciding unit 63 of the second control circuit 38.

Figure 32:
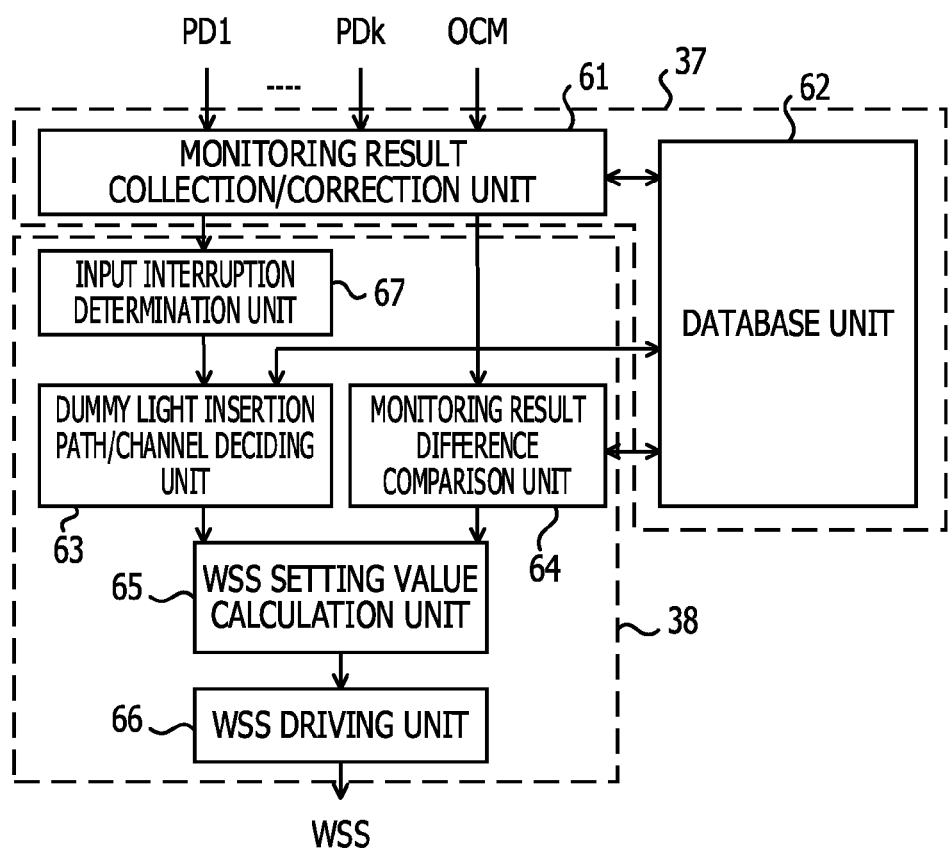
FIG. 32 is a drawing depicting an example of the functional configuration of a monitor circuit and a control circuit depicted in FIG. 31.

FIG. 32 is a drawing depicting an example of the functional configuration of the monitor circuit and the control circuit depicted in FIG. 31. As depicted in FIG. 32, the second monitor circuit 37 is the same as the second monitor circuit 37 in the eighth example of the optical transmission device depicted in FIG. 29. However, the database unit 62 includes data regarding loss in the CPLs 25 and loss in the 1×2 SPLs in the PDs 35 and the OCM 39, for example.

Furthermore, the monitoring result collection/correction unit 61 collects, from each PD 35, the optical levels of light in which signal light and dummy light have been combined in each path. The monitoring result collection/correction unit 61 acquires, from the database unit 62, the data regarding loss in the CPLs 25 and loss in the 1×2 SPLs in the PDs 35, for example. The monitoring result collection/correction unit 61 uses the data regarding loss acquired from the database unit 62 to correct the optical levels of the light in which signal light and dummy light have been combined, collected from the PDs 35.

The second control circuit 38 may include the input interruption determination unit 67 besides the second control circuit 38 in the eighth example of the optical transmission device depicted in FIG. 29. The input interruption determination unit 67 receives, from the monitoring result collection/correction unit 61, the optical levels of light in which signal light and dummy light have been combined, detected by the PDs 35, and based on the received optical levels, determines whether or not there is a fault in the signal light from each path, namely whether or not there is an interruption in the input of the signal light.

For example, the input interruption determination unit 67 may compare the optical levels of the light detected by the PDs 35 with a preset threshold value, and may determine that there is an interruption in the input of signal light with respect to a path in which the optical level of the light detected by a PD 35 is lower than the threshold value. The input interruption determination unit 67 notifies information regarding a path in which it has been determined that there is a fault, to the dummy light insertion path/channel deciding unit 63.

The dummy light insertion path/channel deciding unit 63 receives, from the input interruption determination unit 67, information regarding the path in which it has been determined that there is a fault, acquires data regarding the wavelengths of the signal light and dummy light of each path from the database unit 62, and decides upon a path/channel into which dummy light is inserted.

The monitoring result collection/correction unit 61, the dummy light insertion path/channel deciding unit 63, the monitoring result difference comparison unit 64, the WSS setting value calculation unit 65, the WSS driving unit 66, and the input interruption determination unit 67 may be realized by, in the hardware depicted in FIG. 7 for example, the CPU 41 executing a program that realizes the optical transmission method described hereafter. Alternatively, the monitoring result collection/correction unit 61, the dummy light insertion path/channel deciding unit 63, the monitoring result difference comparison unit 64, the WSS setting value calculation unit 65, the WSS driving unit 66, and the input interruption determination unit 67 may be realized by using hardware. The database unit 62 may be realized by using the memory 42.

The configuration besides this is the same as in the eighth example of the optical transmission device depicted in FIG. 28, and a description thereof is redundant and has therefore been omitted. Moreover, as in the third example of the optical transmission device depicted in FIG. 13, the optical filter 33 may not be provided. Furthermore, the PD 35 of each path may be provided at the input side of the CPLs 25. Furthermore, as in the second example of the optical transmission device depicted in FIG. 4, a first PD 24 that detects the optical level of signal light, and a second PD 30 that detects the optical level of dummy light may be provided instead of the PD 35 of each path.

According to the optical transmission device 21 depicted in FIG. 31, the output power of each channel of the M×1 WSS 26 is controlled in such a way that the total power of the output of each channel becomes a predetermined target value, and therefore, as in the second example of the optical transmission device depicted in FIG. 4, light having a fixed power is input to the post-amplifier 27 even if the input of signal light is interrupted. Therefore, it is possible to avoid the occurrence of optical surges, and to avoid deterioration in the signal light from other paths that is multiplexed with the light from a path in which a fault has occurred. Furthermore, according to the optical transmission device 21 depicted in FIG. 31, because it is possible for the output power of each channel of the M×1 WSS 26 to be monitored by the OCM 39, it is possible to adjust the output power of each channel of the M×1 WSS 26.

Tenth Example of an Optical Transmission Device

Figure 33:
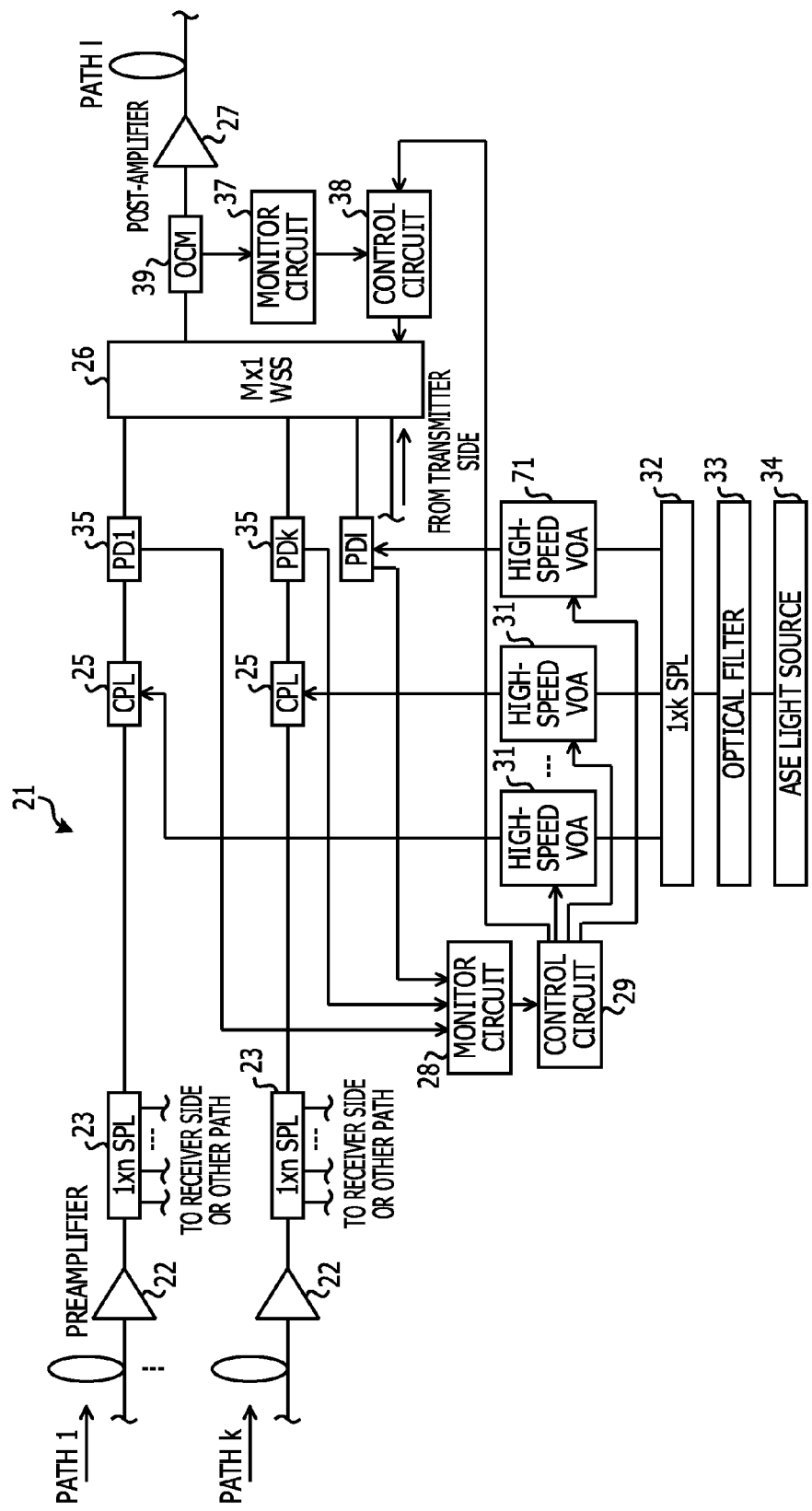
FIG. 33 is a drawing depicting a tenth example of an optical transmission device according to an embodiment.

FIG. 33 is a drawing depicting a tenth example of an optical transmission device according to the embodiment. As depicted in FIG. 33, the optical transmission device 21 may have a configuration in which, in the optical transmission device 21 depicted in FIG. 28, a high-speed VOA 71 and a PD 72 are provided separately from the high-speed VOAs 31 and the PDs 35 corresponding to each path, for inserting dummy light at the transmission side, and dummy light is inserted into the M×1 WSS 26 separately from the paths 1 to k. In FIG. 33, "PDI" is the PD 72 for inserting dummy light at the transmission side.

The high-speed VOA 71 is connected to the 1×k SPL 32 via an optical transmission path. Furthermore, the high-speed VOA 71 is connected to the control circuit 29 via electrical wiring. Based on a control signal from the control circuit 29, the high-speed VOA 71 controls the optical level of dummy light from the 1×k SPL 32.

The PD 72 is connected to the high-speed VOA 71 via an optical transmission path. The PD 72 detects the optical level of light that is output from the high-speed VOA 71, and outputs an electrical signal corresponding to the optical level detected. Strictly speaking, a 1×2 SPL, the depiction of which has been omitted, is connected to an optical transmission path that extends from the high-speed VOA 71. In this 1×2 SPL, the light that is output from the high-speed VOA 71 to the optical transmission path is branched into two light beams, one light beam is output to the M×1 WSS 26, and the other light beam is output to the PD 72. The PD 72 detects the optical level of the light that is output from the 1×2 SPL.

The M×1 WSS 26 includes a dummy light-dedicated port, and dummy light of all of the wavelengths that are able to be handled by the system that is output from the high-speed VOA 71 is input to this dummy light-dedicated port. For example, when the wavelength that is passed is switched in the M×1 WSS 26, if, from among light having a wavelength γ1 and a wavelength γ2 from the path 1, light having the wavelength γ1 is to be dropped and light having the wavelength γ2 is to be passed, the M×1 WSS 26 blocks the light having the wavelength γ1 and passes the light having the wavelength γ2. If the light having the wavelength γ1 is not added from the transmission side, the M×1 WSS 26 passes the light having the wavelength γ1 from among the dummy light that is input from the dummy light-dedicated port. As a result of this, the number of wavelengths and the power of the light that is input to the post-amplifier 27 are maintained in a fixed manner.

The monitor circuit 28 is connected to the PD 72 via electrical wiring. The monitor circuit 28 collects, from the PD 72, the optical level of dummy light that is output from the high-speed VOA 71. With respect to the collected results, the monitor circuit 28, for example, performs corrections with consideration being given to loss in the 1×2 SPL, the depiction of which has been omitted, in the PD 72, and outputs the corrected results to the control circuit 29. The database unit 52 includes the data regarding loss in the 1×2 SPL in the PD 72, for example.

The control circuit 29 receives, from the monitor circuit 28, the optical level of dummy light that is output from the high-speed VOA 71 and detected by the PD 72. The control circuit 29 outputs a control signal that controls the optical level of dummy light that is input to the dummy light-dedicated port of the M×1 WSS 26, based on the optical level of dummy light from the high-speed VOA 71.

Figure 34:
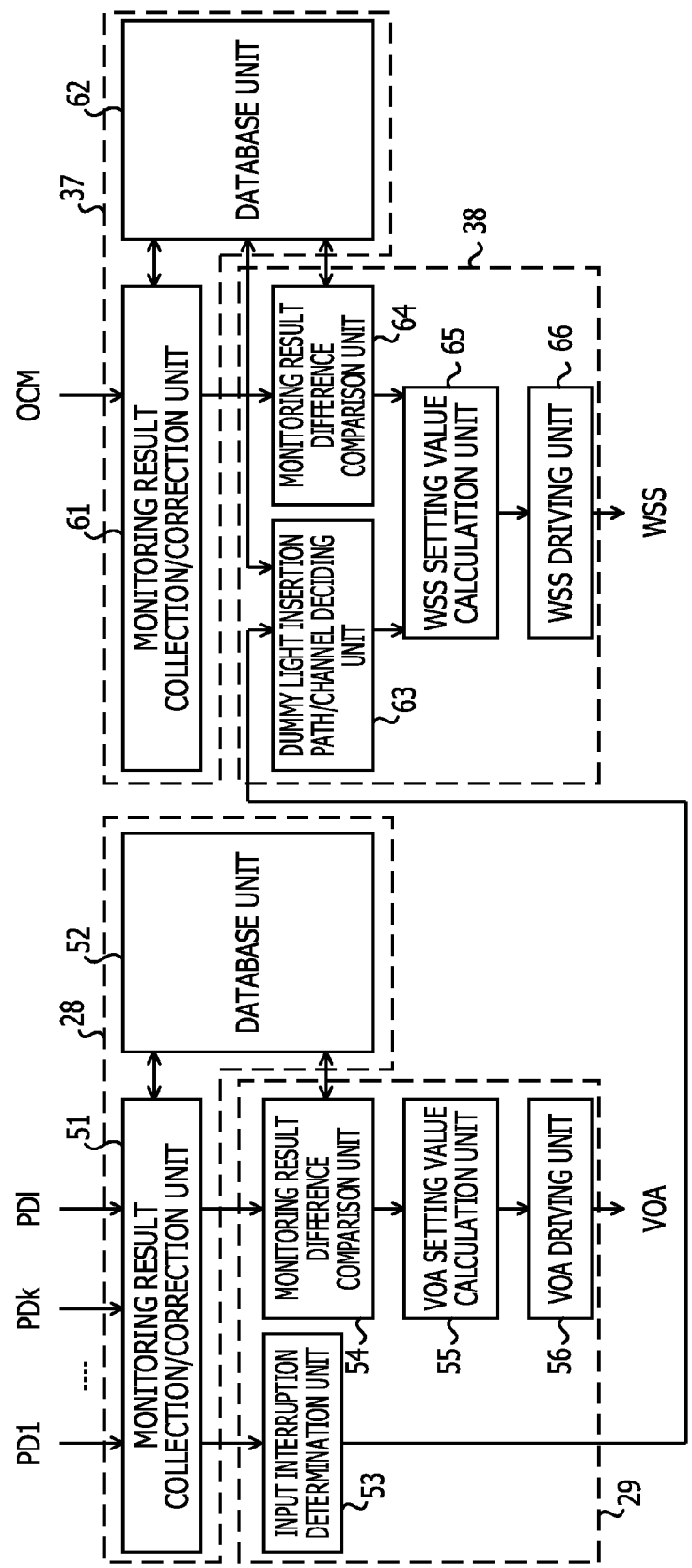
FIG. 34 is a drawing depicting an example of the functional configuration of a monitor circuit and a control circuit depicted in FIG. 33.

FIG. 34 is a drawing depicting an example of the functional configuration of the monitor circuit and the control circuit depicted in FIG. 33. As depicted in FIG. 34, the monitor circuit 28, the control circuit 29, the second monitor circuit 37, and the second control circuit 38 are the same as the monitor circuit 28, the control circuit 29, the second monitor circuit 37, and the second control circuit 38 in the eighth example of the optical transmission device depicted in FIG. 29. However, the monitoring result collection/correction unit 51 collects, from the PD 72, the optical level of the dummy light that is output from the high-speed VOA 71.

The monitoring result difference comparison unit 54 receives, from the monitoring result collection/correction unit 51, the optical level of the dummy light that is output from the high-speed VOA 71, and calculates the difference between the optical level of the dummy light and a predetermined target value. The database unit 52 may include the predetermined target value for the optical level of the dummy light that is output from the high-speed VOA 71.

The VOA setting value calculation unit 55 receives, from the monitoring result difference comparison unit 54, the difference between the optical level of the dummy light that is output from the high-speed VOA 71 and the predetermined target value, and based on that difference, calculates an attenuation amount for the high-speed VOA 71. For example, the VOA setting value calculation unit 55 calculates the attenuation amount for the high-speed VOA 71 in such a way that the difference calculated by the monitoring result difference comparison unit 54 becomes zero.

The VOA driving unit 56 receives the attenuation amount for the high-speed VOA 71 from the VOA setting value calculation unit 55, and based on that attenuation amount, outputs to the high-speed VOA 71, a control signal that drives that high-speed VOA 71.

The configuration besides this is the same as in the eighth example of the optical transmission device depicted in FIG. 28, and a description thereof is redundant and has therefore been omitted. Moreover, as in the third example of the optical transmission device depicted in FIG. 13, the optical filter 33 may not be provided. Furthermore, the PD 35 of each path may be provided at the input side of the CPLs 25. Furthermore, as in the second example of the optical transmission device depicted in FIG. 4, a first PD 24 that detects the optical level of signal light, and a second PD 30 that detects the optical level of dummy light may be provided instead of the PD 35 of each path. Furthermore, as in the ninth example of the optical transmission device depicted in FIG. 31, a configuration may be implemented in which the second control circuit 38 determines a path in which there is a fault in signal light, and based on that determination result, decides upon a path/channel into which dummy light is inserted.

According to the optical transmission device 21 depicted in FIG. 33, it is possible for, from among the dummy light that is input to the dummy light-dedicated port of the M×1 WSS 26, dummy light having a wavelength that is not included in the light that is input from all of the paths and the transmission side to be multiplexed by the M×1 WSS 26 with the light that is input from all of the paths and the transmission side. Therefore, the number of wavelengths and power of the light that is input to the post-amplifier 27 are able to be maintained in a fixed manner even if the input of light from the transmission side, for example, is interrupted, and it is therefore possible to avoid the occurrence of optical surges, and to avoid deterioration in the signal light from other paths.

Figure 35:
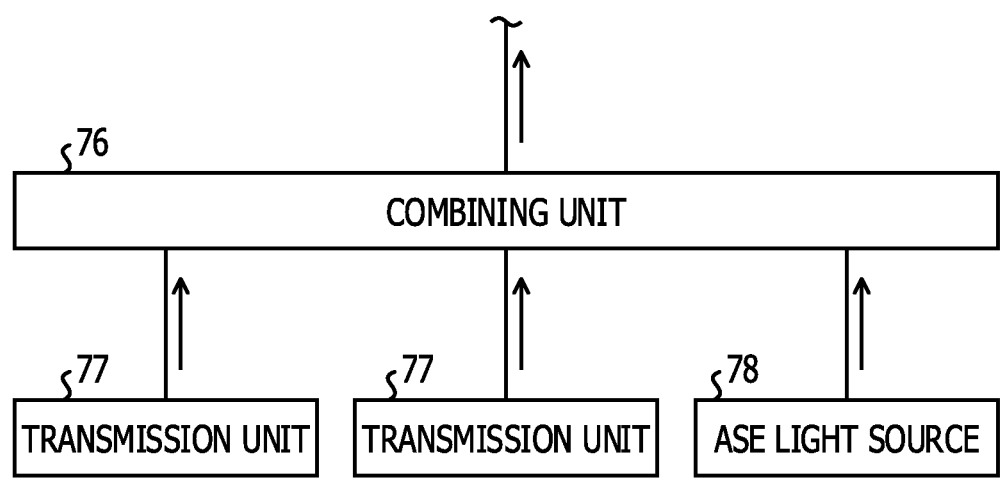
FIG. 35 is a drawing depicting an example of the configuration of the transmission side where dummy light is input to an M×1 WSS.

Moreover, instead of inputting dummy light of all of the wavelengths that are able to be handled by the system into the dummy light-dedicated port of the M×1 WSS 26, as depicted in FIG. 35, dummy light of all of the wavelengths that are able to be handled by the system may be input to the M×1 WSS 26 from the transmission side.

FIG. 35 is a drawing depicting an example of the configuration of the transmission side where dummy light is input to the M×1 WSS 26. As depicted in FIG. 35, at the transmission side, amplified spontaneous emission that is output from an ASE light source 78 and signal light that is output from a transmission unit 77 may be combined by a combining unit 76 and input to the M×1 WSS 26. Furthermore, by using an optical filter that is not depicted, dummy light having an optical spectral width that is approximately the same as the signal light in the wavelength of each signal light may be generated from the amplified spontaneous emission, and combined with the signal light that is output from the transmission unit 77.

Eleventh Example of an Optical Transmission Device

Figure 36:
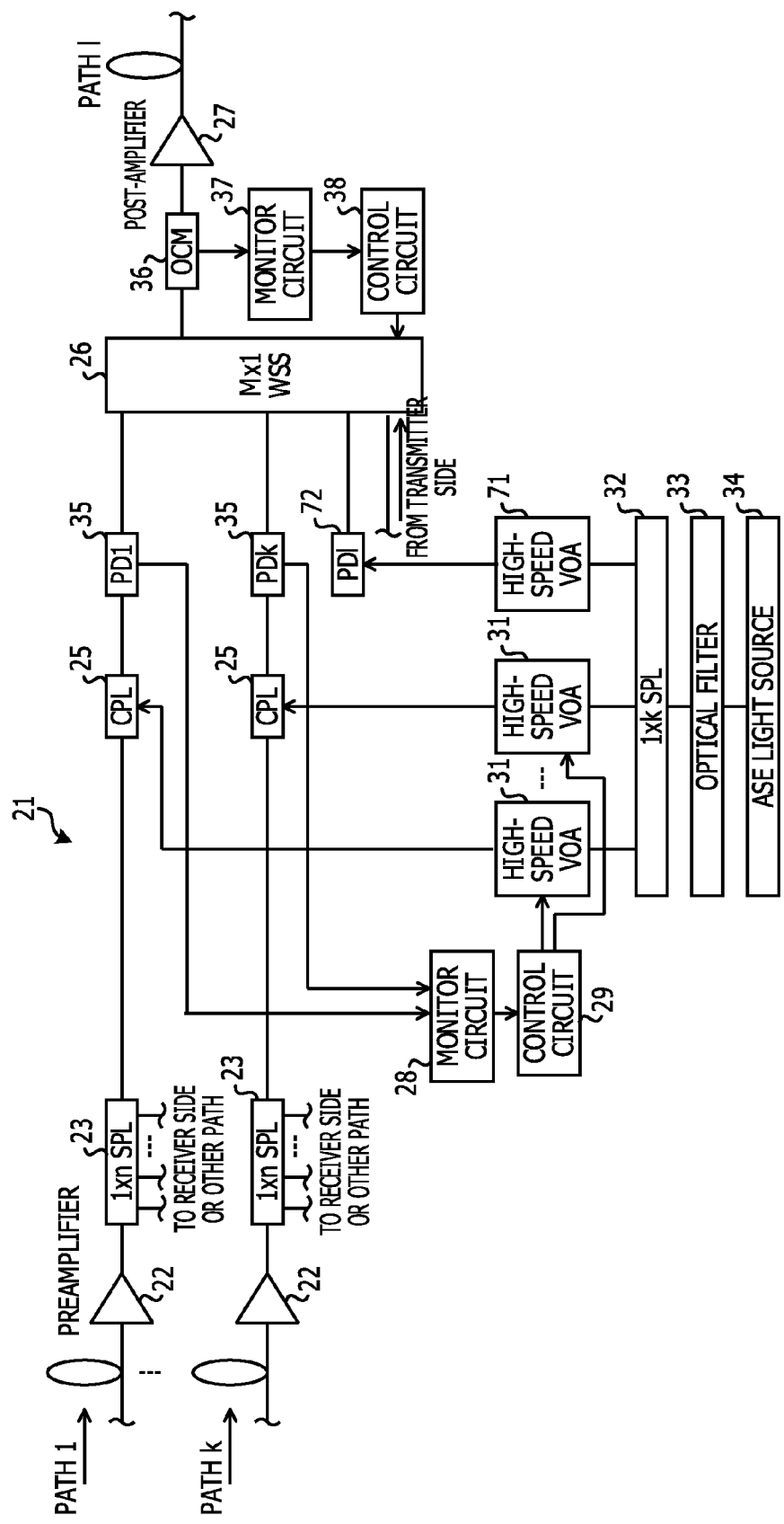
FIG. 36 is a drawing depicting an eleventh example of an optical transmission device according to an embodiment.

FIG. 36 is a drawing depicting an eleventh example of an optical transmission device according to the embodiment. As depicted in FIG. 36, the optical transmission device 21 may have a configuration in which, in the optical transmission device 21 depicted in FIG. 33, the second control circuit 38 decides upon a path/channel into which dummy light is inserted, based on the output power of each channel of the M×1 WSS 26 detected by the OCM 39. The control circuit 29 notifies information regarding a path in which it has been determined by the control circuit 29 that there is a fault, to the second control circuit 38.

Furthermore, the PD 72, which detects the optical level of light output from the high-speed VOA 71 that outputs dummy light to the dummy light-dedicated port of the M×1 WSS, 26 does not output an electrical signal corresponding to the optical level detected, to the monitor circuit 28. In other words, the monitor circuit 28 does not collect, from the PD 72, the optical level of dummy light that is output from the high-speed VOA 71. Furthermore, the high-speed VOA 71 is independent from the control performed by the control circuit 29. In other words, the control circuit 29 does not control the optical level of the high-speed VOA 71.

The monitor circuit 28 and the control circuit 29 are the same as the monitor circuit 28 and the control circuit 29 in the tenth example of the optical transmission device depicted in FIG. 34. However, the optical level of the dummy light that is output from the high-speed VOA 71 is not input to the monitoring result collection/correction unit 51 from the PD 72. Furthermore, the input interruption determination unit 53 does not notify information regarding the path in which it has been determined by the input interruption determination unit 53 that there is a fault, to the dummy light insertion path/channel deciding unit 63 of the second control circuit 38.

Figure 37:
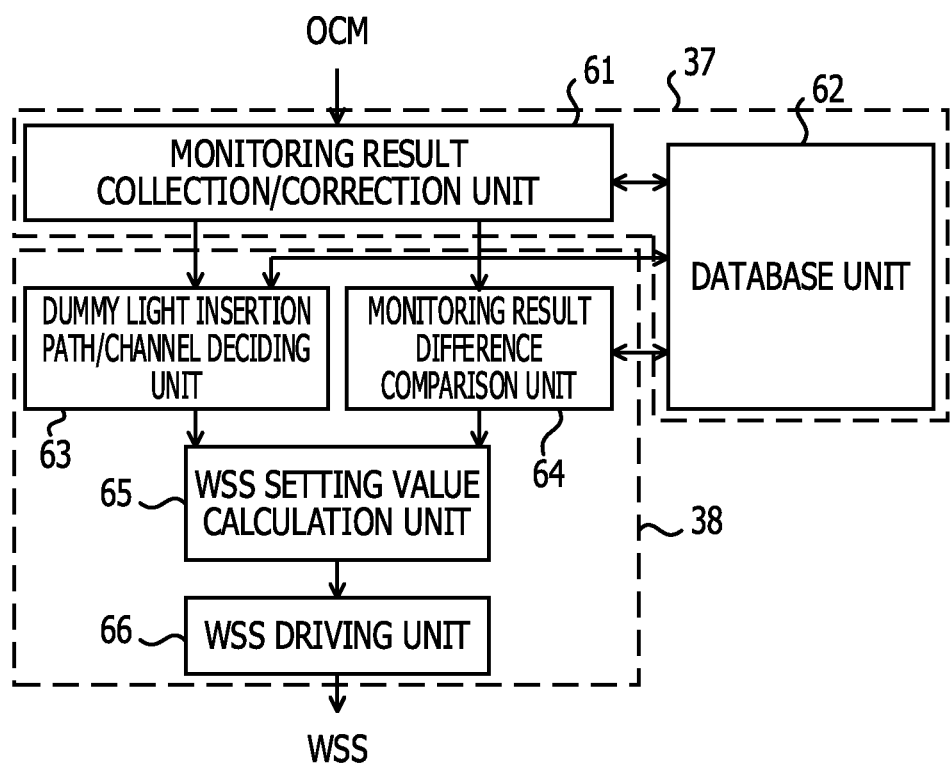
FIG. 37 is a drawing depicting an example of the functional configuration of a monitor circuit and a control circuit depicted in FIG. 36.

FIG. 37 is a drawing depicting an example of the functional configuration of the monitor circuit and the control circuit depicted in FIG. 36. As depicted in FIG. 37, the second monitor circuit 37 and the second control circuit 38 are the same as the second monitor circuit 37 and the second control circuit 38 in the tenth example of the optical transmission device depicted in FIG. 34. However, information regarding the path in which it has been determined by the input interruption determination unit 53 that there is a fault is not notified to the dummy light insertion path/channel deciding unit 63 from the input interruption determination unit 53 of the control circuit 29.

The dummy light insertion path/channel deciding unit 63 receives, from the monitoring result collection/correction unit 61, the output power of each channel of the M×1 WSS 26 detected by the OCM 39, and based on the output power of each channel of the M×1 WSS 26, decides upon a path/channel into which dummy light is inserted.

Fifth Example of an Optical Transmission Method

Figure 38:
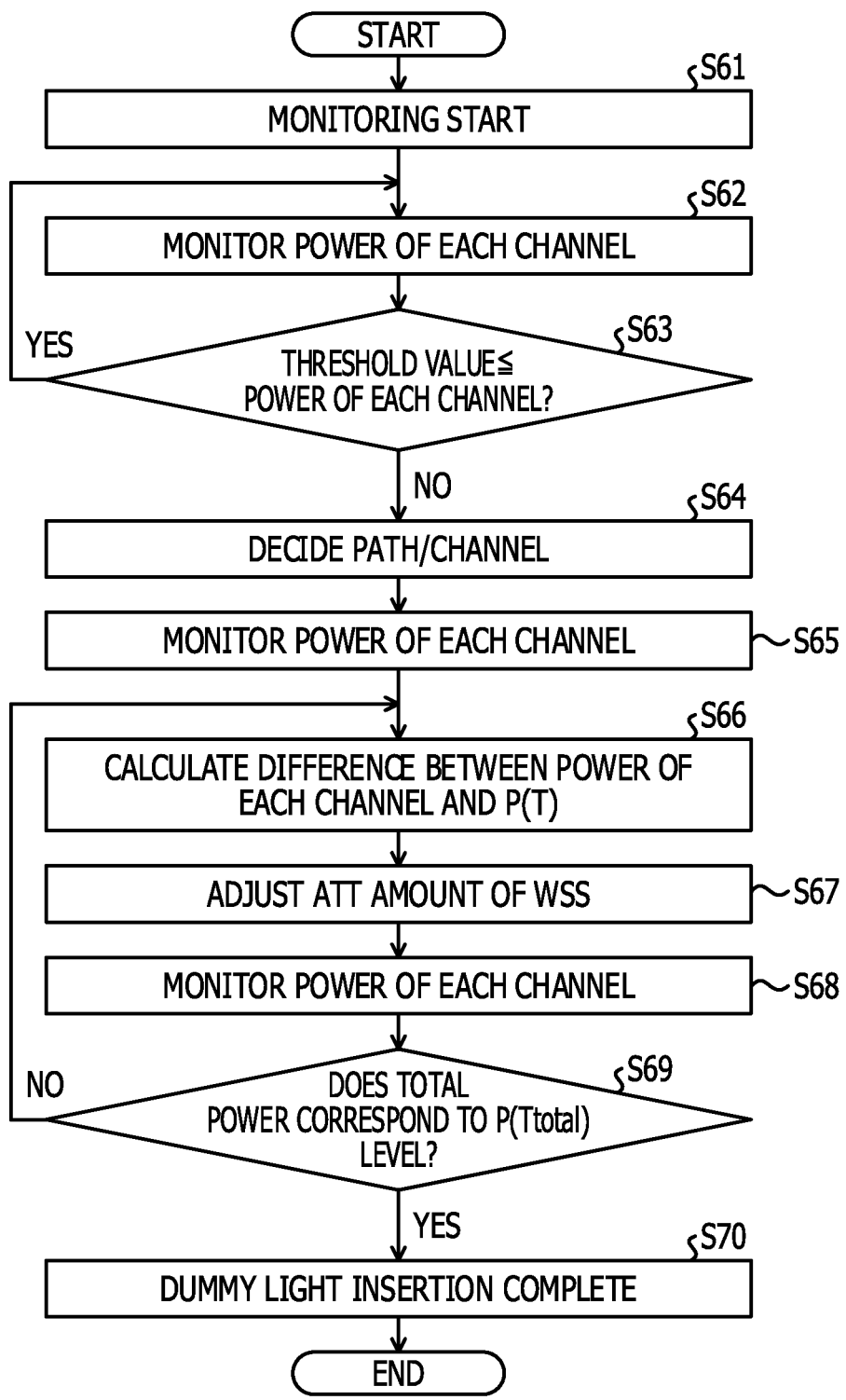
FIG. 38 is a drawing depicting a fifth example of an optical transmission method according to an embodiment.

FIG. 38 is a drawing depicting a fifth example of an optical transmission method according to the embodiment. The optical transmission method depicted in FIG. 38 may be carried out by the optical transmission device depicted in FIG. 36, for example. In the present working example, the optical transmission method is described as being carried out by the optical transmission device depicted in FIG. 36.

When optical transmission starts in the optical transmission device 21 depicted in FIG. 36, the optical transmission device 21 starts the monitoring of optical levels by the PDs 35, the PD 72, and the OCM 39 (step S61). Next, the monitoring result collection/correction unit 61 acquires, from the OCM 39, the optical level for each channel of the light that is output from the M×1 WSS 26, and monitors the output power of each channel of the M×1 WSS 26 (step S62).

Next, the dummy light insertion path/channel deciding unit 63 determines whether or not the output power of each channel is equal to or greater than a preset threshold value (step S63). The database unit 62 may include the threshold value. If the output power of each channel is equal to or greater than the threshold value (step S63: yes), processing returns to step S62.

If the output power of any of the channels is not equal to or greater than the threshold value (step S63: no), the dummy light insertion path/channel deciding unit 63 acquires data regarding the wavelengths of the signal light and dummy light of each path from the database unit 62, and decides upon a path/channel into which dummy light is inserted (step S64). The path/channel into which dummy light is inserted may be a path that is different from the path in which it has been determined that there is a fault.

Next, the monitoring result collection/correction unit 61 acquires, from the OCM 39, the optical level for each channel of the light that is output from the M×1 WSS 26, and monitors the output power of each channel of the M×1 WSS 26 (step S65). For example, the monitoring result collection/correction unit 61 performs monitoring by acquiring the output power of each channel of the M×1 WSS 26 from the OCM 39, and using data regarding loss acquired from the database unit 62 to correct the output power of each channel of the M×1 WSS 26.

Next, the monitoring result difference comparison unit 64 calculates, for each channel, the difference between the output power of each channel of the M×1 WSS 26 and a predetermined target value for each channel, namely a target power P(T) for each channel (step S66). Next, based on the differences calculated in step S66, the WSS setting value calculation unit 65 calculates an attenuation amount in the M×1 WSS 26 for the path/channel decided in step S64 into which dummy light is inserted. Then, based on the attenuation amount calculated by the WSS setting value calculation unit 65, the WSS driving unit 66 outputs a control signal to the M×1 WSS 26, and adjusts the attenuation amount (ATT amount) for the M×1 WSS 26 (step S67).

Next, the monitoring result collection/correction unit 61 once again acquires, from the OCM 39, the optical level for each channel of the light that is output from the M×1 WSS 26, and monitors the output power of each channel of the M×1 WSS 26 (step S68). Next, the monitoring result difference comparison unit 64 determines whether or not the total value of the output power of each channel of the M×1 WSS 26, namely the total power of the output, is of a level that corresponds to a target power P(Ttotal) level that is a predetermined target value for that total power (step S69).

If the total power of the output of the M×1 WSS 26 is not of a level that corresponds to the target power P(Ttotal) level (step S69: no), processing returns to step S66. On the other hand, if the total power of the output of the M×1 WSS 26 is of a level that corresponds to the target power P(Ttotal) level (step S69: yes), for example, the insertion from a path that is different from the path in which it has been determined that there is a fault, of dummy light having the same wavelength as the wavelength of the signal light that is from the path in which it has been determined that there is a fault is completed (step S70). Therefore, the optical transmission device 21 finishes the series of processing.

The configuration besides this is the same as in the tenth example of the optical transmission device depicted in FIG. 33, and a description thereof is redundant and has therefore been omitted. Moreover, as in the third example of the optical transmission device depicted in FIG. 13, the optical filter 33 may not be provided. Furthermore, the PD 35 of each path may be provided at the input side of the CPLs 25. Furthermore, as in the second example of the optical transmission device depicted in FIG. 4, a first PD 24 that detects the optical level of signal light, and a second PD 30 that detects the optical level of dummy light may be provided instead of the PD 35 of each path.

According to the optical transmission device 21 depicted in FIG. 36, the output power of each channel of the M×1 WSS 26 is controlled in such a way that the total power of the output of each channel becomes a predetermined target value, and therefore, as in the second example of the optical transmission device depicted in FIG. 4, light having a fixed power is input to the post-amplifier 27 even if the input of signal light is interrupted. Therefore, it is possible to avoid the occurrence of optical surges, and to avoid deterioration in the signal light from other paths that is multiplexed with the light from a path in which a fault has occurred. Furthermore, according to the optical transmission device 21 depicted in FIG. 36, because it is possible for the output power of each channel of the M×1 WSS 26 to be monitored by the OCM 39, it is possible for the output power of each channel of the M×1 WSS 26 to be adjusted.

The optical transmission system 11 depicted in FIG. 2 is an example of an optical transmission system in which the optical transmission device 21 depicted in each of FIG. 4, FIG. 13, FIG. 17 to FIG. 19, FIG. 25, FIG. 28, FIG. 31, FIG. 33, and FIG. 36 is used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical transmission device comprising:
    a receiver that receives first light;
    a transmitter that outputs second light;
    a memory;
    a processor coupled to the memory, configured to control a first optical level of the second light in such a way that a second optical level calculated so that a sum of an optical level of the received first light and an optical level of the second light that is output from the transmitter becomes a predetermined target value;
    a combiner that combines the received first light and the second light for which the first optical level is controlled by the processor; and
    an amplifier that amplifies the combined light, wherein the processor is further configured to:
        determine that there is a fault in the received first light, and
        cause the transmitter to output the second light when it is determined that there is the fault in the received first light.

2. The optical transmission device according to claim 1, further comprising:
    a multiplexer that multiplexes the combined light and light received from another path that is different from a path along which the first light is transmitted,
    wherein the multiplexed light is input to the amplifier.

3. The optical transmission device according to claim 1, wherein the transmitter outputs the second light if the optical level of the received first light falls below a predetermined level.

4. The optical transmission device according to claim 1, wherein the transmitter outputs the second light having the same wavelength as the first light.

5. The optical transmission device according to claim 1, wherein the first light is signal light and the second light is dummy light.

6. An optical transmission method comprising:
    acquiring an optical level of first light;
    controlling a first optical level of second light being controlled by a processor in such a way that a second optical level calculated so that a sum of an optical level of the received first light and an optical level of the second light that is output from the transmitter becomes a predetermined target value;
    amplifying light in which the first light and the second light are combined;
    determining that there is a fault in the first light; and
    outputting the second light when it is determined that there is the fault in the received first light.

* * * * *